(12) United States Patent
Ying et al.

(10) Patent No.: US 10,575,299 B2
(45) Date of Patent: Feb. 25, 2020

(54) PROCEDURES, BASE STATIONS AND USER EQUIPMENTS FOR UPLINK TRANSMISSION WITHOUT GRANT

(71) Applicant: SHARP KABUSHIKI KAISHA, Sakai, Osaka (JP)

(72) Inventors: Kai Ying, Vancouver, WA (US); Tatsushi Aiba, Vancouver, WA (US); Toshizo Nogami, Chiba (JP); John M. Kowalski, Vancouver, WA (US); Zhanping Yin, Vancouver, WA (US); KyungHo Kim, San Jose, CA (US)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 7 days.

(21) Appl. No.: 16/100,032

(22) Filed: Aug. 9, 2018

(65) Prior Publication Data

US 2019/0053211 A1    Feb. 14, 2019

Related U.S. Application Data

(63) Continuation of application No. PCT/US2018/045873, filed on Aug. 8, 2018.
(Continued)

(51) Int. Cl.
*H04W 72/04* (2009.01)
*H04W 72/14* (2009.01)
*H04L 1/18* (2006.01)

(52) U.S. Cl.
CPC ......... *H04W 72/044* (2013.01); *H04W 72/14* (2013.01); *H04L 1/1812* (2013.01)

(58) Field of Classification Search
CPC ... H04W 72/04; H04W 72/042; H04W 72/14; H04W 72/044
See application file for complete search history.

(56) References Cited

U.S. PATENT DOCUMENTS

| 2017/0111888 A1* | 4/2017 | Dinan | H04W 72/042 |
| 2018/0219649 A1* | 8/2018 | Ying | H04L 1/1816 |
| 2019/0045390 A1* | 2/2019 | Davydov | H04W 28/0273 |

FOREIGN PATENT DOCUMENTS

CN    106 788 943 A    5/2017

OTHER PUBLICATIONS

International Search Report of PCT/US2018/045873, dated Oct. 30, 2018.
(Continued)

*Primary Examiner* — Kyaw Z Soe
(74) *Attorney, Agent, or Firm* — ScienBiziP, P.C.

(57) ABSTRACT

A UE is configured to receive an RRC message including first information containing a frequency hopping mode, a periodicity and a number of repetitions, and second information containing a slot offset, a time domain allocation indicating a start symbol and a length, a frequency domain allocation, and a frequency hopping offset. The UE is configured to determine, according to the first and second information, a plurality of PUSCH resources for repetitions of a transport block. A first one of the plurality of PUSCH resources is determined based on the periodicity, the slot offset, the time domain allocation, and the frequency domain allocation. The remaining ones of the plurality of PUSCH resources are to use consecutive slots. The UE is configured to transmit, on the plurality of PUSCH resources, the repetitions of the transport block, where the repetitions start on the first PUSCH resource associated with Redundancy Version 0.

4 Claims, 45 Drawing Sheets

Related U.S. Application Data

(60) Provisional application No. 62/543,917, filed on Aug. 10, 2017.

(56) References Cited

OTHER PUBLICATIONS

NTT Docomo et al: "Overall solutions for UL grant free transmission", 3GPP Draft; R1-1711111, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017 (Jun. 26, 2017), XP051300311. Retrieved from the Internet: URL:http://www.3gpp.org/ftp/Meetings_3GPP_SYNC/RAN1/Docs/ [retrieved on Jun. 26, 2017].

Huawei et al: "UL Grant-free transmission", 3GPP Draft; R1-1701665, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 6, 2017 (Feb. 6, 2017), XP051220544, Retrieved from the Internet: URL:http://www.3gpp.org/ftp/tsg_ran/WG1_RL1/TSGR1_88/Docs/ [retrieved on Feb. 6, 2017].

* cited by examiner

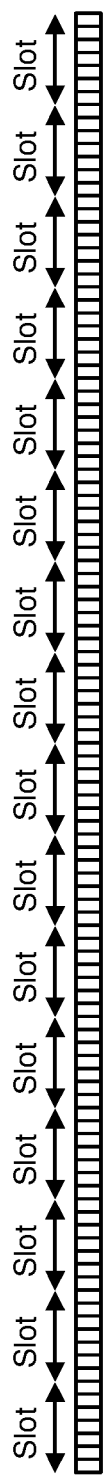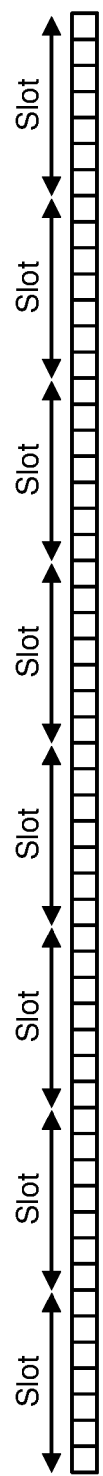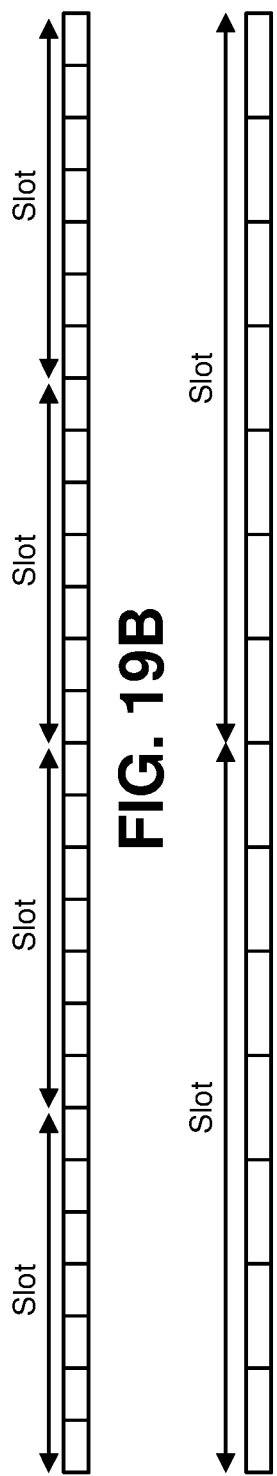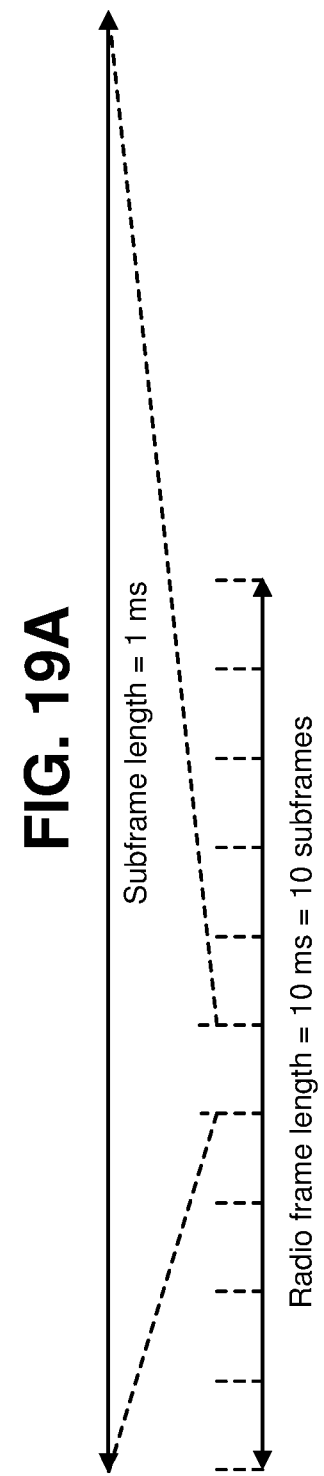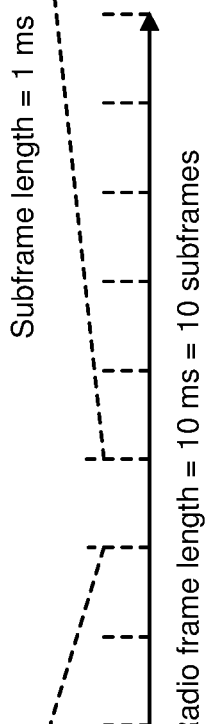
FIG. 19A  FIG. 19B  FIG. 19C  FIG. 19D

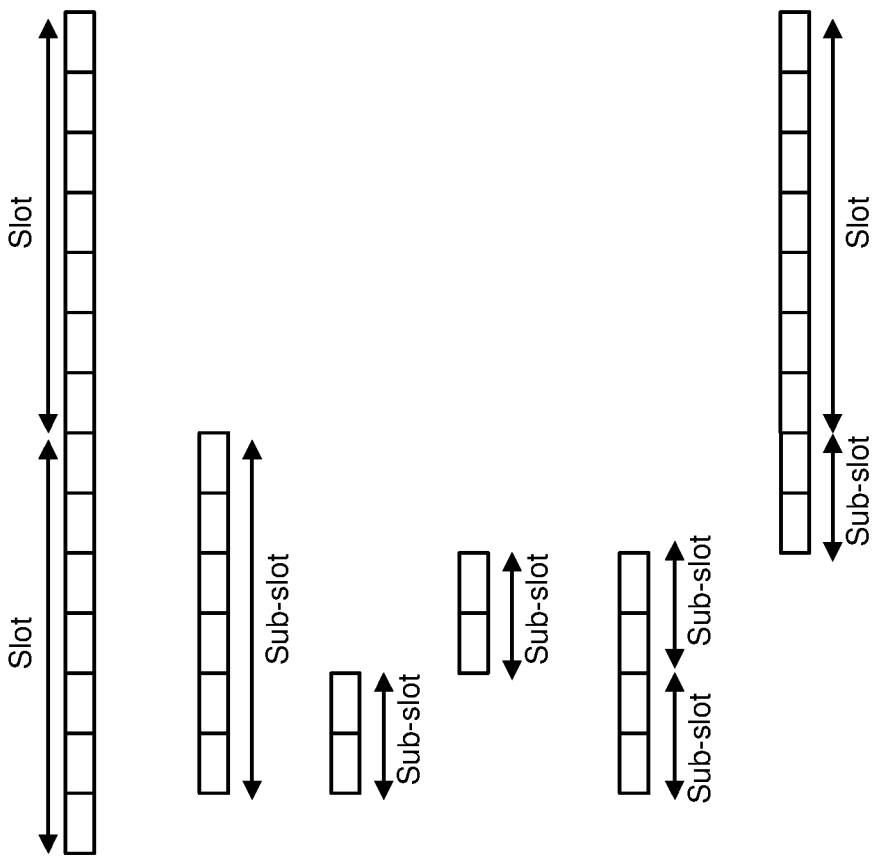

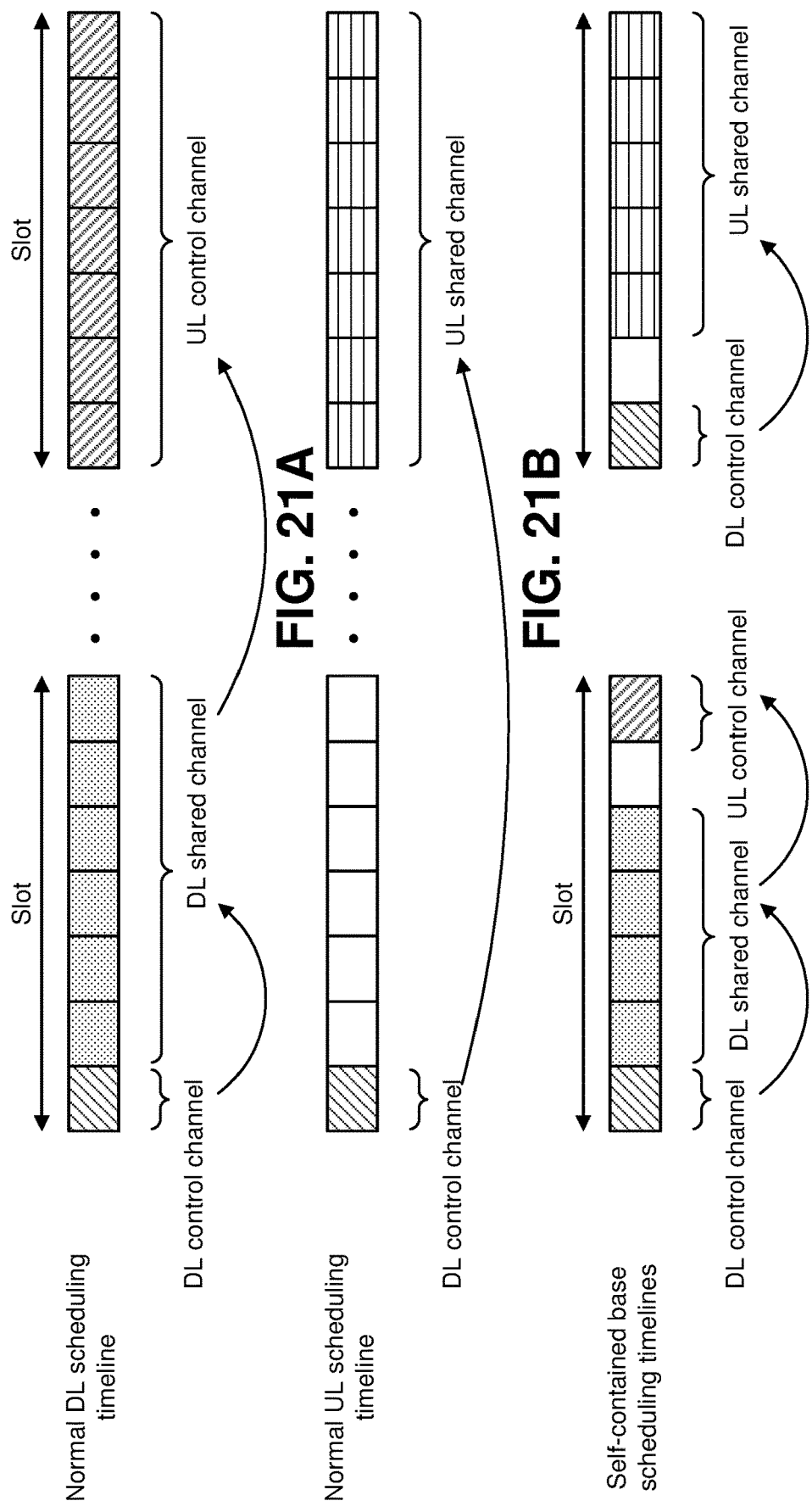

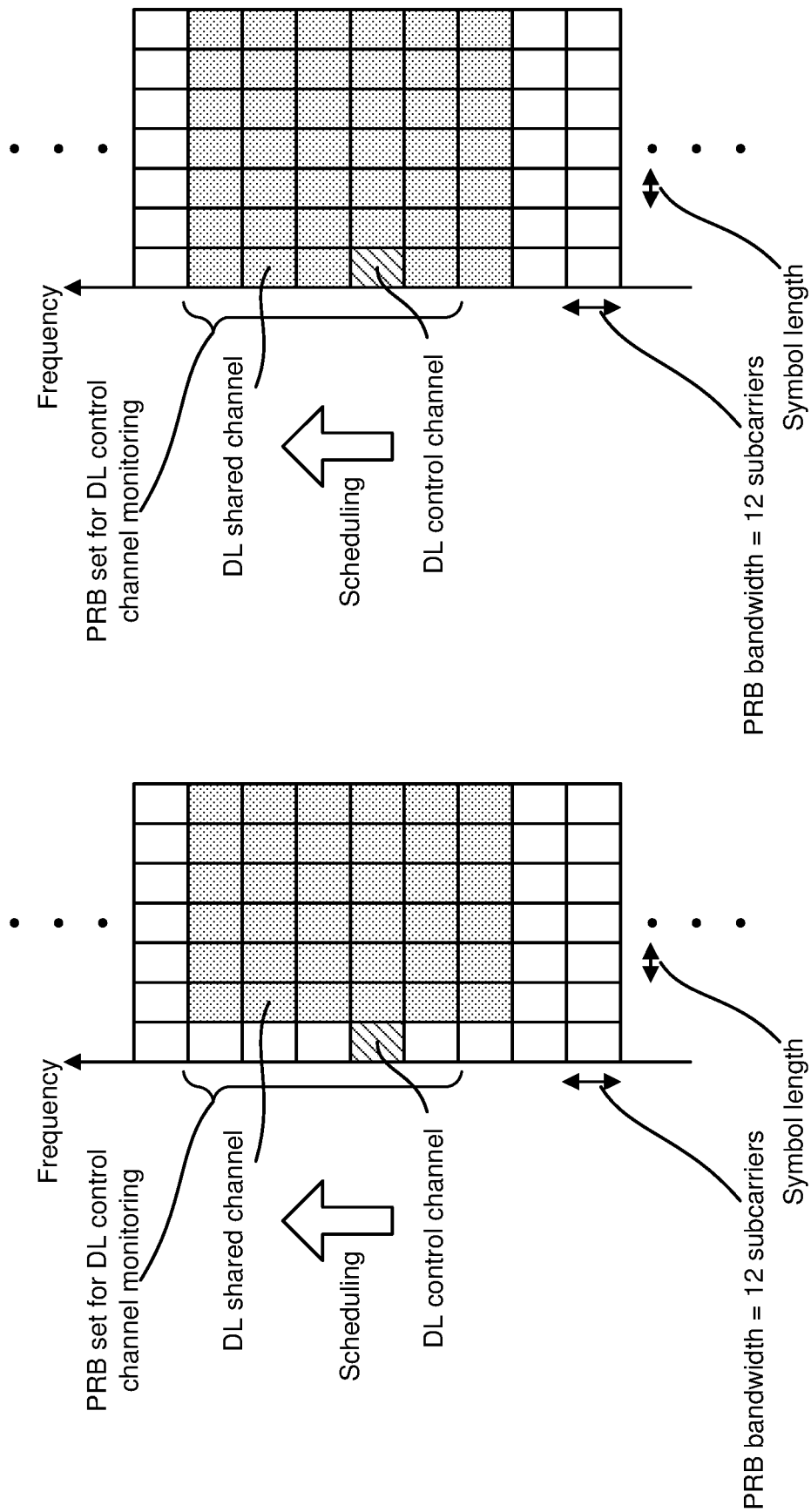

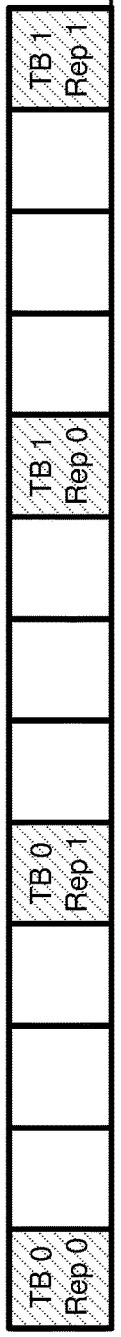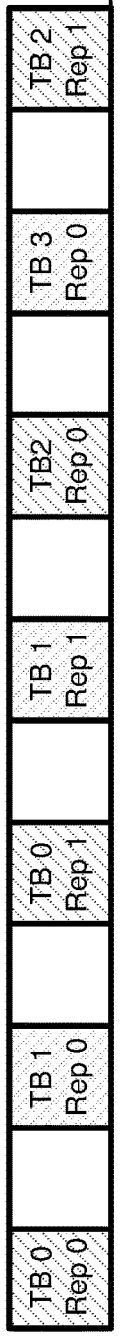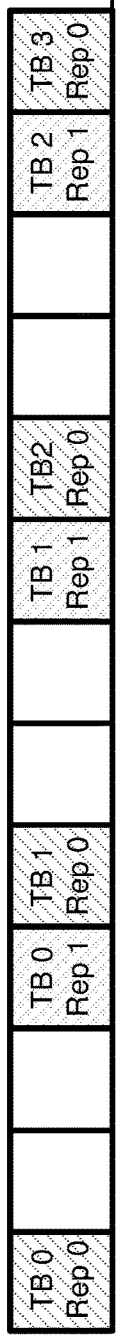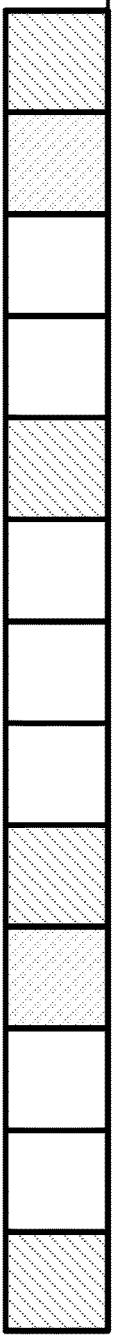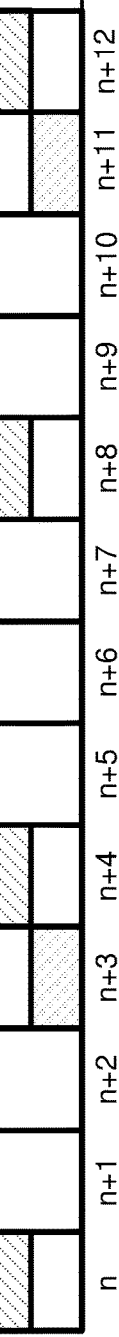

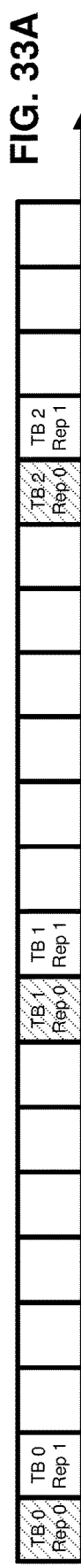
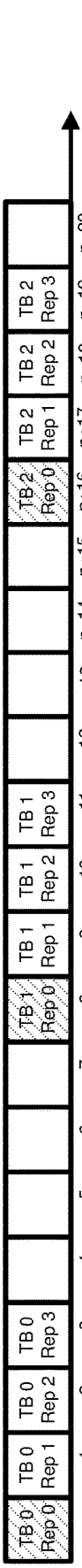
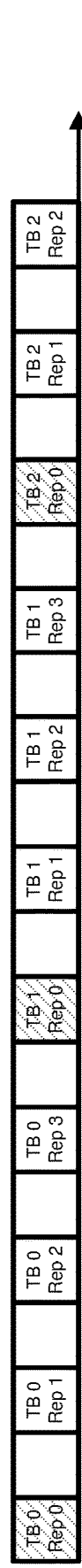
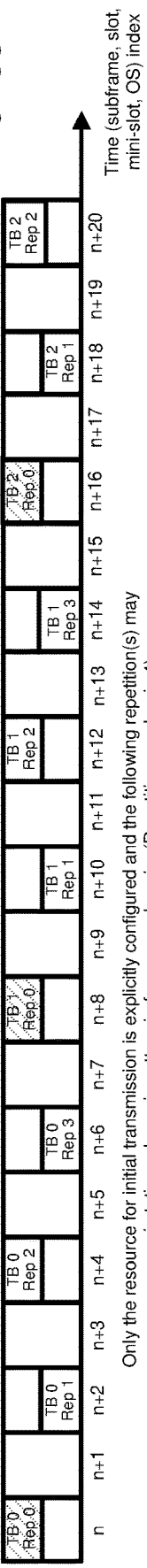

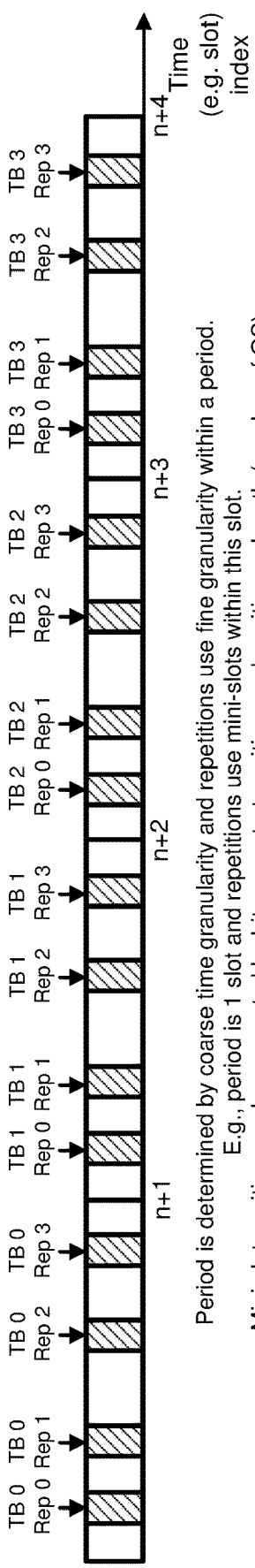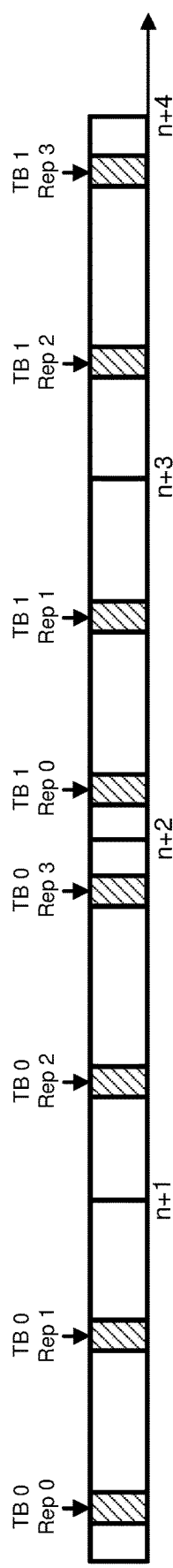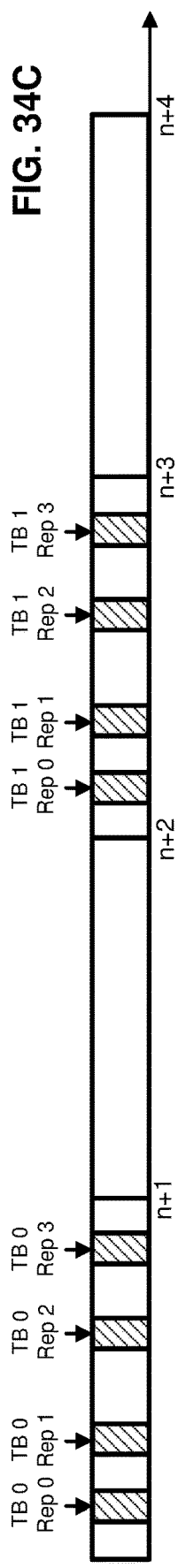

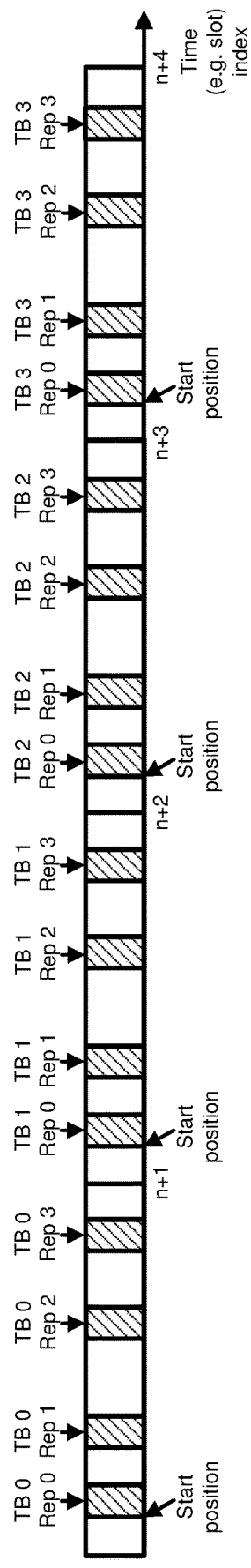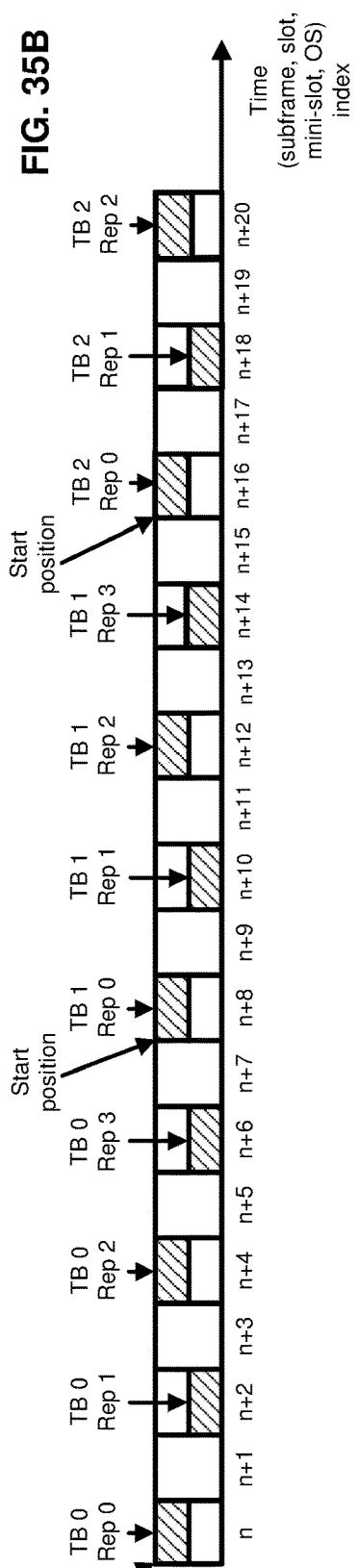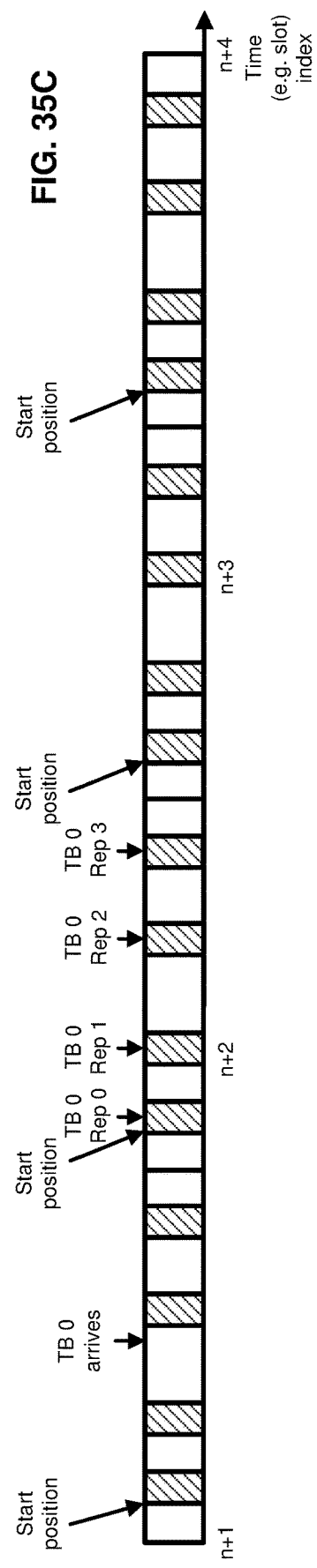

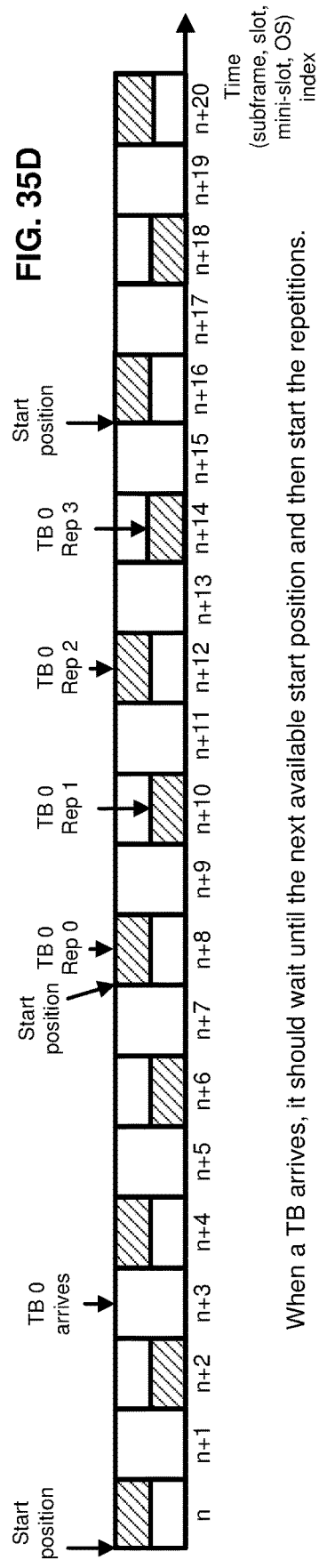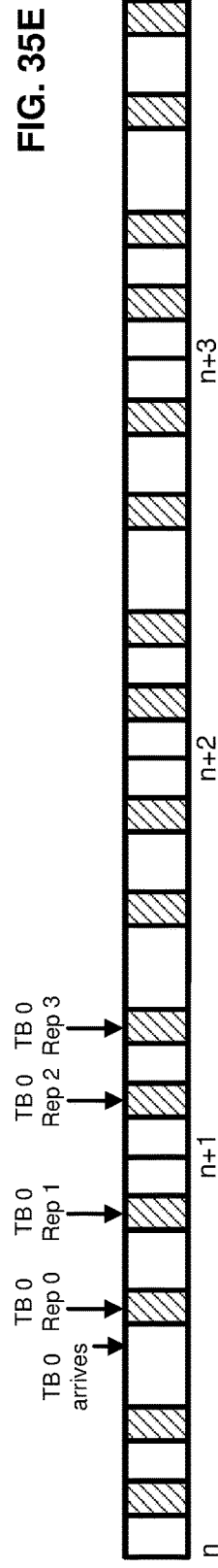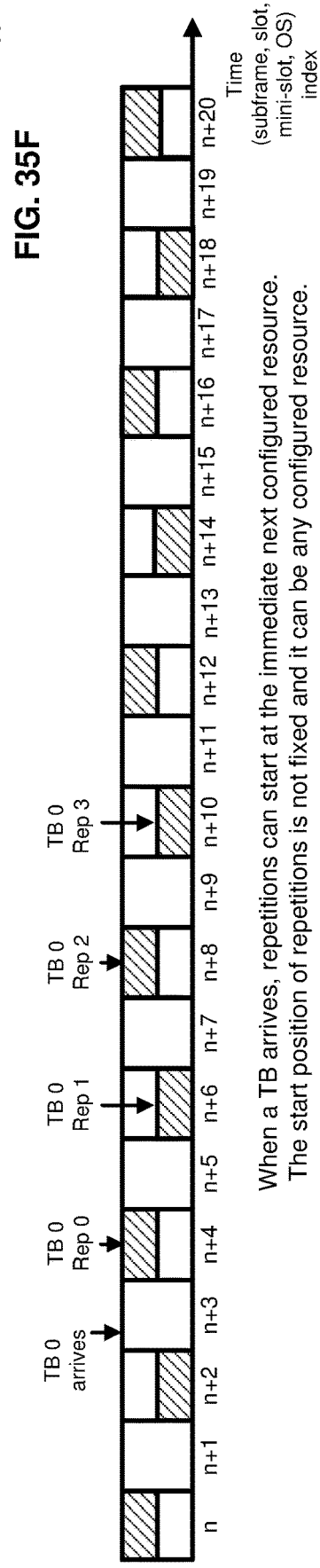

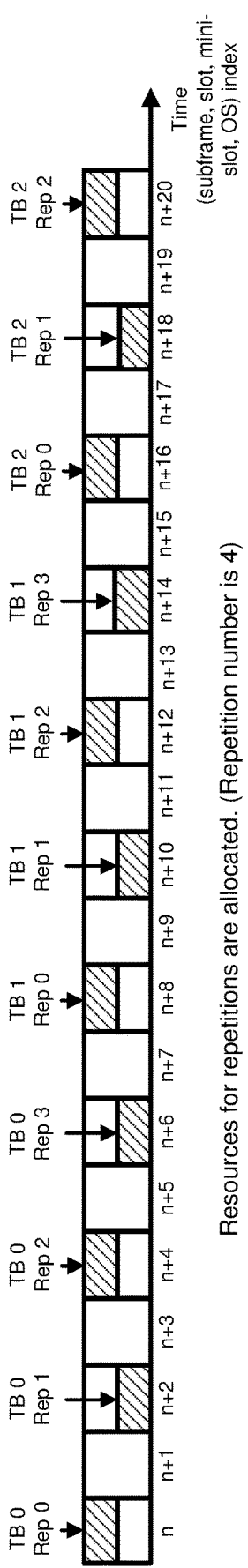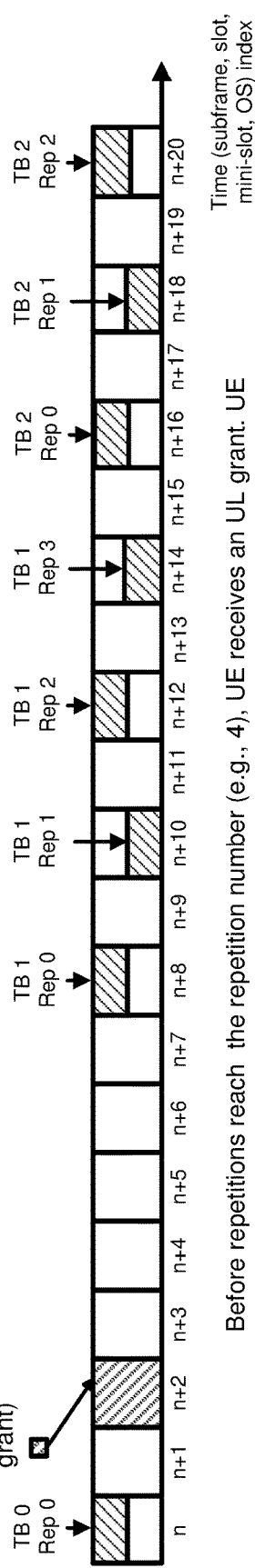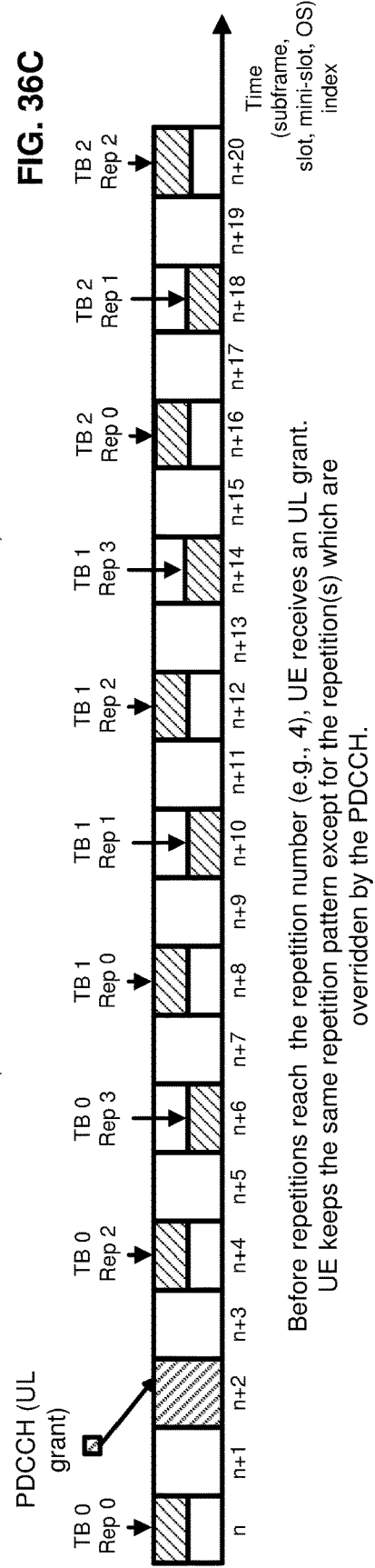

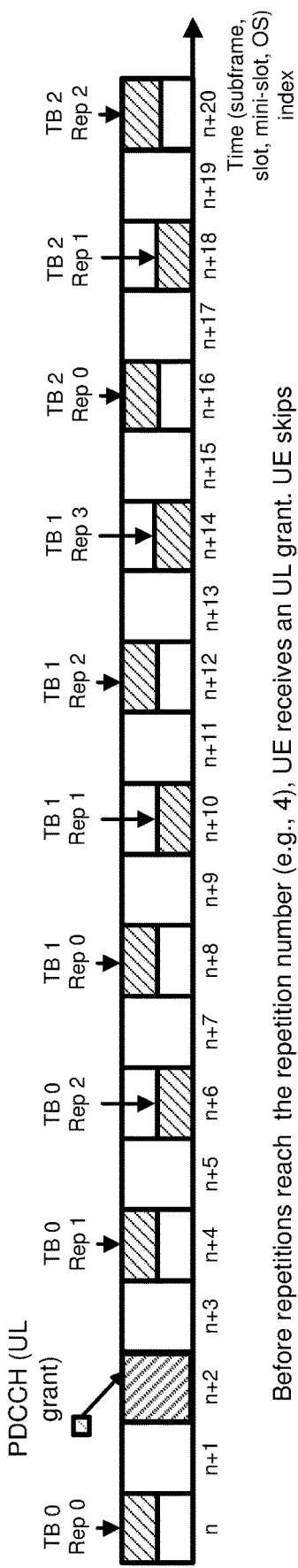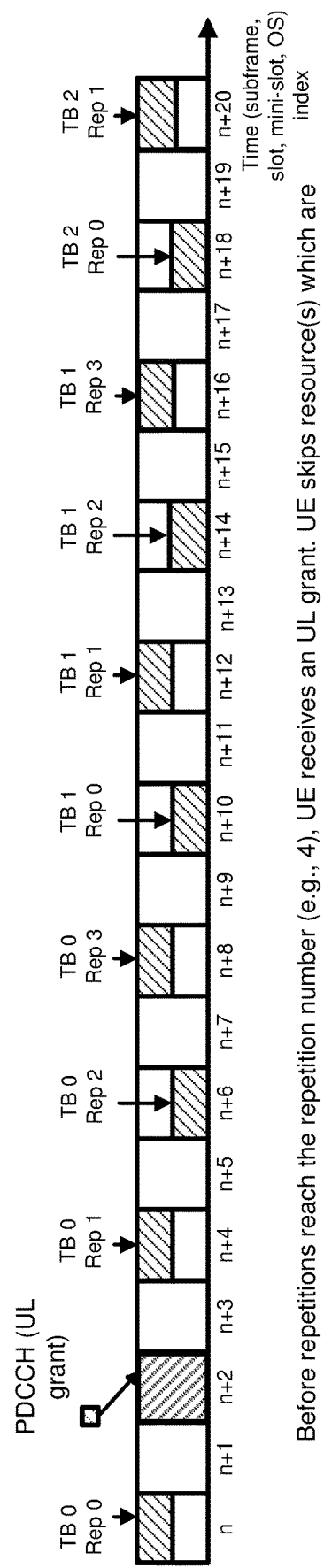

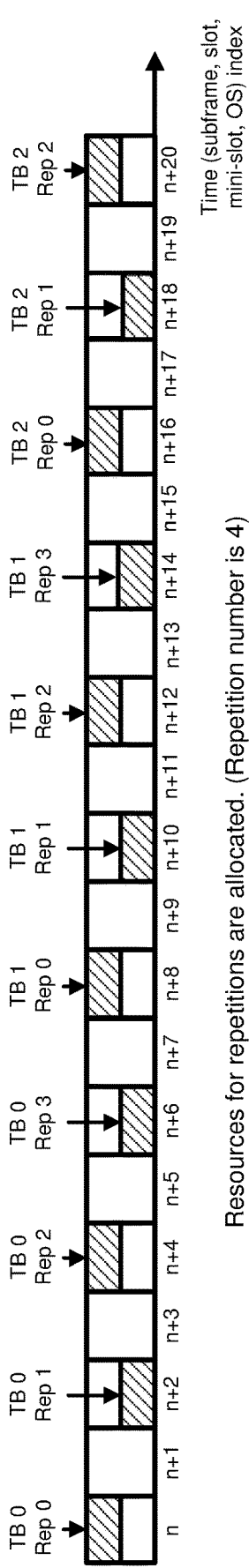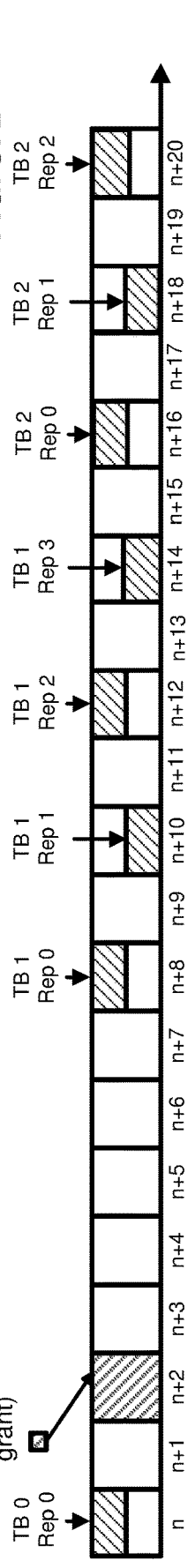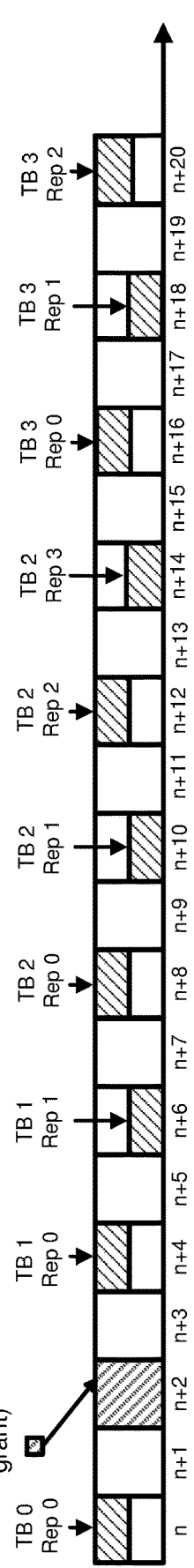

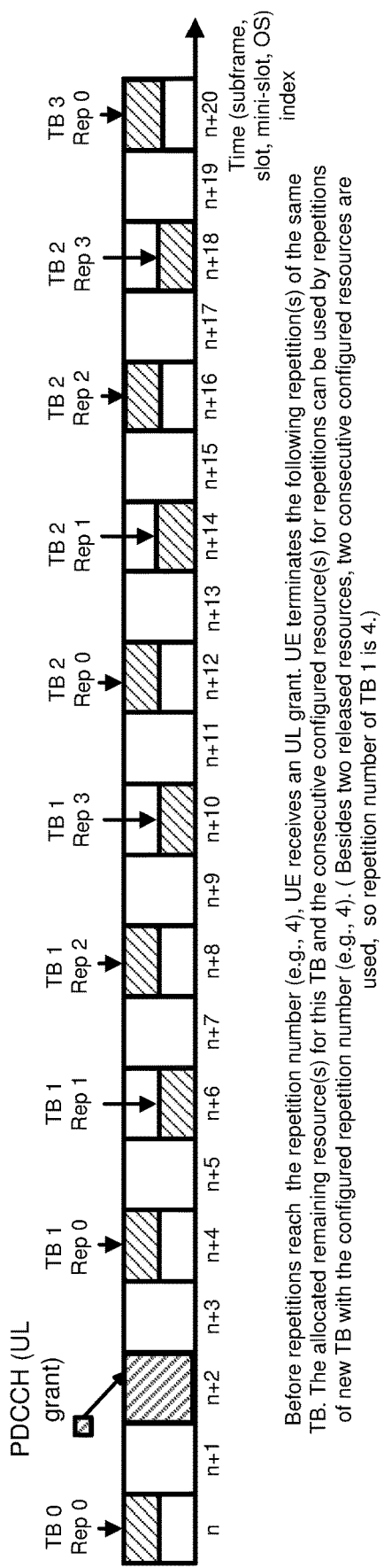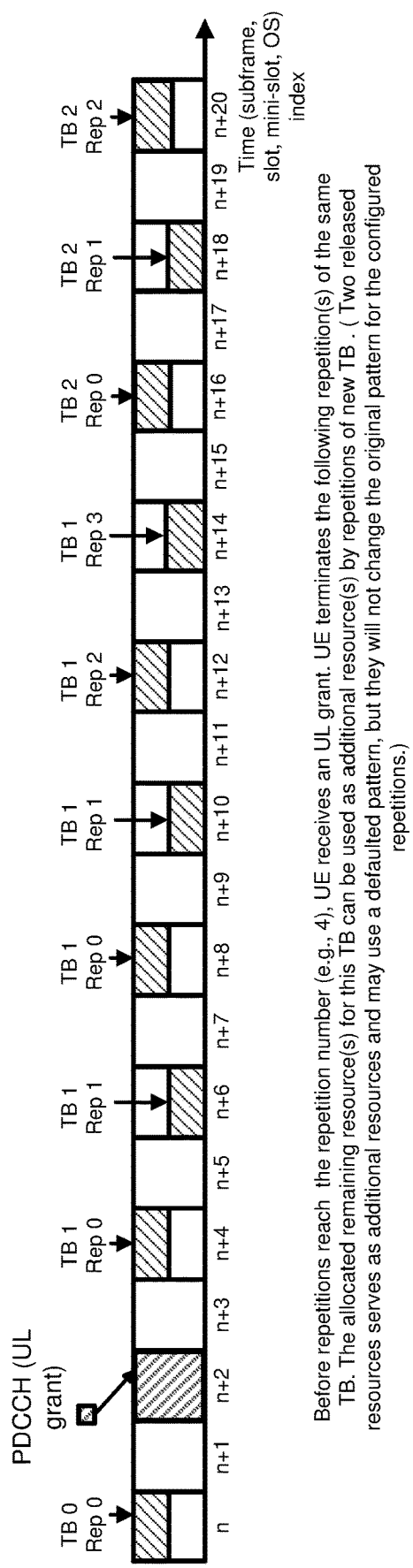

PROCEDURES, BASE STATIONS AND USER EQUIPMENTS FOR UPLINK TRANSMISSION WITHOUT GRANT

CROSS-REFERENCE TO RELATED APPLICATION(S)

The present application is a continuation of PCT Application No. PCT/US18/45873, filed on Aug. 8, 2018, entitled "PROCEDURES, BASE STATIONS AND USER EQUIPMENTS FOR UPLINK TRANSMISSION WITHOUT GRANT," which claims the benefit of and priority to U.S. Provisional Patent Application No. 62/543,917 filed on Aug. 10, 2017, entitled "PROCEDURES, BASE STATIONS AND USER EQUIPMENTS FOR UPLINK TRANSMISSION WITHOUT GRANT." The entire contents of all of the above applications are hereby expressly incorporated fully by reference into the present application.

FIELD

The present disclosure relates generally to communication systems. More specifically, the present disclosure relates to hybrid automatic repeat request (HARQ) for uplink ultra-reliable and low-latency communications (URLLC).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems, devices, and methods that improve communication flexibility and/or efficiency may be beneficial.

SUMMARY

The present disclosure is directed to procedures, base stations, and user equipments for uplink transmissions without grant.

In a first aspect of the present disclosure, a user equipment (UE) is described. The UE may include receiving circuitry configured to receive a Radio Resource Control (RRC) message including first information containing a frequency hopping mode, a periodicity (e.g., a number of slots), a repetition number, and a repetition enabler set as true.

The receiving circuitry may be configured to receive, from the RRC message, second information containing a plurality of physical uplink shared channel (PUSCH) resources (e.g., a bit map of mini-slots, a frequency hopping pattern) for repetitions within a period. The second information may contain a slot offset, a time domain allocation indicating a start symbol and a length, a frequency domain allocation, and a frequency hopping offset.

The UE may include processing circuitry configured to derive and/or determine, according to the first information and the second information, a reference (e.g., a time reference and/or a frequency reference) for the plurality of PUSCH resources for repetitions of a transport block (TB), where a first PUSCH resource of the first plurality of PUSCH resources is determined based on at least one of the periodicity, the slot offset, the time domain allocation, or the frequency domain allocation, and one or more remaining PUSCH resources of the first plurality of PUSCH resources are to use consecutive slots with one or more frequency resources derived from the frequency hopping offset.

The UE may include transmitting circuitry configured to transmit, on the first plurality of PUSCH resources, the repetitions of the TB, where the repetitions start on the first PUSCH resource or a second PUSCH resource associated with Redundancy Version (RV) 0.

The receiving circuitry may be configured to receive, on a physical downlink control channel (PDCCH) resource before the repetitions reach the repetition number, a third information configuring an uplink grant indicating a second plurality of PUSCH resources for the same TB or a new TB.

The transmitting circuitry may be configured to transmit, on the second PUSCH resource, the same TB according to the third information; stop the repetitions of the same TB on the remaining first plurality of PUSCH resources given by the second information within the same periodicity, and transmit, on the remaining first plurality of PUSCH resources given by the second information within the same period, repetitions of the new TB if there is the new TB to be transmitted; transmit, on the remaining first plurality of PUSCH resources given by the second information within the same periodicity, the repetitions of the same TB with a reset repetition counter; or continue to transmit, on the remaining PUSCH resources of the first plurality of PUSCH resources, the repetitions of the TB within the periodicity without any change.

In a second aspect of the present disclosure, a base station (e.g., an evolved node B (eNB) or a next generation node B (gNB)) is described. The base station may include transmitting circuitry configured to transmit an RRC message including first information containing a frequency hopping mode, a periodicity (e.g., a number of slots), a repetition number, and a repetition enabler set as true.

The transmitting circuitry may be configured to transmit, in the RRC message, second information containing a plurality of PUSCH resources (e.g., a bit map of mini-slots, a frequency hopping pattern) for repetitions within a period. The second information may contain a slot offset, a time domain allocation indicating a start symbol and a length, a frequency domain allocation, and a frequency hopping offset.

The base station may include receiving circuitry configured to receive repetitions of a TB on the first plurality of PUSCH resources, where the first plurality of PUSCH resources for the repetitions of the TB is determined based on the first information and the second information, where a first PUSCH resource of the first plurality of PUSCH resources is determined based on at least one of the periodicity, the slot offset, the time domain allocation, or the frequency domain allocation, and one or more remaining PUSCH resources of the first plurality of PUSCH resources are to use consecutive slots with one or more frequency resources derived from the frequency hopping offset, and where the repetitions of the TB start on the first PUSCH resource or a second PUSCH resource associated with Redundancy Version (RV) 0.

The transmitting circuitry may be configured to transmit, on a PDCCH resource before the repetitions reach the repetition number, a third information configuring an uplink grant indicating a second PUSCH resource for the same TB or a new TB.

The receiving circuitry may be configured to receive, on the second plurality of PUSCH resources, the same TB according to the third information; stop receiving the repetitions of the TB on the remaining PUSCH resources, and receive repetitions of a new TB within the periodicity on the remaining PUSCH resources of the first plurality of PUSCH resources; receive, on the remaining PUSCH resources of the first plurality of PUSCH resources, the repetitions of the TB within the periodicity with a reset repetition counter; or continue to receive, on the remaining PUSCH resources of the first plurality of PUSCH resources, the repetitions of the TB within the periodicity without any change.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIGS. 19A, 19B, 19C, and 19D show examples of subframe structures for the numerologies that are shown in FIG. 18;

FIGS. 20A, 20B, 20C, 20D, 20E, and 20F show examples of slots and sub-slots;

FIGS. 21A, 21B, 21C, and 21D show examples of scheduling timelines;

FIGS. 22A and 22B show examples of downlink (DL) control channel monitoring regions;

FIGS. 32A, 32B, 32C, 32D, and 32E show examples of repetition resources, in accordance with example implementations of the present application;

FIGS. 33A, 33B, 33C, and 33D show examples of configured resources for initial transmission and derived repetition resources, in accordance with example implementations of the present application;

FIGS. 34A, 34B, and 34C show examples of mini-slot based repetition resources, in accordance with example implementations of the present application;

FIGS. 35A, 35B, 35C, 35D, 35E, and 35F show examples of start positions of repetitions, in accordance with example implementations of the present application;

FIGS. 36A, 36B, 36C, 36D, and 36E show examples of impacted repetitions with UL grant received before indicated repetition number is reached and methods to handle the remaining repetitions, in accordance with example implementations of the present application;

FIGS. 37A, 37B, 37C, 37D, and 37E show examples of impacted repetitions with UL grant received before indicated repetition number is reached and methods to utilize the remaining repetition resources for a new transport block (TB), in accordance with example implementations of the present application;

DETAILED DESCRIPTION

Figure 1:
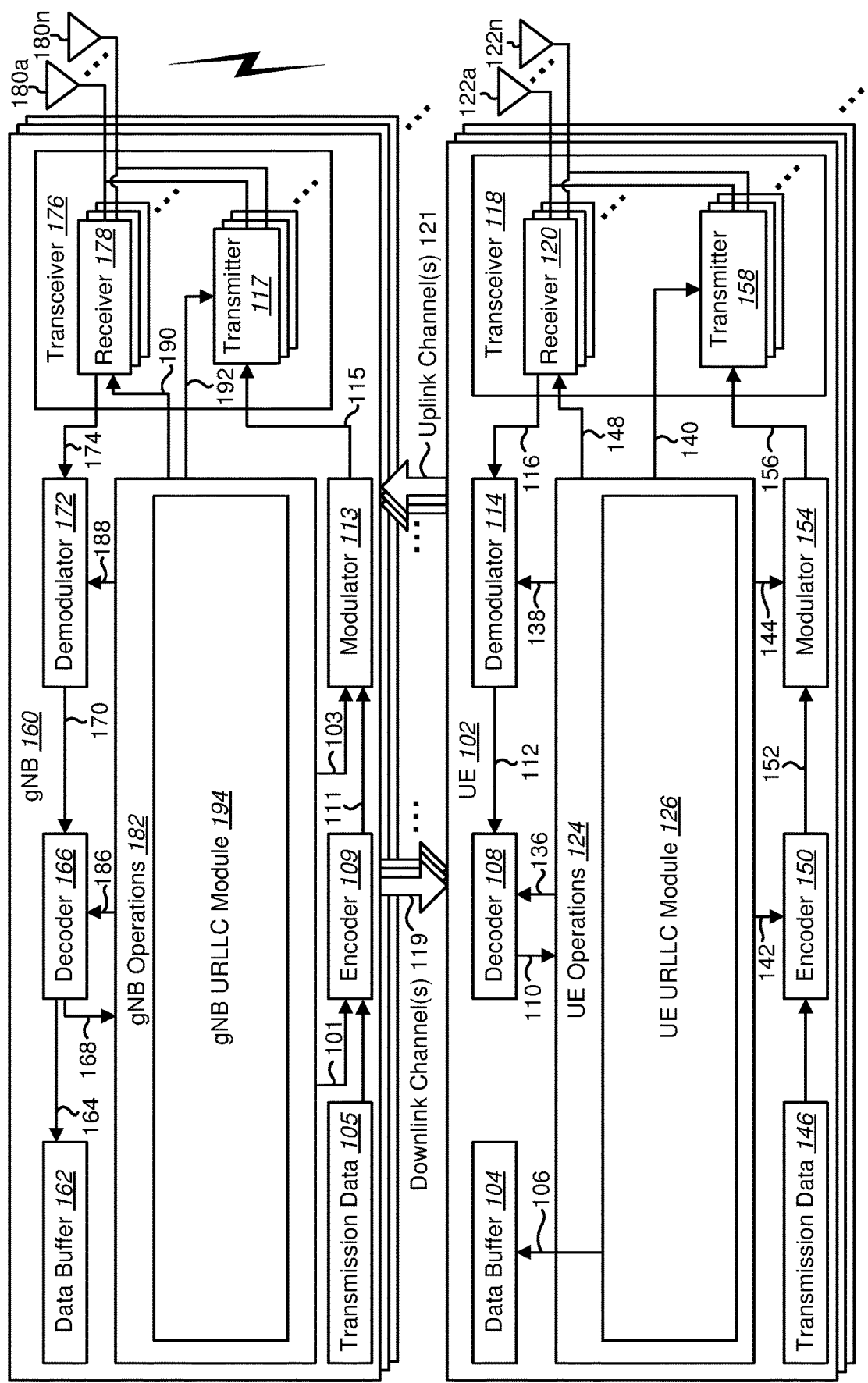
FIG. 1 is a block diagram illustrating one implementation of one or more gNBs and one or more UEs in which systems and methods for ultra-reliable and low-latency communication operations may be implemented.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio base station may be referred to as a gNB. A gNB may also be more generally referred to as a base station device.

Some configurations of the systems and methods described herein teach approaches for URLLC transmission/retransmission management to meet the latency/reliability requirement. Some requirements for URLLC relate to user (U)-plane latency and reliability. For URLLC, the target user plane latency is 0.5 milliseconds (ms) each way for both UL and DL. The target reliability is $1\text{-}10^5$ for X bytes within 1 milliseconds (ms).

These URLLC-specific constraints make the hybrid automatic repeat request (HARQ) and retransmission mechanism design difficult. For example, the receiver must reply with a quick acknowledgement (ACK) or negative acknowledgement (NACK) or an uplink grant to meet the latency requirement, or the transmitter can retransmit immediately without waiting for ACK/NACK to enhance the reliability. On the other, grant-based or grant-free repetitions are supported to further enhance the reliability. How to terminate the repetitions is also an important issue. The described systems and methods teach URLLC HARQ/retransmission design in different cases.

Some configurations of the systems and methods disclosed herein may provide a hybrid automatic repeat request (HARQ) mechanism design for uplink ultra-reliable and low-latency communications (URLLC).

URLLC UE may support several kinds of UL transmission in some implementations. Some potential kinds of supported UL transmissions are described as follows. One kind of UL transmission may be (a) a scheduling request-triggered uplink grant-based initial transmission. For example, when the UE has data to transmit and has no PUSCH resource, the UE may send out a scheduling request (SR) and wait for an UL grant from the gNB/eNB. Then, the UE may transmit the UL data by following the UL grant.

Another kind of UL transmission may be (b) a fast UL grant-based initial transmission. The gNB/eNB may send an UL grant to the UE without SR triggering. The fast grant can help minimize the waiting time. Then, the UE may transmit the UL data by following the UL grant.

Another kind of UL transmission may be (c) a grant-free initial transmission. The resource may be semi-statically (re-) configured for UL transmission. The UE may transmit UL data at the configured resource without waiting for an UL grant.

Another kind of UL transmission may be (d) a grant-based repetition(s). For an UL transmission scheme with grant, K repetitions including initial transmission (K>=1) for the same transport block may be supported. The repetition number K may be semi-statically (re-) configured or dynamically indicated by the UL grant. Then, the UE repeats K UL transmissions for the same transport block (TB) by following the UL grant. In other words, an UL grant can trigger multiple transmissions for the same TB.

Another kind of UL transmission may be (e) a grant-free repetition(s). For an UL transmission scheme without grant, K repetitions including initial transmission (K>=1) for the same transport block may be supported. The resource may be semi-statically (re-) configured for UL K repetitions. The resource configuration may include time and frequency resources, Modulation and Coding Scheme (MCS), Redundancy Version (RV), Reference Signal (RS) parameter, and/or repetition number K, etc. The UE may transmit K repetitions for the same UL data at the configured resource without waiting for an UL grant.

Another kind of UL transmission may be a (f) grant-based retransmission. If the gNB/eNB fails to decode the UL data from a UE, the gNB/eNB may send the UE an UL grant to indicate an UL retransmission of the same TB. Additional information in the UL grant may be needed to inform the UE whether the grant is for the same TB or a new TB. Then, the UE may transmit the UL data by following the UL grant.

Another kind of UL transmission may be a (g) grant-free retransmission. The UE may retransmit the same TB at a configured resource without waiting for the response (e.g., negative acknowledgment (NACK) or UL grant) from the gNB/eNB.

Another kind of UL transmission may be (h) an UL semi-persistent scheduling (SPS) transmission. For semi-static resource allocation (also referred to as semi-persistent scheduling, SPS), there may be several basic procedures: radio resource control (RRC) configuration (e.g., a RRC message, a RRC signal), activation, UL transmission and deactivation. The RRC configuration may be exchanged between the gNB/eNB and the UE through an RRC layer. And, the RRC signal may be included in a higher layer signal. Some of the parameters (e.g., periodicity, address, allocation, and MCS to be used in the SPS resources) may need to be configured for semi-persistent scheduling. Part of these parameters (e.g., periodicity, address) may be configured semi-statically (SPS Configuration), and the rest may be configured with PDCCH (SPS Activation). For example, the gNB/eNB may configure a periodicity (e.g., a time resource) by using the RRC signal, and indicate SPS resource (e.g., a frequency resource) by using DCI format for activation. After UL SPS is configured and activated, the UE has sufficient information of the location of the configured UL grant-free resources are reserved for fast uplink access. Then, the UE may start UL transmission. In Release 8, the UE keeps transmitting at the configured resources until UL SPS is deactivated explicitly and implicitly. In Release 14, the UE may transmit as needed and skip the configured resources when there is no transport block (TB) for transmission.

In some implementations, the transmission types above may overlap with each other. For example, transmission types (a), (b) and (f) may overlap. To a UE, these UL transmissions may be grant-based. The UE behavior following the UL grant can be the same and the PDCCH can use the same DCI format. If the UL grant is indicated for the same TB, the UL transmission is a retransmission. If the UL grant is indicated for a new TB, the UL transmission is an initial transmission.

In another example, transmission types (a), (b) and (d) (or (c) and (e)) may overlap. If the repetition number K=1, they may be equivalent.

In yet another example, transmission types (c) ((e), (g)) and (h) may overlap. The grant-free transmission may use the UL SPS scheme. In a special implementation, the grant-free transmission may use the UL SPS scheme without activation. For instance, all the required parameters for UL transmission may be RRC (re-)configured, and the UE may transmit at the configured resource without SPS activation.

In yet another example, transmission types (d), (e) and (g) may overlap. The repetition(s) followed by the initial transmission may belong to a grant-free retransmission.

For URLLC, the UE may have one or more kinds of Radio Network Temporary Identifiers (RNTIs). The RNTI may be used to scramble the cyclic redundancy check (CRC) part of the radio channel messages. This implies that if the UE does not know the exact RNTI values for each of the cases, the UE cannot decode the radio channel messages. Examples of RNTIs that may be utilized by a UE are given as follows. One example is a Cell RNTI (C-RNTI). Here, the C-RNTI herein may be assumed to be included in a RNTI "A" in some implementations for the sake of simple description. The C-RNTI may be used for dynamic scheduled unicast transmission. Another example is a SPS C-RNTI. The SPS C-RNTI may be used for semi-persistent scheduled unicast transmission (activation, reactivation, retransmission, and/or deactivation). Here, the SPS C-RNTI herein may be assumed to be included in a RNTI "B" in some implementations for the sake of simple description. Yet another example is a URLLC C-RNTI. For URLLC, the UE may reuse the C-RNTI and the SPS C-RNTI, which means no specific C-RNTI may be issued for URLLC. In a different implementation, a URLLC-specific identification called URLLC C-RNTI (the specification may use a different name, here "URLLC C-RNTI" is used as an example) may be used for URLLC related transmission. The URLLC C-RNTI may be used for dynamic scheduled transmission. Additionally or alternatively, the URLLC C-RNTI may be used for semi-persistent scheduled URLLC transmission (activation, reactivation, retransmission, and/or deactivation). Also, the URLLC C-RNTI may be used for dynamic reconfiguration of UL grant-free URLLC transmission. Here, the URLLC C-RNTI herein may be assumed to be included in a RNTI "C" in some implementations for the sake of simple description.

Here, the UE may monitor a set of candidates of the DL control channel(s) (e.g., the PDCCH). For example, the candidates of DL control channel(s) may be candidates for which the DL control channel(s) may possibly be mapped, assigned, and/or transmitted. For example, a candidate of the DL control channel(s) is composed of one or more control channel elements (CCEs). The term "monitor" means that the UE attempts to decode each DL control channel(s) in the set of candidates of the DL control channel(s) in accordance with all the DCI format(s) to be monitored.

The set of candidates of the DL control channel(s) which the UE monitors may be also referred to as a search space (e.g., DL control channel set, etc.). That is, the search space is a set of resource(s) that may possibly be used for transmission of the DL control channel(s).

Here, a common search space (CSS) and a user-equipment search space (USS) are set (or defined, configured) in a region(s) of DL control channel(s) (e.g., the DL control channel monitoring regions). For example, the CSS may be used for transmission of DCI to a plurality of the UEs. That is, the CSS may be defined by a resource common to a plurality of the UEs. For example, the CSS is composed of CCEs having numbers that are predetermined between the gNB and the UE. For example, the CSS is composed of CCEs having indices 0 to 15. Also, the gNB may configure (by using the PBCH (e.g., the MIB), the PDSCH (i.e., the SIB), and/or the dedicated RRC message) the CSS (e.g., the region of the CSS).

Here, the CSS may be used for transmission of DCI to a specific UE. That is, the gNB may transmit, in the CSS, DCI format(s) intended for a plurality of the UEs and/or DCI format(s) intended for a specific UE.

The USS may be used for transmission of DCI to a specific UE. That is, the USS is defined by a resource dedicated to a certain UE. That is, the USS may be defined independently for each UE. For example, the USS may be composed of CCEs having numbers that are determined based on a Radio Network Temporary Identifier (RNTI), a slot number in a radio frame, an aggregation level, and/or the like. The RNTI(s) may be assigned (i.e., configured) by the gNB. Namely, each of the USSs corresponding to each of the RNTI(s) described below may be defined. Also, for example, the gNB may configure (by using the PBCH (e.g., the MIB), the PDSCH (e.g., the SIB), and/or the dedicated RRC message) the USS (e.g., the region of the USS). Also, the gNB may transmit, in the USS, DCI format(s) intended for a specific UE.

Here, the RNTI(s) assigned to the UE may be used for transmission of DCI (transmission of DL control channel(s)). Specifically, CRC (Cyclic Redundancy Check) parity bits (also referred to simply as CRC), which are generated based on DCI (or the DCI format, and/or the UL grant), are attached to DCI, and, after attachment, the CRC parity bits are scrambled by the RNTI(s). The UE may attempt to decode DCI to which the CRC parity bits scrambled by the RNTI(s) are attached, and detects a DL control channel (e.g., the PCCH (e.g., the PDCCH), the DCI, the DCI format). That is, the UE may decode the DL control channel(s) with the CRC scrambled by the RNTI(s). That is, the UE may monitor the DL control channel(s) with the RNTI(s). Namely, for example, the UE may monitor the UL grant with the RNTI(s).

Namely, some types of UL data transmissions (e.g., PUSCH transmissions), such as those described as from (a) to (h) may be instructed by the gNB. For example, the gNB may instruct some types of UL data transmission by using the different method as above described. Namely, for example, different RNTIs may be used for identifying the instructions for the different types of UL data transmissions. Also, different DCI formats (i.e., the different UL grants) may be used for identifying the instructions for the different types of UL data transmissions. Also, the different physical downlink channels may be used for identifying the instructions for the different types of UL data transmissions. Also, different periodicities for UL data transmission may be used for identifying the instruction for the different types of UL data transmission. Also, different values of DCI (i.e., different values to which a field(s) of DCI is set) included in the DCI format may be used for identifying the instruction for the different types of UL data transmissions. Also, different activation methods (i.e., different activation commands) for UL data transmission (e.g., different RNTIs may be used for the different activation method and/or different values of DCI may be used for different activation command) may be used for identifying the instructions for the different types of UL data transmission. Also, different HARQ process IDs (i.e., a different number of a HARQ process) may be used for identifying the instructions for the different types of UL data transmission. Also, the different RRC configuration and/or the different DCI indication may be used for identifying the instructions for the different types of UL data transmission.

As one example, a first UL data transmission, a second UL data transmission, and a third UL data transmission may be described. Here, as one example, the first UL data transmission, the second UL data transmission, and the third UL data transmission are described herein, and other types of UL data transmissions, such as those described from (a) to (h) may not be precluded.

For example, the first UL data transmission (the initial transmission and/or the retransmission) may be instructed by using a first UL grant. And, the first UL grant may be used for scheduling of a first PUSCH. For example, the UE monitors the first UL grant in the search space(s) (i.e., the UE-specific search space and/or the common search space) on the primary cell and in the space(s) on the secondary cell. For example, the first UL grant may be the UL grant with a first RNTI. Here, the first RNTI may be the C-RNTI. For example, the first RNTI may be included in the RRC message used to request the re-establishment of an RRC connection. Also, for example, the first RNTI may be transmitted together with a physical cell identifier. Also, the first RNTI may be included in the RRC message used for network controlled mobility (e.g., the RRC message includes parameters relevant for network controlled mobility (i.e., a mobility control)). Also, the first UL grant may be different from a second UL grant, a third UL grant, and/or a fourth UL grant. Also, the first UL grant may be the same as the second UL grant, the third UL grant, and/or the fourth UL grant. Also, the first UL grant may include DCI indicating a starting position(s) of a time resource of the PUSCH and/or DCI indicating an ending positions(s) of time resource of the PUSCH. Also, the first UL grant may include DCI indicating the HARQ process ID. Namely, the first UL grant may be used for scheduling of more than two symbols (i.e., a subframe, a slot, a sub-slot (i.e., mini-slot), and/or a symbol) of PUSCH. For example, the first UL grant may be used for dynamically scheduling of the PUSCH (e.g., dynamically PUSCH scheduling of eMBB data transmission).

Also, for example, the second UL data transmission (the initial transmission and/or the retransmission) may be instructed by using a second UL grant. And, the second UL grant may be used for scheduling of a second PUSCH. For example, the UE monitors the second UL grant in the search space(s) (i.e., the UE-specific search space and/or the common search space) only on the primary cell. For example, the second UL grant may be the UL grant with a second RNTI. Here, the second RNTI may be the SPS C-RNTI. For example, the second RNTI may be included in the RRC message used to specify the semi-persistent configuration. For example, the second RNTI may be transmitted together with the interval of semi-persistent scheduling (e.g., the subframe and/or slot based interval of semi-persistent scheduling). Also, the second UL grant may be different from the first UL grant, the third UL grant, and/or the fourth UL grant. Also, the second UL grant may be the same as the first UL grant, the third UL grant, and/or the fourth UL grant. Here, the second UL grant may be used for activating and/or deactivating (e.g., releasing) of SPS (SPS resource). Also, the second UL grant may include DCI indicating the HARQ process ID. For example, the second UL data transmission may be scheduled by using the RRC configuration (e.g., the configuration of the interval (e.g., the subframe and/or the slot based interval of the semi-persistent scheduling)) and the second UL grant (i.e., the activation command). Namely, the second UL grant may be used for scheduling of more than two symbols (i.e., a subframe, a slot, a sub-slot (i.e., mini-slot), and/or a symbol) of PUSCH. Namely, the second UL grant may be used for semi-persistently scheduling of the PUSCH (e.g., semi-persistently PUSCH scheduling of SPS data transmission (e.g., UL-SCH transmission)).

Also, for example, the third UL data transmission (the initial transmission, the retransmission, and/or the repetition) may be instructed by using a third UL grant. And, the third UL grant may be used for scheduling of a third PUSCH. For example, the UE monitors the third UL grant in the search space(s) (i.e., the UE-specific search space and/or the common search space) on the primary cell and in the space(s) on the secondary cell. Here, the third UL grant may be the UL grant with a third RNTI. For example, the third RNTI may be the URLLC C-RNTI. Also, the third RNTI may be the C-RNTI. Also, the third RNTI may be the SPS C-RNTI. Namely, the third RNTI may be included in the RRC message used to request the re-establishment of an RRC connection. Also, the third RNTI may be transmitted together with a physical cell identifier. Also, the third RNTI may be included in the RRC message used for network controlled mobility. Also, the third RNTI may be included in the RRC message used to specify the semi-persistent configuration. For example, the third RNTI may be transmitted together with the interval of semi-persistent scheduling (e.g., the slot, the sub-slot (i.e., the mini-slot) and/or the symbol based interval of semi-persistent scheduling). Also, the third UL grant may be different from a first UL grant, a second UL grant, and/or a fourth UL grant. Also, the third UL grant may be the same as the first UL grant, the second UL grant, and/or the fourth UL grant. For example, in a case that the C-RNTI and/or the SPS C-RNTI is used for the third RNTI, each of one or more first predetermined fields included in the third UL grant may be set to each of first predetermined values for identifying the third UL grant. Here, the each of one or more first predetermined fields and/or the each of one or more first predetermined values may be defined, in advance, by the specification, and known information between the gNB and the UE. Namely, the third UL grant may be used for scheduling of equal to or less than two symbols (i.e., a sub-slot (i.e., mini-slot) and/or a symbol) of PUSCH. Also, the third UL grant may include DCI indicating the HARQ process ID. For example, the third UL grant may be used for dynamic grant-based scheduling of the PUSCH (e.g., grant-based PUSCH scheduling of URLLC data transmission).

Also, for example, the fourth UL data transmission (the initial transmission, the retransmission, and/or the repetition) may be instructed by using a fourth UL grant. And, the fourth UL grant may be used for scheduling of a fourth PUSCH. For example, the UE monitors the fourth UL grant in the search space(s) (i.e., the UE-specific search space and/or the common search space) on the primary cell and in the space(s) on the secondary cell. Here, the fourth UL grant may be the UL grant with a fourth RNTI. For example, the fourth RNTI may be the SPS C-RNTI. Also, the fourth RNTI may be the C-RNTI. Also, the fourth RNTI may be the URLLC C-RNTI. Namely, the fourth RNTI may be included in the RRC message used to request the re-establishment of an RRC connection. Also, the fourth RNTI may be transmitted together with a physical cell identifier. Also, the fourth RNTI may be included in the RRC message used for network controlled mobility. Also, the fourth RNTI may be included in the RRC message used to specify the semi-persistent configuration. For example, the fourth RNTI may be transmitted together with the interval of semi-persistent scheduling (e.g., the slot and/or symbol based interval of semi-persistent scheduling). Also, the fourth UL grant may be different from the first UL grant, the second UL grant, and/or the third UL grant. Also, the fourth UL grant may be the same as the first UL grant, the second UL grant, and/or the third UL grant. Here, the fourth UL grant may be used for activating and/or deactivating (e.g., releasing) of SPS (SPS resource). For example, the fourth UL data transmission may be scheduled by using the RRC configuration (e.g., the configuration of the interval (e.g., subframe, slot, and/or slot based interval of the semi-persistent scheduling, and/or URLLC semi-persistent scheduling) and the fourth UL grant (i.e., the activation command). For example, in a case that the C-RNTI and/or the SPS C-RNTI is used for the fourth RNTI, each of one or more second predetermined fields included in the fourth UL grant may be set to each of second predetermined values for identifying the fourth UL grant. Here, the each of one or more second predetermined fields and/or the each of one or more second predetermined values may be defined, in advance, by the specification, and known information between the gNB and the UE. Namely, the fourth UL grant may be used for scheduling of equal to or less than two symbols (i.e., a sub-slot (i.e., mini-slot), and/or a symbol) of the PUSCH. Also, the fourth UL grant may include DCI indicating the HARQ process ID. For example, the fourth UL grant may be used for semi-persistent grant-free scheduling of the PUSCH (e.g., grant-free PUSCH scheduling of URLLC data transmission).

And, as described above, the first UL data transmission, the second UL data transmission, the third UL data transmission, and/or the fourth UL data transmission may be overlapped in a certain timing (e.g., in a subframe, in a slot, in a sub-slot (i.e., a mini-slot), and/or in a symbol). Namely, the first UL data transmission, the second UL data transmission, the third UL data transmission, and/or the fourth UL data transmission may occur in a certain same timing. And, in a case that the first UL data transmission, the second UL data transmission, the third UL data transmission, and/or the fourth UL data transmission would occur in the certain same timing, the second UL data transmission, the third UL data transmission, and/or the fourth UL data transmission may be prioritized. Here, as described above, a time length of the first UL data transmission, the second UL data transmission, the third UL data transmission, and/or the fourth UL data transmission may be different. Therefore, the meaning of the overlapped may be a partially overlapped in the certain same timing.

For example, in a case that the first UL data transmission and the second UL data transmission would occur in the certain timing (i.e., in the certain same timing), the UE may perform only the first UL data transmission using the first PUSCH in the certain timing. Namely, the second UL data transmission may be dropped. Also, in a case that the first UL data transmission and the second UL data transmission would occur in the certain same timing, the UE may perform only the second UL data transmission using the second PUSCH in the certain timing. Namely, the first UL data transmission may be dropped. Also, in a case that the first UL data transmission and the second UL data transmission would occur in the certain same timing, the UE may perform the first UL data transmission and the second UL data transmission using the first PUSCH in the certain timing.

Also, in a case that the first UL data transmission and the second UL data transmission would occur in the certain same timing, the UE may perform the first UL data transmission and the second UL data transmission using the second PUSCH in the certain timing. Here, the gNB may transmit, (e.g., by using the RRC message), information used for configuring (i.e., indicating) that whether a simultaneous transmission (i.e., a concurrent transmission) of the first UL data (i.e., the first PUSCH transmission) and the second UL data (i.e., the second PUSCH transmission) is allowed or not in the certain timing. Namely, in a case that the UE is configured with the simultaneous transmission of the first UL data and the second UL data, the UE may perform the first UL data transmission and the second UL data transmission in the certain timing. Also, the gNB may transmit (e.g., by using the RR message) information used for configuring which UL data transmission is performed (e.g., which UL data transmission is prioritized). For example, the gNB may configure the UE to perform the first UL data transmission. Also, for example, the gNB may configure the UE to perform the second UL data transmission. And, in a case that the UE is configured with the first UL data transmission and/or the second UL data transmission, the UE may perform the first UL data transmission and/or the second UL data transmission (e.g., by using the first PUSCH and/or the second PUSCH).

Namely, in the certain timing where the second PUSCH is scheduled, if the first PUSCH is scheduled in the certain timing, the first UL grant may override the second PUSCH for the certain timing. And, the UE may perform the first UL data transmission and/or the second UL data transmission using the first PUSCH in the certain timing. Also, in the certain timing where the first PUSCH is scheduled, if the second PUSCH is scheduled in the certain timing, the second UL grant may override the second PUSCH for the certain timing. And, the UE may perform the first UL data transmission and/or the second UL data transmission using the second PUSCH in the certain timing. Also, the gNB may transmit (e.g., by using the RR message) information used for configuring which PUSCH is used (e.g., which PUSCH is prioritized) for the UL data transmission (e.g., the first UL data transmission and/or the second UL data transmission). For example, the gNB may configure the UE to use the first PUSCH. Also, for example, the gNB may configure the UE to use the second PUSCH. And, in a case that the UE is configured with the first PUSCH, the UE may perform the first UL data transmission and/or the second UL data transmission using the first PUSCH. Also, in a case that the UE is configured with the second PUSCH, the UE may perform the first UL data transmission and/or the second UL data transmission using the second PUSCH.

Here, as one example, the case where the first UL data transmission (i.e., the first PUSCH) and the second UL data transmission (i.e., the second PUSCH) is described above. However, the descriptions may be applied to all combination(s) of the first UL data transmission (i.e., the first PUSCH), the second UL data transmission (i.e., the second PUSCH), the third UL data transmission (i.e., the third PUSCH), and/or the fourth UL data transmission (i.e., the fourth PUSCH). Namely, for example, the above descriptions may be applied to the first UL data transmission (i.e., the first PUSCH) and the third UL data transmission (i.e., the third PUSCH). Namely, the second UL data transmission may be replaced by the third UL data transmission, and the second PUSCH may be replaced by the third PUSCH. Also, for example, the above descriptions may be applied to the first UL data transmission (i.e., the first PUSCH) and the fourth UL data transmission (i.e., the fourth PUSCH). Namely, the second UL data transmission may be replaced by the fourth UL data transmission, and the second PUSCH may be replaced by the fourth PUSCH. Also, for example, the above descriptions may be applied to the second UL data transmission (i.e., the second PUSCH) and the third UL data transmission (i.e., the third PUSCH). Namely, the first UL data transmission may be replaced by the second UL data transmission, the first PUSCH may be replaced by the second PUSCH, the second UL data transmission may be replaced by the third UL data transmission, and the second PUSCH may be replaced by the third PUSCH. Also, for example, the above descriptions may be applied to the second UL data transmission (i.e., the second PUSCH) and the fourth UL data transmission (i.e., the fourth PUSCH). Namely, the first UL data transmission may be replaced by the second UL data transmission, the first PUSCH may be replaced by the second PUSCH, the second UL data transmission may be replaced by the fourth UL data transmission, and the second PUSCH may be replaced by the fourth PUSCH. Also, for example, the above descriptions may be applied to the third UL data transmission (i.e., the third PUSCH) and the fourth UL data transmission (i.e., the fourth PUSCH). Namely, the first UL data transmission may be replaced by the third UL data transmission, the first PUSCH may be replaced by the third PUSCH, the second UL data transmission may be replaced by the fourth UL data transmission, and the second PUSCH may be replaced by the fourth PUSCH.

As described above, the UE may monitor one or more search spaces. The search space may be treated as a set of PDCCH candidates. Examples of search spaces that may be utilized in accordance with the systems and methods disclosed herein are given as follows. One example is the common search space. The common search space may contain some information related to URLLC. Another example is the UE-specific search space. In some approaches, there may be no URLLC-specific search space, or URLLC may share the same UE-specific search space with other services. To obtain URLLC related information, the UE may search the UE-specific search space by using the URLLC C-RNTI (if implemented, for example) or the C-RNTI/the SPS C-RNTI (if no URLLC-specific RNTI is implemented, for example). Yet another example is a URLLC search space. The URLLC may have a specific search space, which may be referred to as a URLLC search space (as an example, the specification may use a different name, for instance). The UE may obtain URLLC related information by searching the URLLC search space. In other examples, any combination of the above search spaces may be implemented and/or used.

Namely, as described above, for example, the search space (e.g., the USS) may be composed of CCEs having numbers that are determined based on the RNTI(s), the slot number in the radio frame, the aggregation level, and/or the like. Here, the search space determined based on the RNTI(s), the slot number in the radio frame, the aggregation level, and/or the like may include the CSS. Namely, the search space may be given by the RNTI(s). For example, a first search space (e.g., a first USS and/or a first CSS) given by the RNTI "A" may be defined. Also, a second search space (e.g., a second USS and/or a second CSS) given by the RNTI "B" may defined. Also, a third search space (e.g., a third USS and/or a third CSS) given by the RNTI "C" may be defined.

For example, the UE may monitor the first UL grant in the search space given by the RNTI "A." For example, the UE may monitor the first UL grant in the search space given by the RNTI "A" on the primary cell and/or secondary cell. Also, the UE may monitor the first UL grant in the search space given by the RNTI "B." Also, the UE may monitor the first UL grant in the search space given by the RNTI "C." For example, the UE may monitor the first UL grant in the search space given by the RNTI "C" on the primary cell and secondary cell.

Also, the UE may monitor the second UL grant in the search space given by the RNTI "A." For example, the UE may monitor the second UL grant in the search space given by the RNTI "A" only on the primary cell. Also, the UE may monitor the second UL grant in the search space given by the RNTI "B." For example, the UE may monitor the second UL grant in the search space given by the RNTI "B" only on the primary cell. Also, the UE may monitor the second UL grant in the search space given by the RNTI "C."

Also, the UE may monitor the third UL grant in the search space given by the RNTI "A." For example, the UE may monitor the third UL grant in the search space given by the RNTI "A" on the primary cell and/or the secondary cell. Also, the UE may monitor the third UL grant in the search space given by the RNTI "B." For example, the UE may monitor the third UL grant in the search space given by the RNTI "B" on the primary cell and/or the secondary cell. Also, the UE may monitor the third UL grant in the search space given by the RNTI "B" only on the primary cell. Also, the UE may monitor the third UL grant in the search space given by the RNTI "C." For example, the UE may monitor the third UL grant in the search space given by the RNTI "C" on the primary cell and/or the secondary cell. Here, the gNB may transmit, (e.g., by using the RRC message), information used for configuring the secondary cell on which the UE monitors the third UL grant (e.g., in the search space (i.e., the USS and/or the CSS)). Also, the gNB may transmit (e.g., by using the RRC message), information used for configuring a position(s) of timing (e.g., a subframe, a slot, a sub-slot (i.e., a mini-slot), and/or a symbol, i.e., occasion(s)) in which the UE monitors the third UL grant (e.g., in the search space (i.e., the USS and/or the CSS)).

Also, the UE may monitor the fourth UL grant in the search space given by the RNTI "A." For example, the UE may monitor the fourth UL grant in the search space given by the RNTI "A" on the primary cell and/or the secondary cell. For example, the UE may monitor the fourth UL grant in the search space given by the RNTI "B" on the primary cell and/or the secondary cell. Also, the UE may monitor the fourth UL grant in the search space given by the RNTI "B" only on the primary cell. Also, the UE may monitor the fourth UL grant in the search space given by the RNTI "C." For example, the UE may monitor the fourth UL grant in the search space given by the RNTI "C" on the primary cell and/or the secondary cell. Here, the gNB may transmit, (e.g., by using the RRC message), information used for configuring the secondary cell on which the UE monitors the fourth UL grant (e.g., in the search space (i.e., the USS and/or the CSS)). Also, the gNB may transmit (e.g., by using the RRC message), information used for configuring a position(s) of timing (e.g., a subframe, a slot, a sub-slot (i.e., a mini-slot), and/or a symbol, i.e., occasion(s)) in which the UE monitors the fourth UL grant (e.g., in the search space (i.e., the USS and/or the CSS)).

Here, the gNB may transmit (e.g., by using the RRC message) information (e.g., first information) used for configuring (e.g., indicating) the search space(s) (e.g., a position(s) of the search space). For example, the gNB may transmit information used for configuring the search space(s) (e.g., the USS and/or the CSS) in which the UE monitors the UL grant with the RNTI "A." Namely, the UE may monitor the first UL grant (e.g., the first UL grant with the C-RNTI (i.e., the RNTI "A")) in the configured position(s) of the search space(s). Also, the UE may monitor the third UL grant (e.g., the third UL grant with the C-RNTI (i.e., the RNTI "A")) in the configured position(s) of the search space(s). Also, the UE may monitor the fourth UL grant (e.g., the fourth UL grant with the C-RNTI (i.e., the RNTI "A")) in the configured position(s) of the search space(s). Here, the second UL grant (e.g., the second UL grant with the SPS C-RNTI (i.e., the RNTI "B")) may be monitored in the configured position(s) of the search space(s). For example, the UE may monitor the second UL grant (e.g., the second UL grant with the SPS C-RNTI (i.e., the RNTI "B")) in the same search space(s) as the search space(s) in which the UE monitors the first UL grant (e.g., the first UL grant with the C-RNTI (i.e., the RNTI "A")).

Also, for example, the gNB may transmit, (e.g., by using the RRC message), information (e.g., second information) used for configuring the search space(s) (e.g., the USS and/or the CSS) in which the UE monitors the UL grant with the RNTI "B." For example, the gNB may transmit, (e.g., by using the RRC message), information (e.g., the second information) as a part of the SPS configuration (e.g., the configuration of the interval (e.g., the subframe and/or slot based interval of the semi-persistent scheduling)). Namely, the UE may monitor the second UL grant (e.g., the second UL grant with the SPS C-RNTI (i.e., the RNTI "B")) in the configured position(s) of the search space(s). Also, the UE may monitor the third UL grant (e.g., the third UL grant with the SPS C-RNTI (i.e., the RNTI "B")) in the configured position(s) of the search space(s). Also, the UE may monitor the fourth UL grant (e.g., the fourth UL grant with the SPS C-RNTI (i.e., the RNTI "B")) in the configured position(s) of the search space(s).

Also, for example, the gNB may transmit, (e.g., by using the RRC message), information (e.g., third information) used for configuring the search space(s) (e.g., the USS and/or the CSS) in which the UE monitors the UL grant with the RNTI "C." For example, the gNB may transmit, (e.g., by using the RRC message), information (e.g., the third information) as a part of the SPS configuration (e.g., the configuration of the interval of semi-persistent scheduling (e.g., the slot, the sub-slot (i.e., the mini-slot) and/or the symbol based interval of semi-persistent scheduling). Namely, the UE may monitor the third UL grant (e.g., the third UL grant with the URLLC C-RNTI (i.e., the RNTI "C")) in the configured position(s) of the search space(s). Also, the UE may monitor the fourth UL grant (e.g., the fourth UL grant with the URLLC C-RNTI (i.e., the RNTI "C")) in the configured position(s) of the search space(s).

In some approaches, resource sharing may be performed between different transmissions. For example, any resource may be used by any kind of transmission. For example, the sharing of the PUSCH resource for the second UL data transmission, the third UL data transmission, and/or the fourth UL data transmission may be utilized. In some approaches, each kind of transmission may use its own dedicated resource so that there is no conflict (i.e., non-contention based UL transmission, contention-free UL transmission). In some approaches, different transmissions may share the same resource for efficiency (i.e., contention based UL transmission). Some kinds of resource sharing are described as follows.

Inter-service resource sharing is one kind of resource sharing. As described above, URLLC may coexist with other services (e.g., eMBB). Due to a latency requirement, URLLC may have the highest priority. Some examples of inter-service resource sharing are given as follows. Grant-based URLLC (e.g., the third UL data transmission (i.e., the third PUSCH)) and grant-based eMBB (e.g., the first UL data transmission (i.e., the first PUSCH)) may be one example of inter-service resource sharing. If a time delay between UL grant reception in DL and UL data (PUSCH) transmission is the same for both services, the coexistence issue may be solved by gNB/eNB scheduling. The UL grant for URLLC (e.g., the third UL grant and/or the fourth UL grant) and the UL grant for eMBB (e.g., the first UL grant) may indicate different frequency resources (e.g., different resource blocks) or different time resources (e.g., different mini-slots/OFDM symbols within the slot/subframe). Rate matching and/or puncturing may be used for eMBB (e.g., the first UL data) to protect URLLC data (e.g., the third UL data, and/or the fourth UL data). Namely, as described above, in a case that the first UL data transmission and the third UL data transmission would occur in the certain timing, the rate mating and/or the puncturing may be used for the first UL data, and the UE may transmit the first data and the third data in the certain timing. Also, as described above, in a case that the first UL data transmission and the fourth UL data transmission would occur in the same timing, the rate matching and/or the puncturing may be used for the first UL data, and the UE may transmit the first UL data and the fourth UL data in the certain timing. In some approaches, the gNB/eNB may not send an UL grant for an eMBB (e.g., the first UL grant) to the UE if the gNB/eNB sends UL grant for URLLC (e.g., the third UL grant and/or the fourth UL grant) to that UE (or a different UE) at the same timing, so that possible resource overlapping/conflict can be avoided.

If a time delay between UL grant reception in DL and UL data transmission is shorter for URLLC due to the latency requirement, a resource may already be allocated by an earlier UL grant for the eMBB service when the gNB/eNB sends an UL grant for URLLC service, which may use the same resource or part(s) of the same resource. In some cases, the gNB/eNB may send the UL grant to indicate a different resource (e.g., a different frequency resource or a different time resource) for URLLC. In some cases, the gNB/eNB may send the UL grant for URLLC (e.g., the third UL grant and/or the fourth UL grant) to preempt (e.g., puncture or superpose) the resource which is already granted for eMBB (e.g., scheduled by using the first UL grant). Since both services are grant-based, no extra indication may be needed for decoding at the gNB/eNB.

Grant-free URLLC (e.g., the fourth UL data transmission (i.e., the fourth PUSCH)) and grant-based eMBB (e.g., the first UL data transmission (i.e., the first PUSCH)) may be another example of inter-service resource sharing. The grant-free URLLC resource (e.g., the fourth PUSCH) may be pre-configured. For example, a frequency resource and/or a time resource of the fourth PUSCH may be configured by using the RRC message. Also, the time resource of the fourth PUSCH may be configured by using the RRC message and the frequency resource of the fourth PUSCH may be indicated by using the fourth UL grant. When the UE has URLLC data, the UE may transmit at the configured resource. The grant-based eMBB may avoid a configured grant-free URLLC resource, which means the configured resource may be dedicated for URLLC. However, a URLLC UE may skip the configured resource if there is no URLLC data. In a different approach, to enhance the resource utilization efficiency, grant-based eMBB (e.g., the first PUSCH) may be allowed to use a configured URLLC resource (e.g., the third UL data transmission and/or the fourth UL data transmission). If a configured URLLC resource is granted for eMBB (e.g., if the first PUSCH is scheduled in the certain timing where the third PUSCH and/or the fourth PUSCH is scheduled), but the UE has URLLC data (e.g., the third UL data and/or the fourth UL data) to transmit at the configured resource, URLLC data (e.g., the third UL data and/or the fourth UL data) may preempt the eMBB service (e.g., the first PUSCH). Namely, for example, the UE may transmit the first UL data and the third UL data using the first PUSCH. Also, for example, the UE may transmit the first UL data and the fourth UL data using the first PUSCH. Here, the UE may just abandon (e.g., give up, drop, withdraw, postpone) the eMBB transmission (e.g., the first UL data transmission). And, the UE may transmit only the third data using the first PUSCH. An indication may be used to indicate the presence of URLLC data (e.g., the third UL data and/or the fourth UL data) in the first PUSCH. And, the indication used to indicate the present of URLLC data may be used for helping the gNB/eNB decoding. Also, the gNB/eNB may assume that there is URLLC data at the configured resource and blind decode the URLLC data first.

Grant-free URLLC (e.g., the fourth UL data transmission (i.e., the fourth PUSCH)) and grant-free eMBB and/or SPS (e.g., the second UL data transmission (i.e., the second PUSCH)) may be another example of inter-service resource sharing. The URLLC resource (e.g., the fourth PUSCH) and the eMBB resource (e.g., the second PUSCH) may be orthogonal to each other by configuration. Namely, the gNB may transmit, (by using the RRC message and/or the DCI (e.g., the DCI for activating the SPS)), information used for configuring the orthogonal (e.g., OCC (orthogonal cover code) for the PUSCH(s) (e.g., the fourth PUSCH and/or the second PUSCH)). However, if overlapping exists, the URLLC resource may override the eMBB resource.

Grant-based URLLC (e.g., the third UL data transmission (i.e., the third PUSCH)) and grant-free eMBB and/or SPS (e.g., the second UL data transmission (i.e., the second PUSCH)) may be another example of inter-service resource sharing. Grant-based URLLC may override grant-free eMBB.

Also, examples of intra-URLLC resource sharing are given as follows. Grant-based initial transmission (e.g., the first UL data transmission (i.e., the first PUSCH), and/or the third UL data transmission (i.e., the third PUSCH)) and grant-free initial transmission (e.g., the second UL data transmission (i.e., the second PUSCH), and/or the fourth UL data transmission (i.e., the fourth PUSCH)) may be an example of intra-service resource sharing. Grant-based initial transmission may override grant-free initial transmission. Namely, in a case that the Grant-based initial transmission and the grant-free initial transmission would occur in the certain timing, the UE may perform the Grant-based initial transmission in the certain timing. Namely, in the certain timing where the PUSCH (e.g., the second PUSCH and/or the fourth PUSCH) for the grant-free initial transmission is scheduled, if the PUSCH (e.g., the first PUSCH and/or the third PUSCH) for the Grant-based initial transmission is scheduled, the UL grant for the Grant-based initial transmission (e.g., the first UL grant and/or the third UL grant) may override the UL grant for the grant-free initial transmission (e.g., the second UL grant and/or the fourth UL grant).

Grant-based retransmission (e.g., the first UL data transmission (i.e., the first PUSCH), and/or the third UL data transmission (i.e., the third PUSCH)) and grant-free initial transmission (e.g., the second UL data transmission (i.e., the second PUSCH), and/or the fourth UL data transmission (i.e., the fourth PUSCH)) may be another example of intra-service resource sharing. Here, the Grant-based retransmission may be a grant-based repetition(s) (i.e., the third UL data transmission (i.e., the third PUSCH)). The Grant-based retransmission may avoid a configured grant-free resource. Grant-based retransmission may override grant-free initial transmission. Namely, in a case that the Grant-based retransmission and the grant-free initial transmission would occur in the certain timing, the UE may perform the Grant-based retransmission in the certain timing. Namely, in the certain timing where the PUSCH (e.g., the second PUSCH and/or the fourth PUSCH) for the grant-free initial transmission is scheduled, if the PUSCH (e.g., the first PUSCH and/or the third PUSCH) for the Grant-based retransmission is scheduled, the UL grant for the Grant-based retransmission (e.g., the first UL grant and/or the third UL grant) may override the UL grant for the grant-free initial transmission (e.g., the second UL grant and/or the fourth grant). In another implementation, grant-free initial transmission may override grant-based retransmission. Namely, in a case that the Grant-based retransmission and the grant-free initial transmission would occur in the certain timing, the UE may perform the grant-free initial transmission in the certain timing. Namely, in the certain timing where the PUSCH (e.g., the second PUSCH and/or the fourth PUSCH) for the grant-free initial transmission is scheduled, if the PUSCH (e.g., the first PUSCH and/or the third PUSCH) for the Grant-based retransmission is scheduled, the UL grant for the grant-free initial transmission (e.g., the second UL grant and/or the fourth UL grant) may override the UL grant for the Grant-based retransmission (e.g., the first UL grant and/or the third grant).

Grant-free initial transmission (e.g., the second UL data transmission (i.e., the second PUSCH) and/or the fourth UL data transmission (i.e., the fourth PUSCH)) and grant-free retransmission (e.g., the second UL data transmission (i.e., the second PUSCH) and/or the fourth UL data transmission (i.e., the fourth PUSCH)) may be another example of intra-service resource sharing. Here, the grant-free retransmission may be a grant-free repetition(s) (i.e., the fourth UL data transmission (i.e., the fourth PUSCH)). Grant-free retransmission may override grant-free initial transmission. Namely, in a case that the grant-free initial transmission and the grant-free retransmission would occur in the certain timing, the UE may perform the grant-free retransmission in the certain timing. Namely, in the certain timing where the PUSCH (e.g., the second PUSCH and/or the fourth PUSCH) for the grant-free retransmission is scheduled, if the PUSCH (e.g., the second PUSCH and/or the fourth PUSCH) for the grant-free initial transmission is scheduled, the UL grant for the grant-free retransmission (e.g., the second UL grant and/or the fourth UL grant) may override the UL grant for the grant-free initial transmission (e.g., the second UL grant and/or the fourth grant). In another implementation, grant-free initial transmission may override grant-free retransmission. Namely, in a case that the grant-free initial transmission and the grant-free retransmission would occur in the certain timing, the UE may perform the grant-free initial transmission in the certain timing. Namely, in the certain timing where the PUSCH (e.g., the second PUSCH and/or the fourth PUSCH) for the grant-free retransmission is scheduled, if the PUSCH (e.g., the second PUSCH and/or the fourth PUSCH) for the grant-free initial transmission is scheduled, the UL grant for the grant-free initial transmission (e.g., the second UL grant and/or the fourth UL grant) may override the UL grant for the grant-free retransmission transmission (e.g., the second UL grant and/or the fourth grant).

Grant-based retransmission (e.g., the first UL data transmission (i.e., the first PUSCH) and/or the third UL data transmission (i.e., the third PUSCH)) and grant-free retransmission (e.g., the second UL data transmission (i.e., the second PUSCH) and/or the fourth UL data transmission (i.e., the fourth PUSCH)) may be another example of intra-service resource sharing. Here, the grant-free retransmission may be a grant-free repetition(s) (i.e., the fourth UL data transmission (i.e., the fourth PUSCH)). Grant-based retransmission may override grant-free retransmission. Namely, in a case that the Grant-based retransmission and the grant-free retransmission would occur in the certain timing, the UE may perform the Grant-based retransmission in the certain timing. Namely, in the certain timing where the PUSCH (e.g., the second PUSCH and/or the fourth PUSCH) for the grant-free retransmission is scheduled, if the PUSCH (e.g., the first PUSCH and/or the third PUSCH) for the Grant-based retransmission is scheduled, the UL grant for the Grant-based retransmission (e.g., the first UL grant and/or the third UL grant) may override the UL grant for the grant-free retransmission transmission (e.g., the second UL grant and/or the fourth grant).

Some approaches for hybrid automatic repeat request (HARQ) processes are described as follows. HARQ processes coexistence is one aspect of HARQ processes. In some approaches, URLLC may share HARQ processes with other services. For example, a same HARQ process may be used by either URLLC service or a different service (e.g., eMBB).

In some approaches, URLLC may use dedicated HARQ processes. For example, a URLLC service may have its own HARQ processes, which may be separated from other services.

HARQ process timing and number is another aspect of HARQ processes. In some approaches, synchronous HARQ may be used. For example, the timing between two adjacent transmissions in a HARQ process may be fixed. The HARQ process ID may be derived from the TTI (subframe/slot/mini-slot/OS) index.

In some approaches, asynchronous HARQ may be used. For example, the timing between two adjacent transmissions in a HARQ process may be dynamic. A HARQ process ID may be explicitly indicated.

In some approaches, a combination or enhancement of the above HARQ procedures may be implemented. For example, different services may use different types of HARQ procedures. Different types of transmissions may use different types of HARQ procedures. For instance, a URLLC service may use synchronous HARQ while eMBB service may use asynchronous HARQ; an initial transmission may use synchronous HARQ while retransmission may use asynchronous HARQ.

For example, the gNB may transmit, (by using the RRC message), information used for configuring multiple HARQ process IDs. For example, the gNB may configure the first HARQ process ID associated with the second UL grant (e.g., the first HARQ process ID corresponding to the second UL grant). Also, the gNB may configure a second HARQ process ID associated with the fourth UL grant (e.g., the second HARQ process ID corresponding to the fourth UL grant). Also, the gNB may configure a third HARQ process ID associated with the third UL grant (e.g., the third HARQ process ID corresponding to the third UL grant). As described above, the second UL grant may be the UL grant with the RNTI "B" (e.g., the SPS C-RNTI). Also, the fourth UL grant may be the UL grant with the RNTI "B" (e.g., the SPS C-RNTI). Also, the third UL grant may be the UL grant with the RNTI "B" (e.g., the SPS C-RNTI). Also, the fourth UL grant may be the UL grant with the RNTI "A" (e.g., the C-RNTI). Also, the third UL grant may be the UL grant with the RNTI "A" (e.g., the C-RNTI).

Namely, for example, in a case that the second UL grant including the first HARQ process ID is received (i.e., based on a detection of the second UL grant including the first HARQ process ID), the UE may perform the UL data transmission (e.g., the second UL data transmission). Here, the UL data transmission (e.g., the second UL data transmission) may correspond to the first HARQ process ID. Also, in a case that the fourth UL grant including the second HARQ process ID is received (i.e., based on a detection of the fourth UL grant including the second HARQ process ID), the UE may perform the UL data transmission (e.g., the fourth UL data transmission). Here, the UL data transmission (e.g., the fourth UL data transmission) may correspond to the second HARQ process ID. Also, in a case that the third UL grant including the third HARQ process ID is received (i.e., based on a detection of the third UL grant including the third HARQ process ID), the UE may perform the UL data transmission (e.g., the third UL data transmission). Here, the UL data transmission (e.g., the third UL data transmission) may correspond to the third HARQ process ID.

Also, the gNB may configure the fourth HARQ process ID associated with the RNTI "A" (e.g., the fourth HARQ process ID corresponding to the RNTI "A"). Also, the gNB may configure the fifth HARQ process ID associated with the RNTI "B" (e.g., the fifth HARQ process ID corresponding to the RNTI "B"). Also, the gNB may configure the sixth HARQ process ID associated with the RNTI "C" (e.g., the sixth HARQ process ID corresponding to the RNTI "C"). As described above, the second UL grant may be the UL grant with the RNTI "B" (e.g., the SPS C-RNTI). Also, the third UL grant may be the UL grant with the RNTI "A" (e.g., the C-RNTI). Also, the third UL grant may be the UL grant with the RNTI "C" (e.g., the URLLC C-RNTI). Also, the fourth UL grant may be the UL grant with the RNTI "B" (e.g., the SPS C-RNTI). Also, the fourth UL grant may be the UL grant with the RNTI "C" (e.g., the URLLC C-RNTI).

Namely, for example, in a case that the UL grant with the RNTI "A" is received (i.e., based on a detection of the UL grant with the RNTI "A"), the UE may perform the UL data transmission (e.g., the third UL data transmission). Here, the UL data transmission (e.g., the third UL data transmission) may correspond to the fourth HARQ process ID. Also, in a case that the UL grant with the RNTI "B" is received (i.e., based on a detection of the UL grant with the RNTI "B"), the UE may perform the UL data transmission (e.g., the second UL data transmission, the third UL data transmission, and/or the fourth UL data transmission). Here, the UL data transmission (e.g., the second UL data transmission, the third UL data transmission, and/or the fourth UL data transmission) may correspond to the fifth HARQ process ID. Also, in a case that the UL grant with the RNTI "C" is received (i.e., based on a detection of the UL grant with the RNTI "C"), the UE may perform the UL data transmission (e.g., the third UL data transmission and/or the fourth UL data transmission). Here, the UL data transmission (e.g., the third UL data transmission and/or the fourth UL data transmission) may correspond to the sixth HARQ process ID.

Also, the HARQ process ID may be determined based on a timing (e.g., a subframe, a slot, a sub-slot, and/or a symbol) in which the UL data initial transmission (e.g., the first UL data initial transmission, the second UL data initial transmission, the third UL data initial transmission, and/or the fourth UL data initial transmission) is performed. For example, the HARQ process ID may be determined based on an index of the timing in which the UL data initial transmission is performed. Additionally, the gNB may transmit, (by using the RRC message and/or the DCI (e.g., the DCI for activating the SPS)), information used for determining the HARQ process ID. Namely, for example, the UE may determine the HARQ process ID based on the timing and the information (i.e., the information used for determining the HARQ process) which is transmitted by the gNB. For example, a function (e.g., an equation) may be defined for determining the HARQ process ID. Namely, for example, the timing (i.e., the index of the timing) and the information transmitted by the gNB (i.e., a value of the information) may be used as parameters for calculating (i.e., determining) the HARQ process ID based on the function (e.g., the equation).

The invention taught herein provide the benefit that a gNB, controlled by an operator, may assign time/frequency resources to UEs in an expeditious manner.

Various examples of the systems and methods disclosed herein are now described with reference to the Figures, where like reference numbers may indicate functionally similar elements. The systems and methods as generally described and illustrated in the Figures herein could be arranged and implemented in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for ultra-reliable and low-latency communication operations may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE URLLC module 126.

The UE URLLC module 126 may perform URLLC operations. In some approaches, URLLC operations may include grant-free data transmission (e.g., UL transmission without detection of downlink control information for triggering), sub-slot (sub-slot may be also referred to as mini-slot) based data transmission, SR triggered data transmission (SR is sent before data transmission), and/or SR-less data transmission (SR is not used), etc.

A UE with URLLC capability may support different types of resources. For URLLC UL transmission schemes (including repetition), at least semi-static resource (re-)configuration may be supported. In LTE, semi-persistent scheduling (SPS) is a regular way for semi-static resource allocation. There are several basic procedures for SPS: radio resource control (RRC) configuration (e.g., a RRC message, a RRC signal), activation, UL transmission and/or deactivation. The RRC configuration may be exchanged between the eNB/gNB 160 and the UE 102 through a RRC layer. The RRC signal may be included in a higher layer signal. At the beginning, the eNB/gNB 160 may allocate an SPS resource (e.g., periodicity of the SPS resource) and function to a specific UE 102 by SPS-Config, which is shown in the SPS-Config information element of Listing-1. Here, for example, the eNB/gNB 160 may configure a periodicity (e.g., a time resource) by using the RRC signal, and indicate the SPS resource (e.g., a frequency resource) by using a DCI format.

Listing-1

```
-- ASN1START
SPS-Config ::=   SEQUENCE {
    semiPersistSchedC-RNTI      C-RNTI              OPTIONAL, -- Need OR
    sps-ConfigDL                SPS-ConfigDL            OPTIONAL, -- Need ON
    sps-ConfigUL                SPS-ConfigUL            OPTIONAL -- Need ON
}
SPS-ConfigDL ::=   CHOICE{
    release                     NULL,
    setup                       SEQUENCE {
        semiPersistSchedIntervalDL          ENUMERATED {
                                                sf10, sf20, sf32, sf40, sf64, sf80,
                                                sf128, sf160, sf320, sf640, spare6,
                                                spare5, spare4, spare3, spare2,
                                                spare1},
        numberOfConfSPS-Processes           INTEGER (1..8),
        n1PUCCH-AN-PersistentList           N1PUCCH-AN-PersistentList,
        ...,
        [[   twoAntennaPortActivated-r10    CHOICE {
                release                         NULL,
                setup                           SEQUENCE {
                    n1PUCCH-AN-PersistentListP1-r10 N1PUCCH-AN-PersistentList
                }
            }                                                                       OPTIONAL
        -- Need ON
        ]]
    }
}
```

Listing-1

```
SPS-ConfigUL ::=    CHOICE {
    release                         NULL,
    setup                           SEQUENCE {
        semiPersistSchedIntervalUL      ENUMERATED {-- Period of UL SPS
                                            sf10, sf20, sf32, sf40, sf64, sf80,
                                            sf128, sf160, sf320, sf640, sf1-v14xy,
                                            sf2-v14xy, sf3-v14xy, sf4-v14xy,
                                            sf5-v14xy, spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }       OPTIONAL,                                       -- Need OP
        twoIntervalsConfig              ENUMERATED {true}       OPTIONAL, --
Cond TDD
        ...,
        [[ p0-PersistentSubframeSet2-r12    CHOICE {
            release                         NULL,
            setup                           SEQUENCE {
                p0-NominalPUSCH-PersistentSubframeSet2-r12          INTEGER
(-126..24),
                p0-UE-PUSCH-PersistentSubframeSet2-r12              INTEGER (-8..7)
            }
        }                                               OPTIONAL -- Need ON
        ]],
        [[ numberOfConfUlSPS-Processes-r13          INTEGER
(1..8)      OPTIONAL -- Need OR
        ]]
    }
}
N1PUCCH-AN-PersistentList ::=       SEQUENCE (SIZE (1..4)) OF INTEGER (0..2047)
-- ASN1STOP
```

The UE 102 may use an SPS resource for a grant-free URLLC UL transmission. Additionally or alternatively, the eNB/gNB 160 may allocate a URLLC-specific grant-free resource for URLLC UL transmission. For example, the eNB/gNB 160 may allocate an SPS-like resource, which is shown in the URLLC-Config information element of Listing 2. Here, without loss of generality, the URLLC-specific grant-free resource may be referred to as a "URLLC-SPS resource" and the corresponding scheme may be referred to as "URLLC-SPS."

To better serve the UL URLLC, some modifications or enhancements may be applied to the URLLC-SPS. A URLLC-specific RNTI (e.g., URLLCSchedC-RNTI in Listing 2) may be used to differentiate the URLLC resource or transmission from other services.

Additionally or alternatively, a period of URLLC-SPS (e.g., URLLCInterval in Listing 2) may be short enough (e.g., slot 1, slot 2, slot4) to meet the latency requirement. In NR, time granularity may be subframe based, slot based, mini-slot based, and/or OFDM symbol (OS) based. (The Listing-2

```
-- ASN1START
URLLC-Config ::=    SEQUENCE {
    URLLCSchedC-RNTI        C-RNTI (or URLLC C-
RNTI)           OPTIONAL,           -- Need OR
    URLLC-ConfigUL                  URLLC-
ConfigUL        OPTIONAL            -- Need ON
}
URLLC-ConfigUL ::=CHOICE {
    release                         NULL,
    setup                           SEQUENCE {
        URLLCInterval       ENUMERATED {-- Period of UL SPS
                                slot1, slot2, slot4, slot8, slot10,
                                slot20, slot32, slot40, slot64, slot80,
                                slot128, slot160, slot320, slot640},
        numberOfRepetition ENUMERATED {-- Number of UL Repetitions
                                1, 2, 4, 8},
        numberOfConfURLLC-Processes     INTEGER (1..8),
        implicitReleaseAfter (or URLLC-Timer)   ENUMERATED {e2, e3, e4, e8, e16, e32,
e64, e128, e256, e512},
        p0-URLLC                    SEQUENCE {
            p0-NominalPUSCH-URLLC       INTEGER (-126..24),
            p0-UE-PUSCH-URLLC           INTEGER (-8..7)
        }       OPTIONAL,                                       -- Need OP
N1PUCCH-AN-PersistentList ::=       SEQUENCE (SIZE (1..4)) OF INTEGER (0..2047)
-- ASN1STOP
``` term "OS" may be used to denote both OFDM symbols and DFT-Spread OFDM symbols as both of those will have been specified in NR.) In Listing 2, the slot may be given as an example. In general, the time resource of URLLC-SPS may be determined by TTI index at starting time, period, and/or TTI offset. All the parameters related to time domain resource may be configured by RRC. Additionally or alternatively, parts of the parameters (e.g., period) may be configured by RRC and remaining parameters (e.g., TTI index/offset) may be indicated by DCI for (re-)activation or dynamic scheduling. In a case that a mini-slot is used, the mini-slot location (mini-slot/OS index/offset, length, and/or bitmap) in a configured slot may be semi-statically configured in addition to the slot-based time domain resource configuration. The mini-slot location information may be configured by RRC or indicated by DCI for (re-)activation and/or dynamic scheduling. In some approaches, the frequency resource of the URLLC-SPS may be configured by RRC or indicated by DCI for (re-)activation or dynamic scheduling.

Additionally or alternatively, the number of UL URLLC repetitions (e.g., numberOfRepetition in Listing 2, also referred as repetition number) may be semi-statically configured for URLLC-SPS. The repetition number may be configured by RRC or indicated by DCI for (re-)activation or dynamic scheduling. Or, the set of repetition numbers may be configured by RRC and the choice of repetition number may be indicated by DCI for (re-)activation or dynamic scheduling.

Additionally or alternatively, the number of HARQ processes (e.g., numberOfConfURLLC-Processes in Listing 2) may be configured for URLLC-SPS. The HARQ Process ID (also referred as HARQ Process Number, HPN) of a URLLC UL transmission at the configured URLLC resource may be determined by the TTI index, number of repetitions, and/or number of HARQ processes. For example, the HARQ Process ID associated with this TTI may be derived from the following equation: HARQ Process ID=floor{[floor(CURRENT_TTI/URLLCInterval)]/numberOfRepetition} modulo numberOfConfURLLC-Processes, where CURRENT_TTI is the TTI index. The number of HARQ processes may not be used if URLLC-SPS is aligned with synchronous UL HARQ. In some approaches, only one HARQ process is used for URLLC-SPS. The number of HARQ processes may not be used. On the other hand, a specific HARQ Process ID may be allocated to this URLLC-SPS.

Additionally or alternatively, a timer (e.g., implicitReleaseAfter (or URLLC-Timer) in Listing 2) may be configured for URLLC-SPS. The timer may start from the activation of URLLC-SPS, the first transmission after the activation, an empty (or silent) transmission after a URLLC-SPS transmission, or a URLLC-SPS transmission followed by an empty (silent) transmission. After a number (the value is given by implicitReleaseAfter) of empty (or silent) transmissions counted from the start of the timer (in other words, the timer expires) at the configured URLLC-SPS resource, the URLLC-SPS may be deactivated implicitly.

In some approaches, in addition to a configured grant-free resource, the gNB/eNB 160 (e.g., gNB URLLC module 194) may send DCI indicating a Dynamic Scheduling resource (also referred to as DS resource or grant-based resource, for example). Here, the DS resource may include (e.g., correspond to) an UL resource, a frequency resource, UL-SCH resource, and/or PUSCH resource. The DS resource may use a different resource compared to a configured resource for UL URLLC transmission(s). Alternatively, the DS resource may override the configured resource for UL URLLC transmission(s). Alternatively, the DS resource may use the same resource as the configured resource for UL URLLC transmission(s). Alternatively, the DS resource may be preempted by grant-free transmission (e.g., puncturing, superposition). A time/frequency resource may be included in the DCI format.

Accordingly, a UE 102 with URLLC capability may support an SPS resource, URLLC-SPS resource and/or DS resource. The SPS resource and/or URLLC-SPS resource may be used for grant-free transmission. The DS resource may be used for grant-based transmission. A UE 102 may be configured with multiple SPS resources or multiple URLLC-SPS resources (e.g., multiple periodicities and/or multiple TTI offsets). The SPS resource and/or DS resource may be used by either the URLLC service or other services like eMBB. The URLLC-SPS resource may be URLLC-specific with enhancements/modifications. In a specification, there may be only one kind of grant-free resource, which may be a combination of the SPS resource and/or the URLLC-SPS resource.

To differentiate service types, different Radio Network Temporary Identifiers (RNTIs) may be allocated to a URLLC UE 102. For example, a Cell RNTI (C-RNTI) may be used for dynamic scheduled unicast transmission. A SPS C-RNTI may be used for semi-persistent scheduled unicast transmission (activation, reactivation, retransmission, and/or deactivation). For URLLC, the UE 102 may reuse the C-RNTI and/or the SPS C-RNTI, which means that no specific C-RNTI may be issued for URLLC. In another approach, a URLLC-specific identification referred to as a URLLC C-RNTI (a specification may use a different name, and URLLC C-RNTI is used as an example) may be used for URLLC related transmission. A URLLC C-RNTI may be used for dynamic scheduled transmission. Additionally or alternatively, the URLLC C-RNTI may be used for a semi-persistent scheduled URLLC transmission (activation, reactivation, retransmission, and/or deactivation). Additionally or alternatively, the URLLC C-RNTI may be used for dynamic reconfiguration of an UL grant-free URLLC transmission.

A URLLC UE 102 may monitor several search spaces: common search space, UE-specific search space, and/or URLLC search space. The common search space may contain some information related to URLLC. There may be no URLLC-specific search space, or URLLC may share the same UE-specific search space with other services. To obtain URLLC related information, the UE 102 may search the UE-specific search space by using URLLC C-RNTI (if implemented and/or utilized, for example) or C-RNTI/SPS C-RNTI (if there is no URLLC-specific RNTI, for example). URLLC may have a specific search space, which may be referred to as a URLLC search space as an example (a specification may use a different name). The UE 102 may obtain URLLC related information by searching the URLLC search space.

To differentiate whether a transmission is an initial transmission or a retransmission, some mechanisms may be implemented and/or utilized in some approaches. For a grant-based transmission, additional bit(s) in DCI may be used to indicate whether the transmission is new data or not. Alternatively, some field(s) in DCI may be set as default value(s) to indicate whether the transmission is new data or not. For grant-free transmission, each transmission at the configured grant-free resource may be only for initial transmission. If repetitions are supported, the UE 102 may repeat a TB for a predefined number of times and then repeat transmissions of new TB. In another approach, a time window may be used. Within the time window, the transmissions may be for the same TB. After the time window expires, the grant-free transmission may be for a new TB.

Any physical layer resource may be used by grant-free transmission or grant-based transmission, URLLC service or other services like eMBB, initial transmission or retransmission. In some approaches, each kind of transmission may use a corresponding specific dedicated resource to avoid conflict. In some approaches, different transmissions may share the same resource for efficiency. For example, a configured grant-free resource may be overridden, preempted, or punctured by a grant-based transmission or may not be used by a grant-based transmission. The configured URLLC resource may be only for URLLC transmission, or may be shared by other services.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB URLLC module 194. The gNB URLLC module 194 may perform URLLC operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB (s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
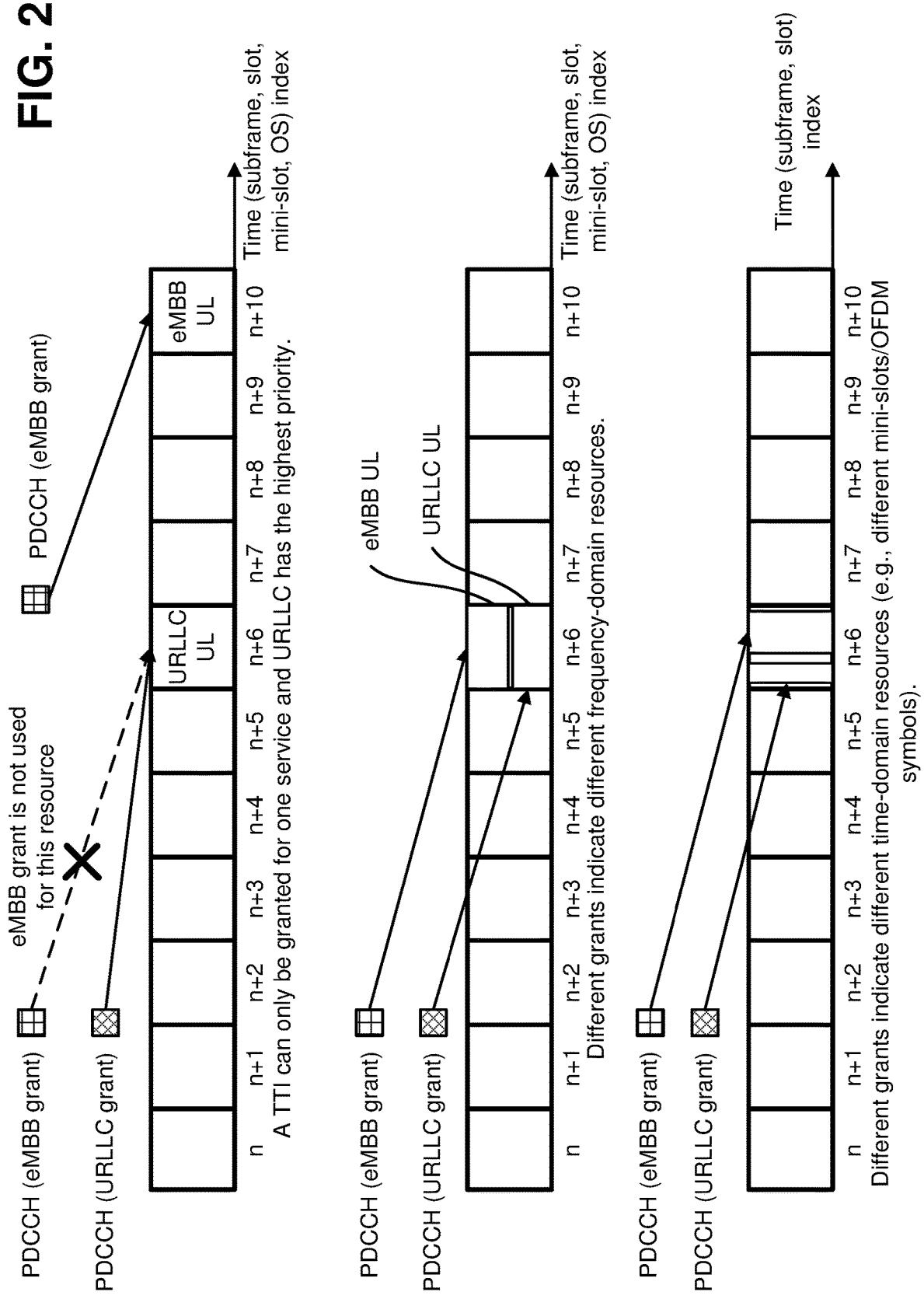
FIG. 2 is diagram illustrating examples of grant-based URLLC and grant-based enhanced mobile broadband (eMBB)

FIG. 2 is diagram illustrating some examples of grant-based URLLC and grant-based eMBB. For grant-based URLLC and grant-based eMBB, if a time delay between UL grant reception in DL and UL data (PUSCH) transmission is the same for both services, the coexistence issue may be solved by gNB/eNB scheduling. The UL grant for URLLC and UL grant for eMBB may indicate different frequency resources (e.g., different resource blocks) or different time resources (e.g., different mini-slots/OFDM symbols within the slot/subframe). Additionally or alternatively, rate matching or puncturing may be used for eMBB to protect URLLC data. Additionally or alternatively, a gNB/eNB 160 may not send UL grant for eMBB to a UE 102 if the gNB/eNB 160 sends an UL grant for URLLC to that UE 102 (or a different UE) at the same timing, so that possible resource overlapping/conflict can be avoided. FIG. 2 illustrates some examples.

Figure 3:
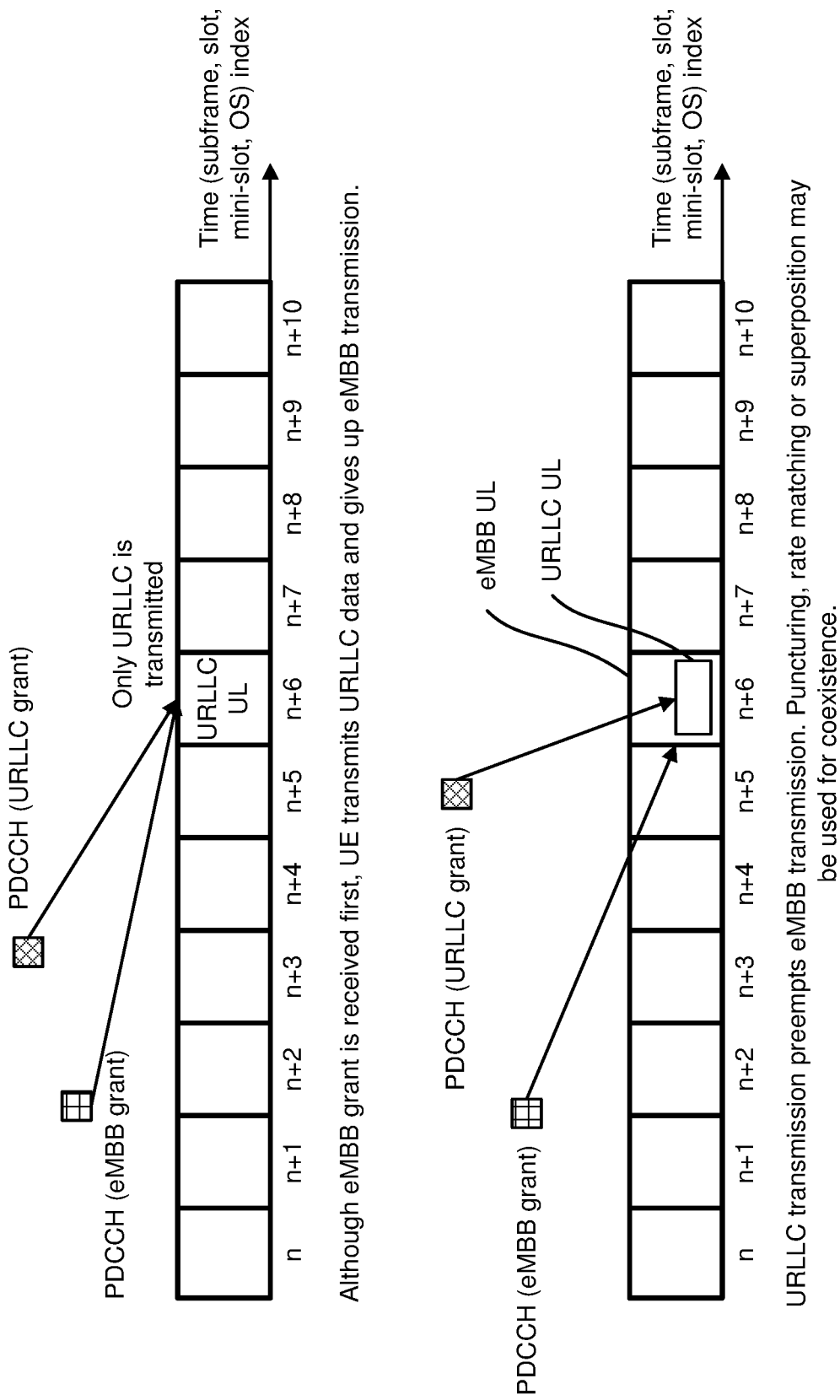
FIG. 3 is a diagram illustrating examples of grant-based URLLC and grant-based eMBB.

FIG. 3 is a diagram illustrating some examples of grant-based URLLC and grant-based eMBB. If a time delay between UL grant reception in DL and UL data transmission is shorter for URLLC due to the latency requirement, a resource may already be allocated by an earlier UL grant for the eMBB service when a gNB/eNB 160 sends an UL grant for URLLC service, which may use the same resource or part(s) of the same resource. In some cases, a gNB/eNB 160 may send the UL grant to indicate a different resource (e.g., a different frequency resource and/or a different time resource) for URLLC. In some cases, a gNB/eNB 160 may send the UL grant for URLLC to preempt (e.g., puncture and/or superpose) the resource that is already granted for eMBB. Since both services are grant-based, no extra indication may be needed for decoding at the gNB/eNB 160. Some examples are shown in FIG. 3.

Figure 4:
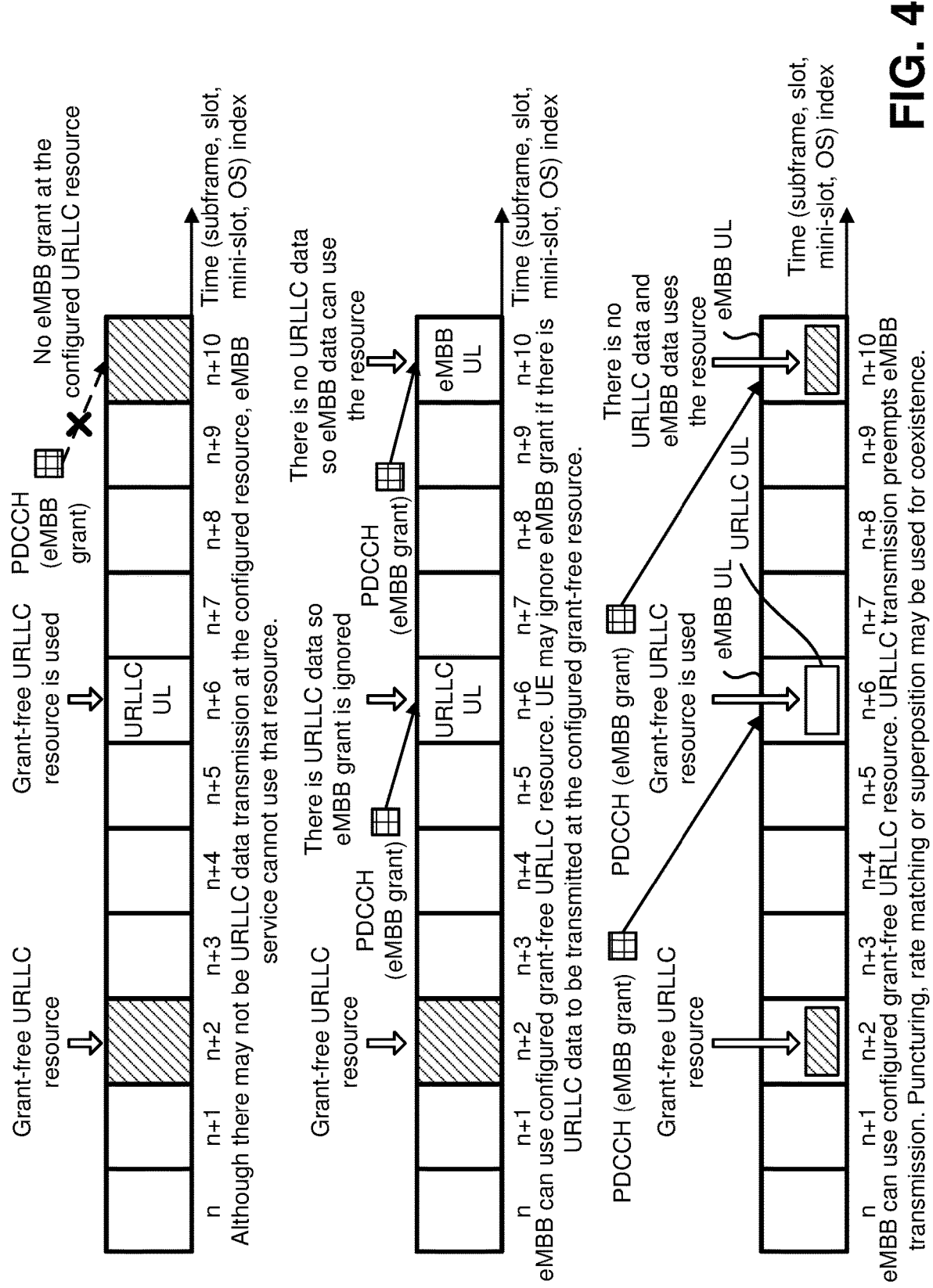
FIG. 4 is a diagram illustrating examples of grant-free URLLC and grant-based eMBB.

FIG. 4 is a diagram illustrating examples of grant-free URLLC and grant-based eMBB. For grant-free URLLC and grant-based eMBB, a grant-free URLLC resource may be pre-configured. When a UE 102 has URLLC data, the UE 102 may transmit at the configured resource. The grant-based eMBB may avoid the configured grant-free URLLC resource, which means that the configured resource may be dedicated for URLLC. However, a URLLC UE 102 may skip the configured resource if there is no URLLC data. In another approach, to enhance the resource utilization efficiency, grant-based eMBB may be allowed to use a configured URLLC resource. If a configured URLLC resource is granted for eMBB but the UE 102 has URLLC data to transmit at the configured resource, the URLLC data may preempt the eMBB service or the UE 102 may abandon the eMBB transmission. An indication may indicate the presence of URLLC data to help the gNB/eNB 160 decode, or the gNB/eNB 160 may assume there is URLLC data at the configured resource and blind decode the URLLC data first. Some examples are shown in FIG. 4. The indication may indicate which codeblock in a group of codeblocks comprising a transport block was affected by URLLC transmission; if multiple codeblocks in a transport block were affected by URLLC transmission there would be multiple indications transmitted per transport block.

For grant-free URLLC and grant-free eMBB, a URLLC resource and an eMBB resource can be orthogonal to each other by configuration. However, if overlapping exists, the URLLC resource may override the eMBB resource.

Figure 5:
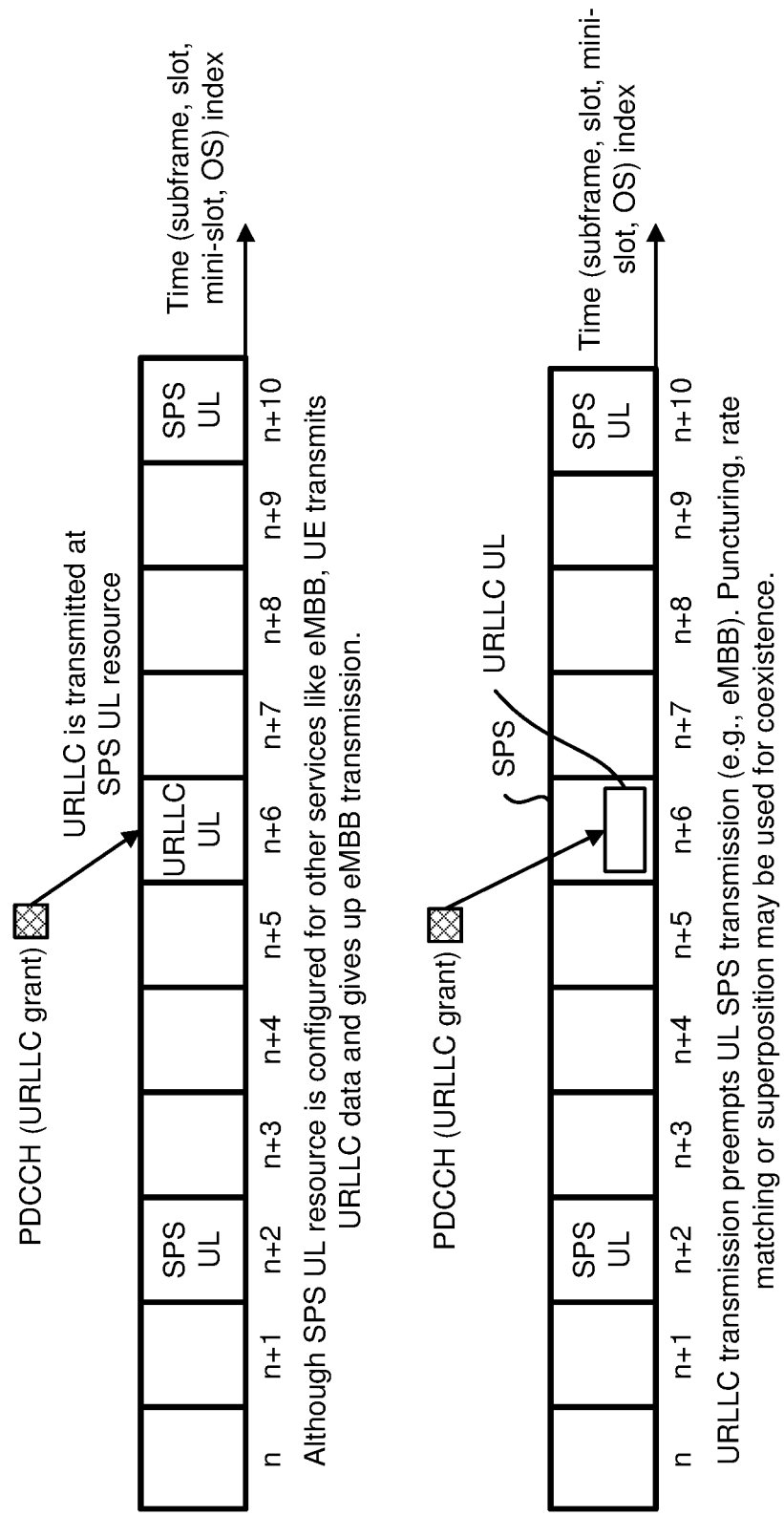
FIG. 5 is a diagram illustrating examples of grant-based URLLC and grant-free eMBB.

FIG. 5 is a diagram illustrating examples of grant-based URLLC and grant-free eMBB. For grant-based URLLC and grant-free eMBB, grant-based URLLC may override grant-free eMBB. Some examples are shown in FIG. 5.

For URLLC itself, some mechanisms may be utilized to handle grant-free/grant-based transmissions coexistence and initial transmission/retransmission coexistence. Some examples are given in connection with one or more of the following Figures.

Figure 6:
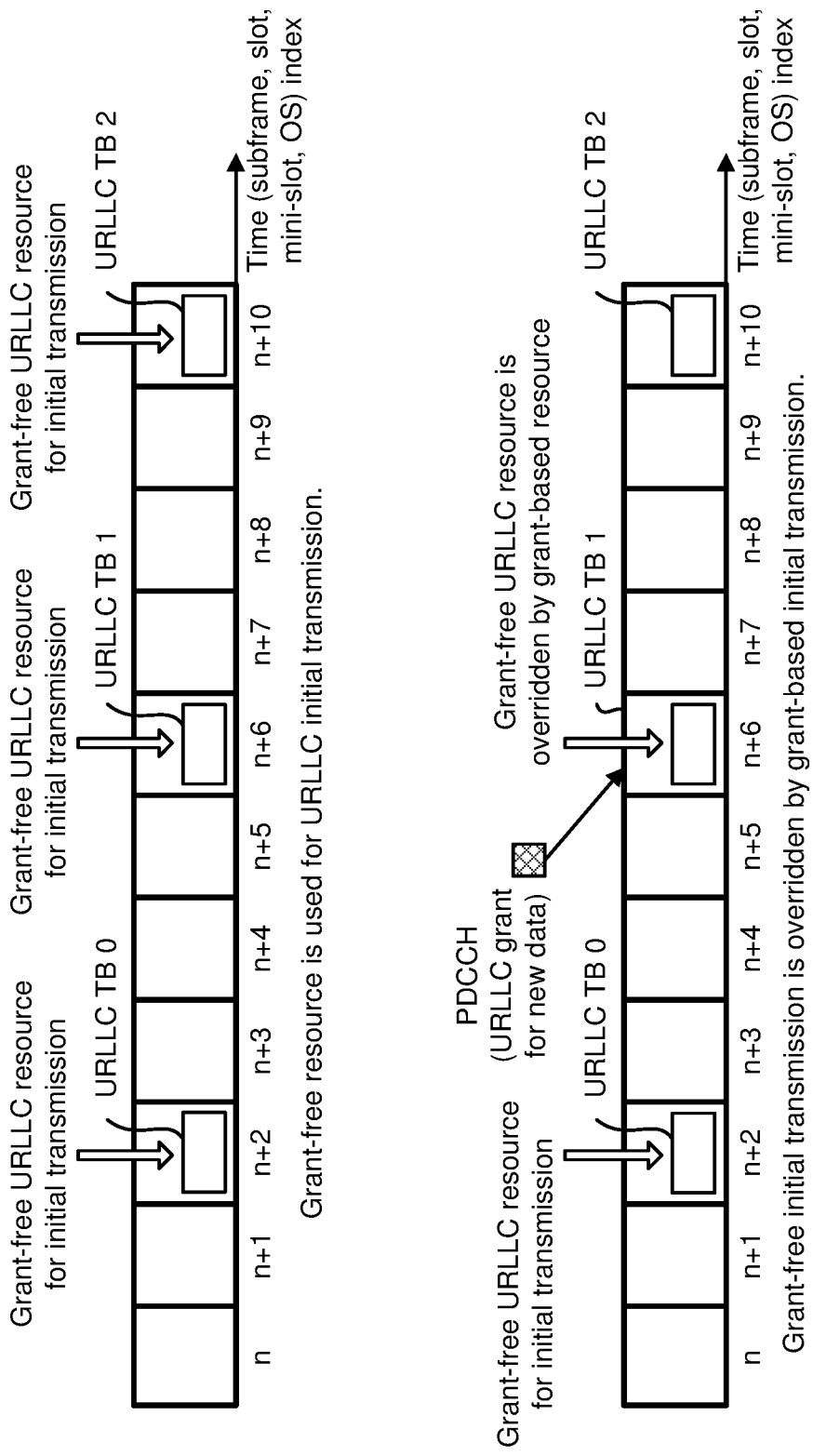
FIG. 6 is a diagram illustrating examples of grant-based initial transmission and grant-free initial transmission.

FIG. 6 is a diagram illustrating examples of grant-based initial transmission and grant-free initial transmission. For grant-based initial transmission and grant-free initial transmission, grant-based initial transmission may override grant-free initial transmission. Some examples are shown in FIG. 6.

Figure 7A:
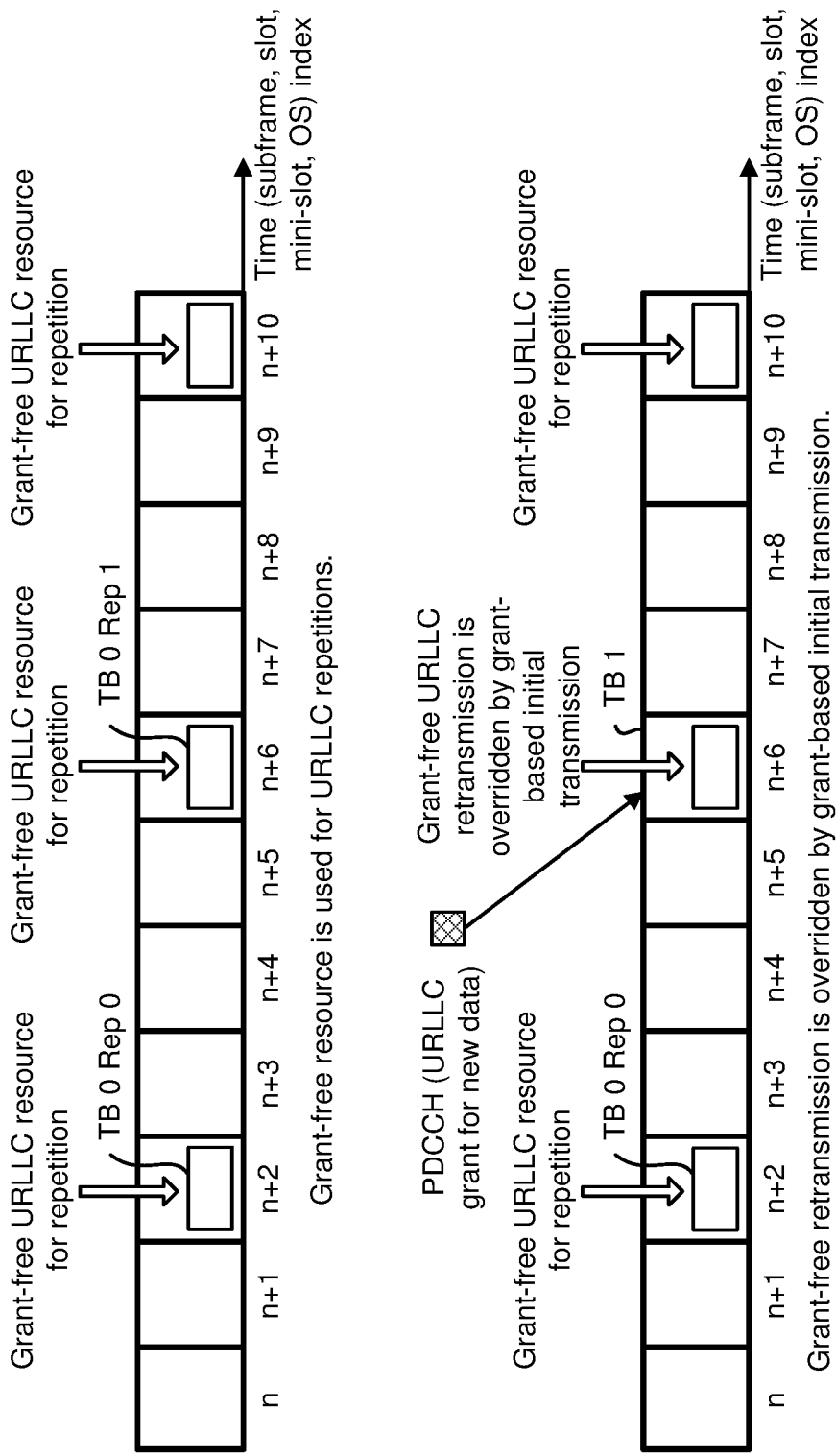
FIGS. 7A and 7B are diagrams illustrating examples of grant-based retransmission and grant-free initial transmission.
Figure 7B:
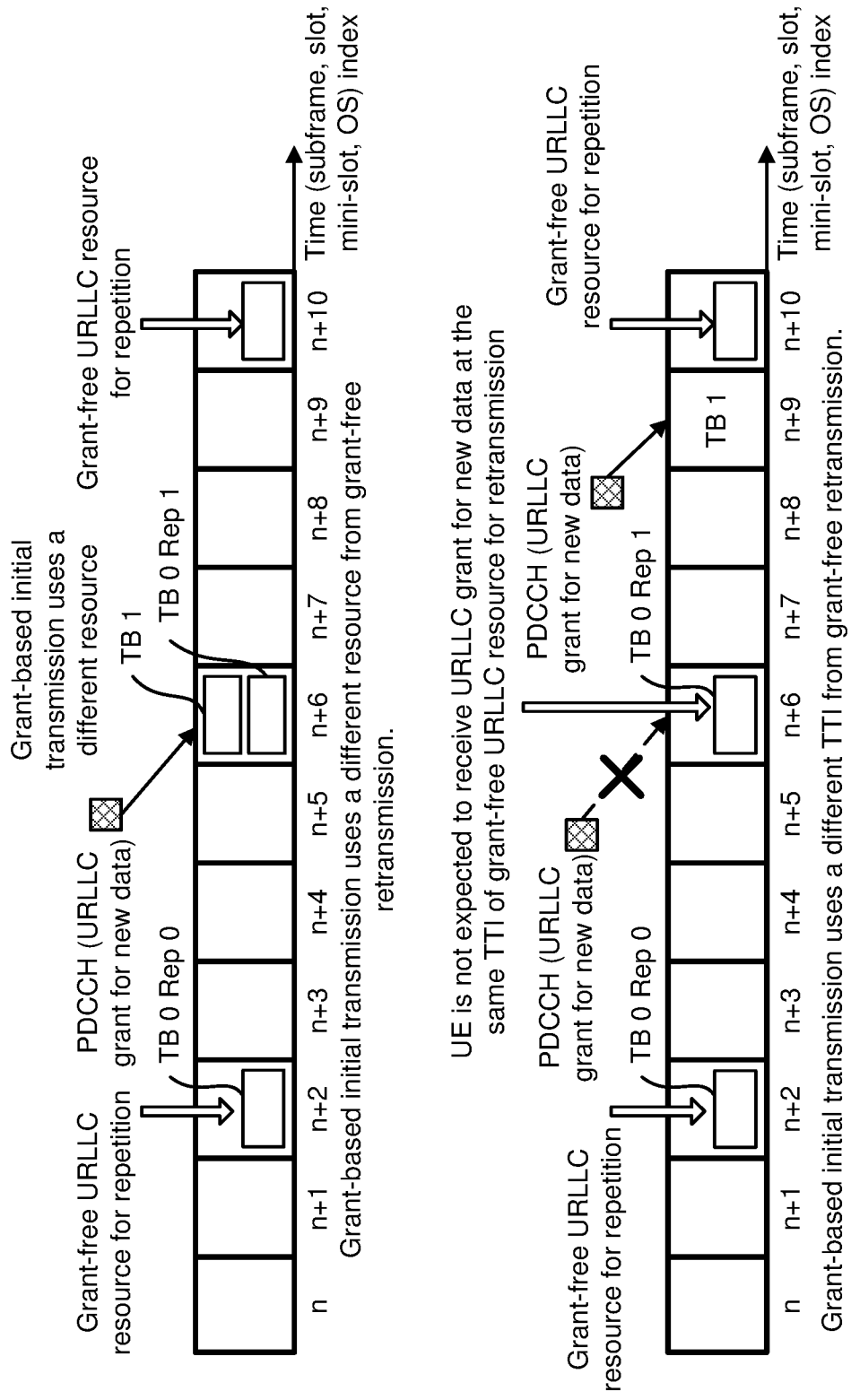

FIGS. 7A and 7B are diagrams illustrating examples of grant-based retransmission and grant-free initial transmission. For grant-based retransmission and grant-free initial transmission, grant-based retransmission may avoid configuring a grant-free resource. Grant-based retransmission may override grant-free initial transmission. In a different implementation, grant-free initial transmission may override grant-based retransmission. Some examples are shown in FIGS. 7A and 7B. It should be noted that in some approaches, an initial "repetition" may be an initial transmission. For example, "Rep 0" or a zeroth "repetition" may not be a repeat of an earlier transmission, but may be an initial transmission, while "Rep 1" may be a repeat of an earlier transmission (e.g., a retransmission of Rep 0, which may or may not use a different RV or MCS).

Figure 8:
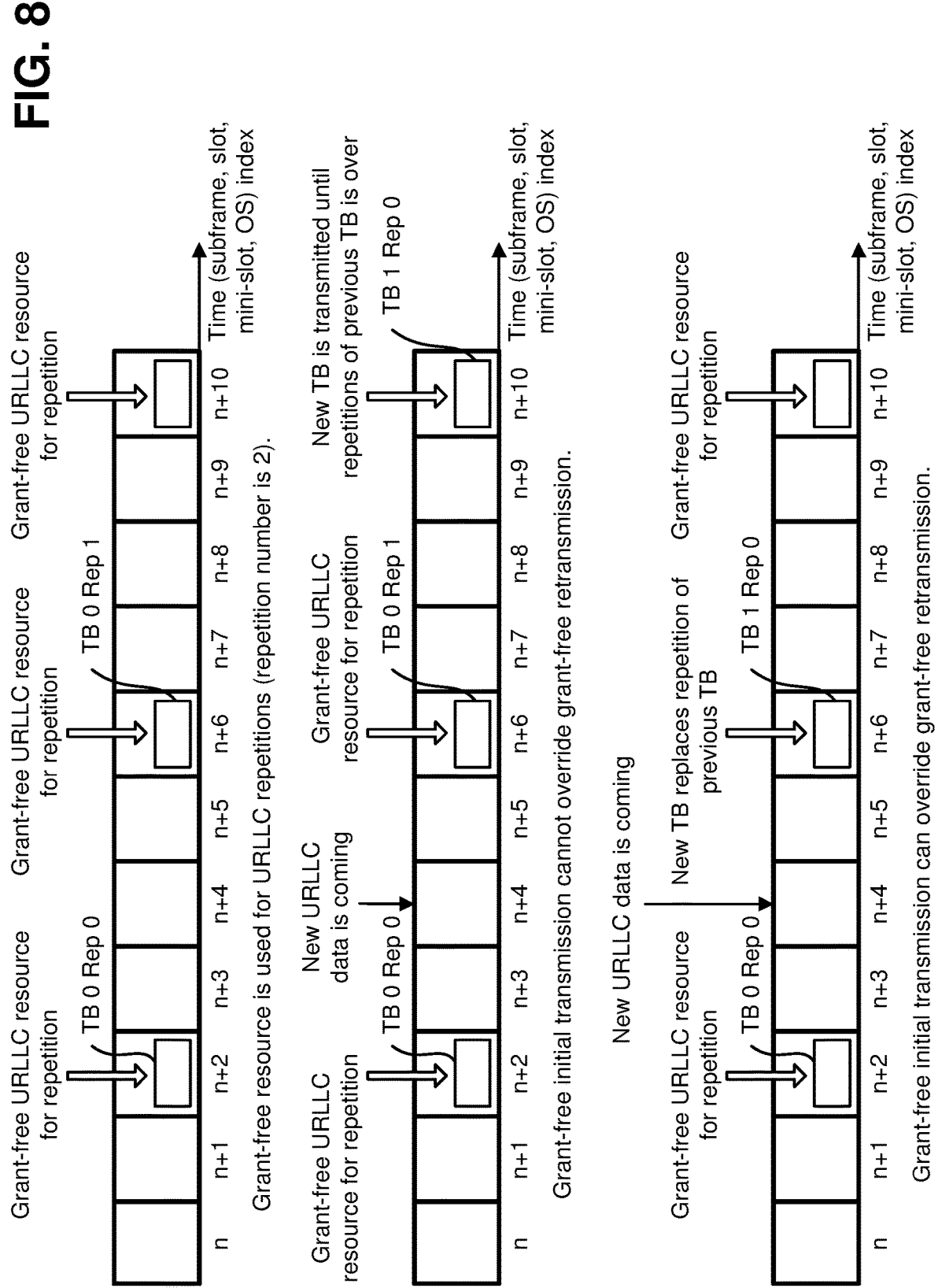
FIG. 8 is a diagram illustrating examples of grant-free initial transmission and grant-free retransmission.

FIG. 8 is a diagram illustrating examples of grant-free initial transmission and grant-free retransmission. For grant-free initial transmission and grant-free retransmission, grant-free retransmission may override grant-free initial transmission. In a different approach, grant-free initial transmission may override grant-free retransmission. Some examples are shown in FIG. 8.

Figure 9:
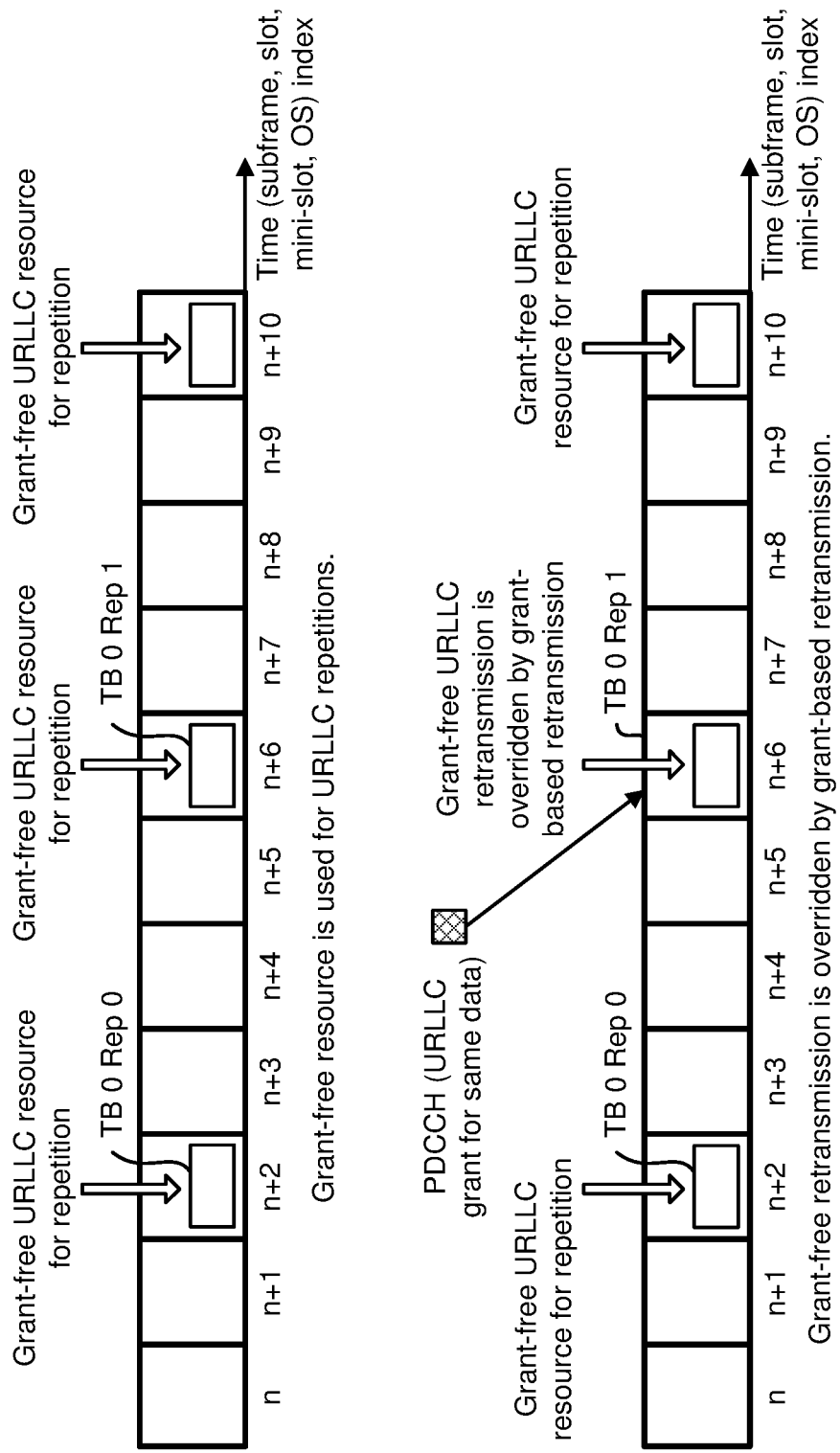
FIG. 9 is a diagram illustrating examples of grant-based retransmission and grant-free retransmission.

FIG. 9 is a diagram illustrating examples of grant-based retransmission and grant-free retransmission. For grant-based retransmission and grant-free retransmission, grant-based retransmission may override grant-free retransmission. Some examples are shown in FIG. 9.

Figure 10:
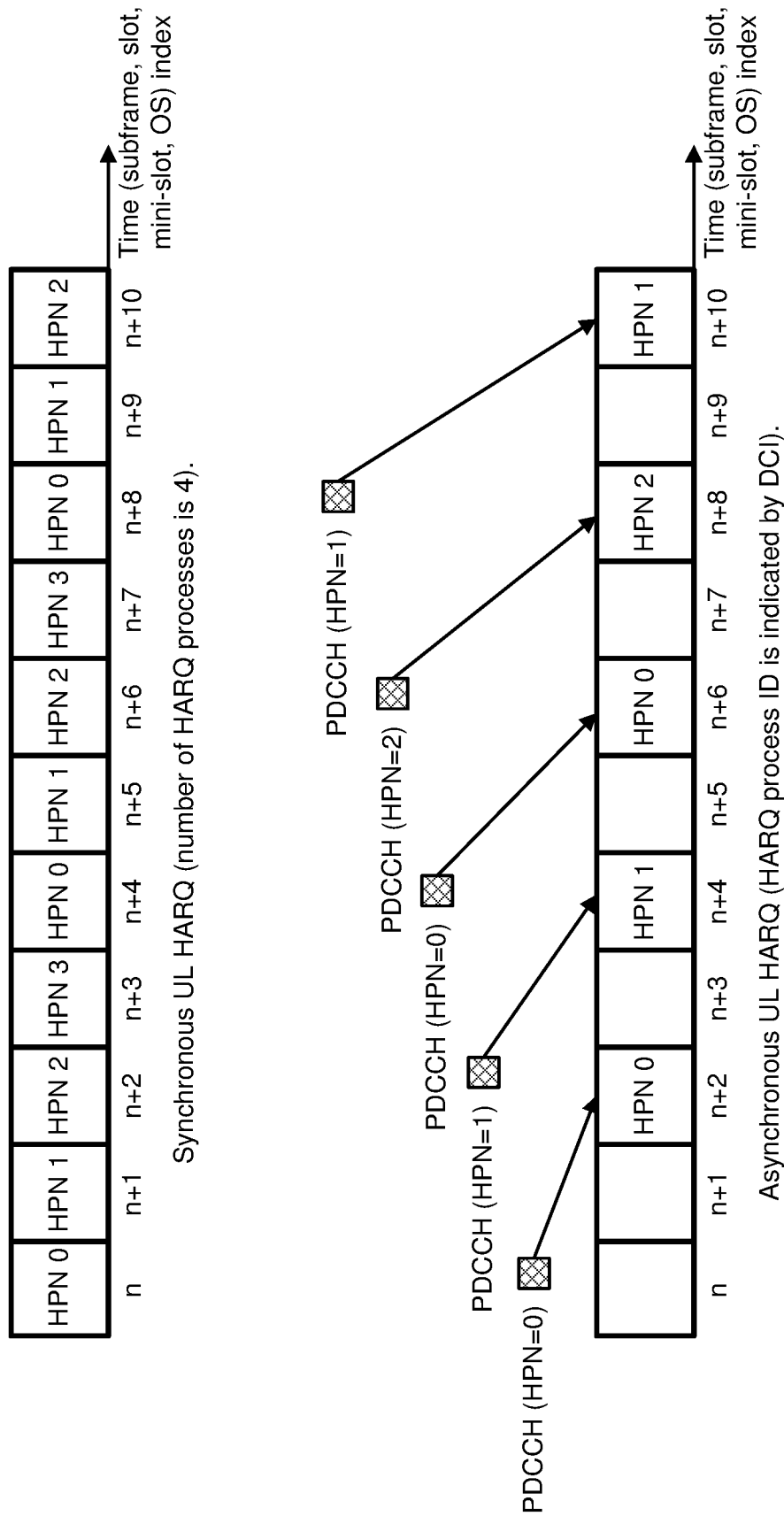
FIG. 10 is a diagram illustrating examples of synchronous HARQ and asynchronous HARQ.

FIG. 10 is a diagram illustrating examples of synchronous HARQ and asynchronous HARQ. NR may support synchronous HARQ, asynchronous HARQ or combination/enhancement of synchronous HARQ and asynchronous HARQ for UL transmission. For synchronous HARQ, timing between two adjacent transmissions in a HARQ process may be fixed. A HARQ process ID may be derived from the TTI (subframe/slot/mini-slot/OS) index. For asynchronous HARQ, timing between two adjacent transmissions in a HARQ process may be dynamic. A HARQ process ID may be explicitly indicated. Some examples of synchronous HARQ and synchronous HARQ are shown in FIG. 10.

Different services may use different types of HARQ procedures. Different types of transmissions may use different types of HARQ procedures. For example, a URLLC service may use synchronous HARQ, while an eMBB service may use asynchronous HARQ. Additionally or alternatively, an initial transmission may use synchronous HARQ, while retransmission may use asynchronous HARQ.

Figure 11A:
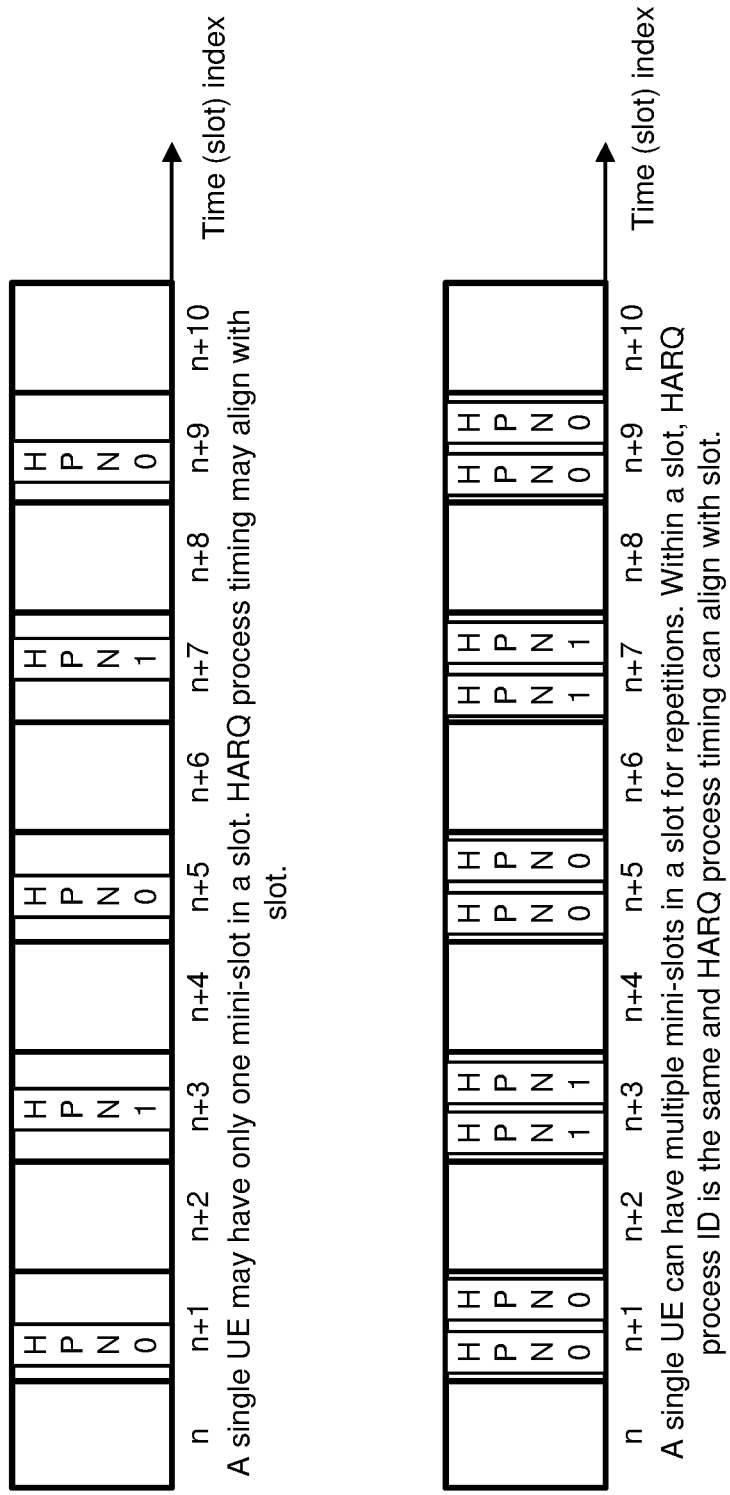
FIGS. 11A and 11B are diagrams illustrating examples of mini-slots. In some implementations, one or more mini-slots may be used in New Radio (NR)
Figure 11B:
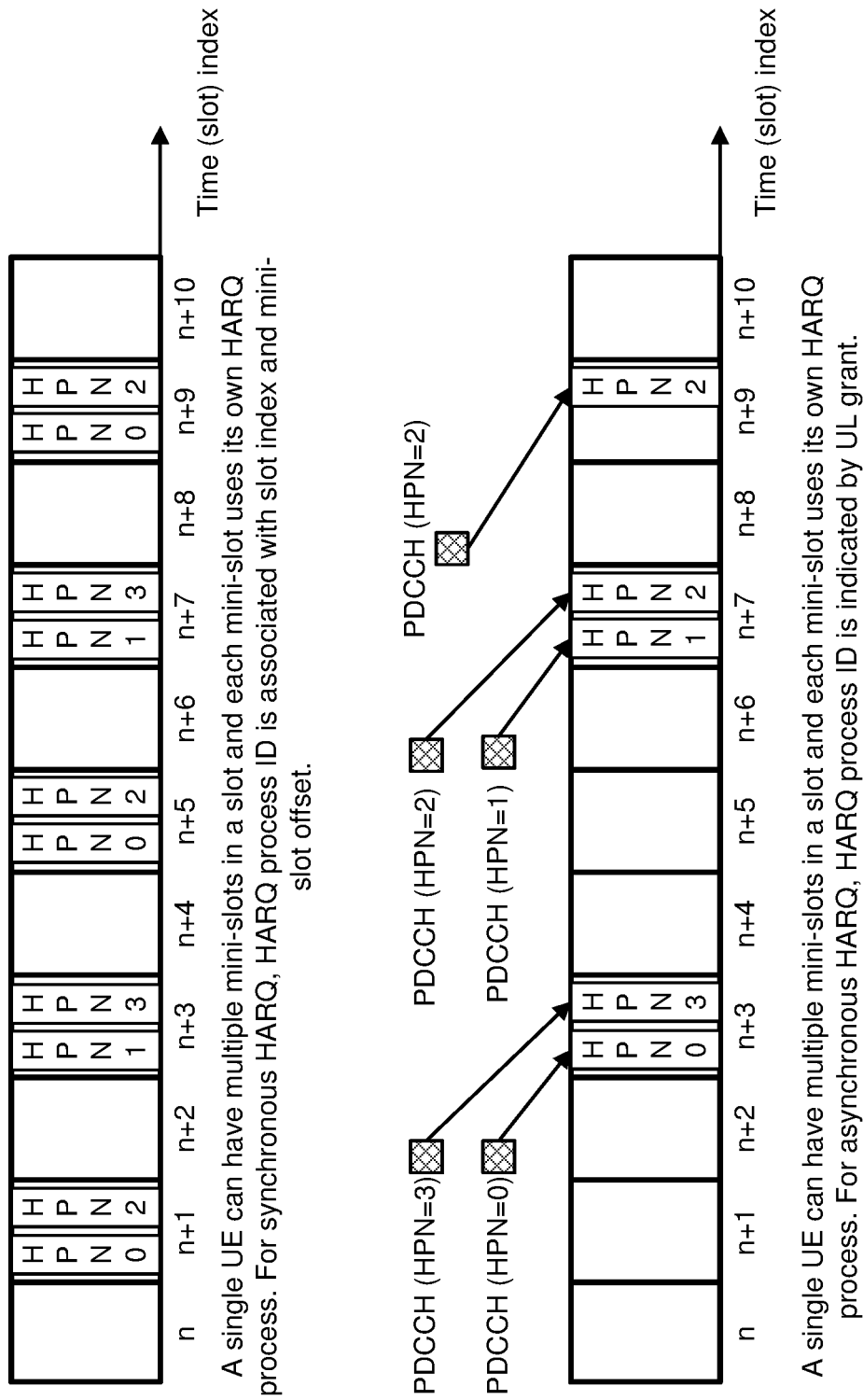

FIGS. 11A and 11B are diagrams illustrating examples of mini-slots. In some implementations, one or more mini-slots may be used in NR. Mini-slot transmission may use the same HARQ timing and procedure as regular HARQ (e.g., slot/subframe-based HARQ) or use a separate HARQ design. A UE 102 may support only one mini-slot in a slot in some approaches. In this case, mini-slot HARQ can align with slot-based HARQ. A UE 102 may support multiple mini-slots in a slot in some approaches, where these mini-slots may be used for repetitions of a same TB. In this case, mini-slot transmissions in a same slot may belong to a same HARQ process so that mini-slot HARQ can still align with slot-based HARQ. A UE 102 may have multiple mini-slots in a slot and each mini-slot may use its own HARQ process in some approaches. In this case, for synchronous HARQ, a HARQ process ID may be associated with the slot index and mini-slot offset. For asynchronous HARQ, a HARQ process ID may be indicated by UL grant. Some examples are shown in FIGS. 11A and 11B.

Figure 12:
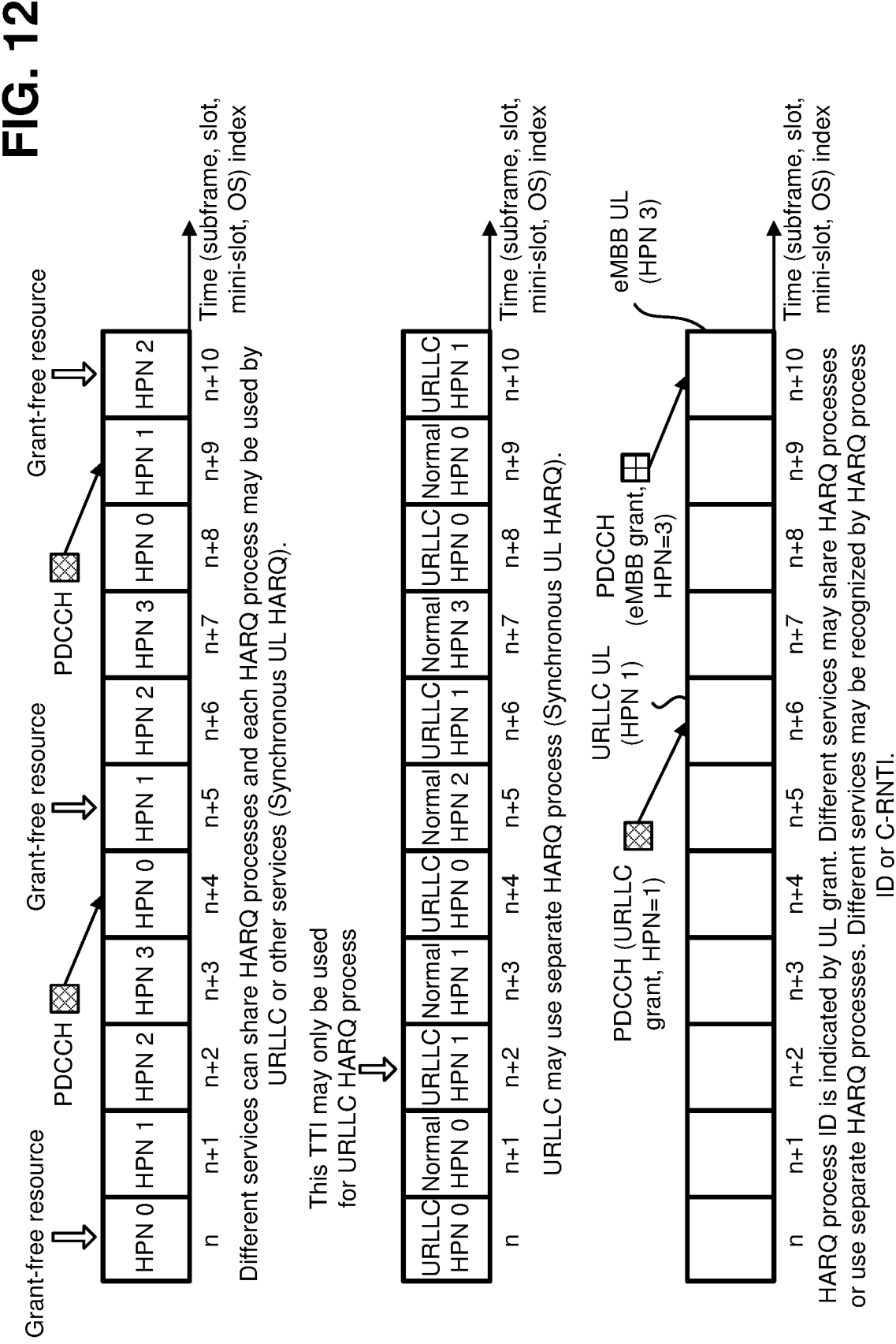
FIG. 12 is a diagram illustrating examples of HARQ procedures.

FIG. 12 is a diagram illustrating examples of HARQ procedures. In some approaches, URLLC may share HARQ processes with other services. In this case, each HARQ process may be used by URLLC or other services. In some approaches, URLLC may use separate HARQ processes. In this case, a URLLC service may be differentiated from other services by a corresponding dedicated HARQ process or a dedicated HARQ process ID. Some examples of URLLC-specific HARQ process for synchronous HARQ and asynchronous HARQ are shown separately in FIG. 12.

Figure 13:
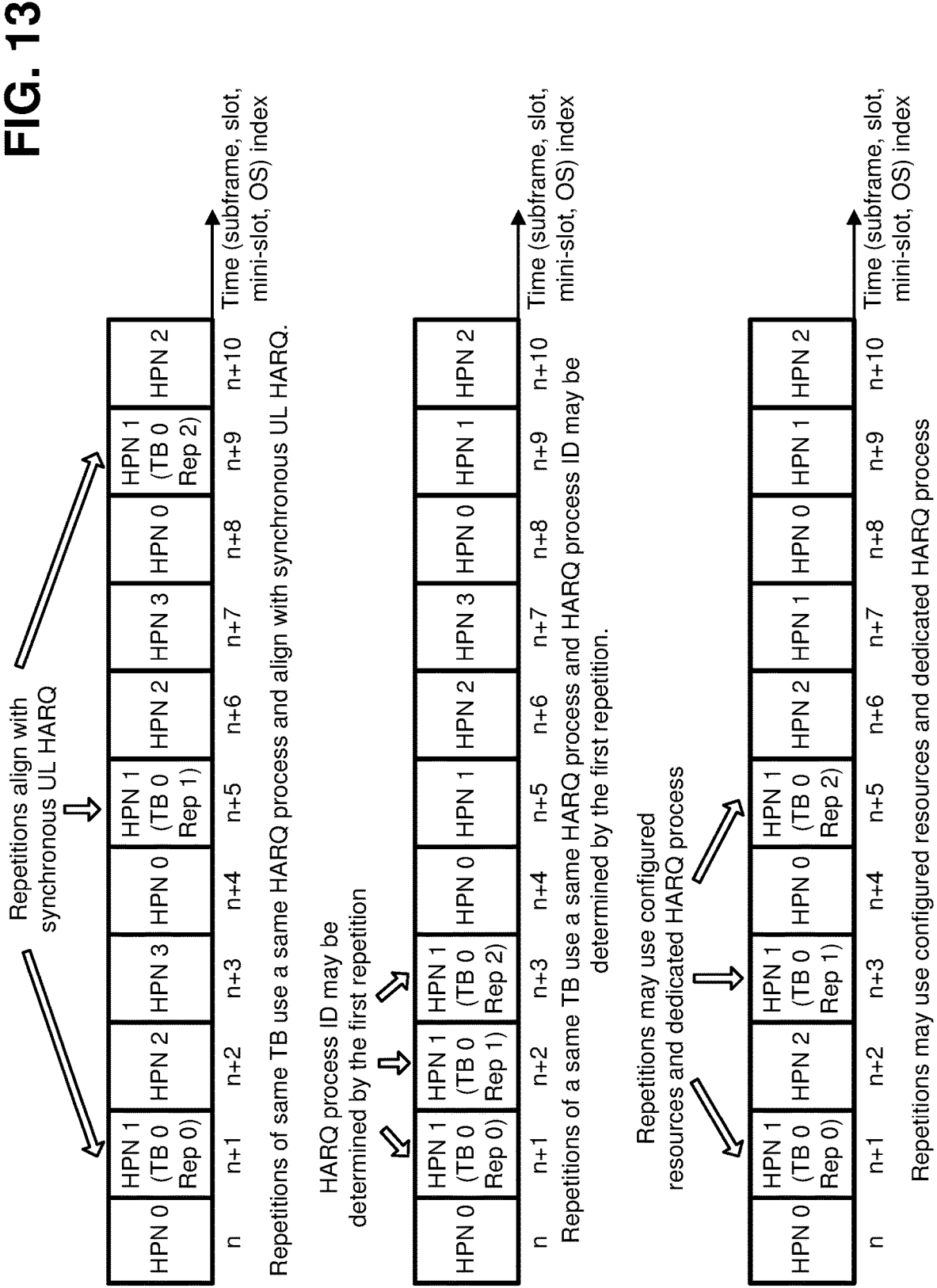
FIG. 13 is a diagram illustrating examples of repetitions.

FIG. 13 is a diagram illustrating examples of repetitions. Repetitions may be a set of transmissions for a same TB. Repetitions of a same TB may belong to a same HARQ process. To address the coexistence of a repetition HARQ process and a regular HARQ process, some mechanisms may be utilized and/or implemented. Repetitions of a same TB may only use TTIs that are corresponding to the same HARQ process in the case of synchronous HARQ. HARQ process ID of repetitions may be determined by the HARQ process ID of the first transmission. Repetitions may use configured resources and dedicated HARQ process(es). Some examples are shown in FIG. 13.

Figure 14:
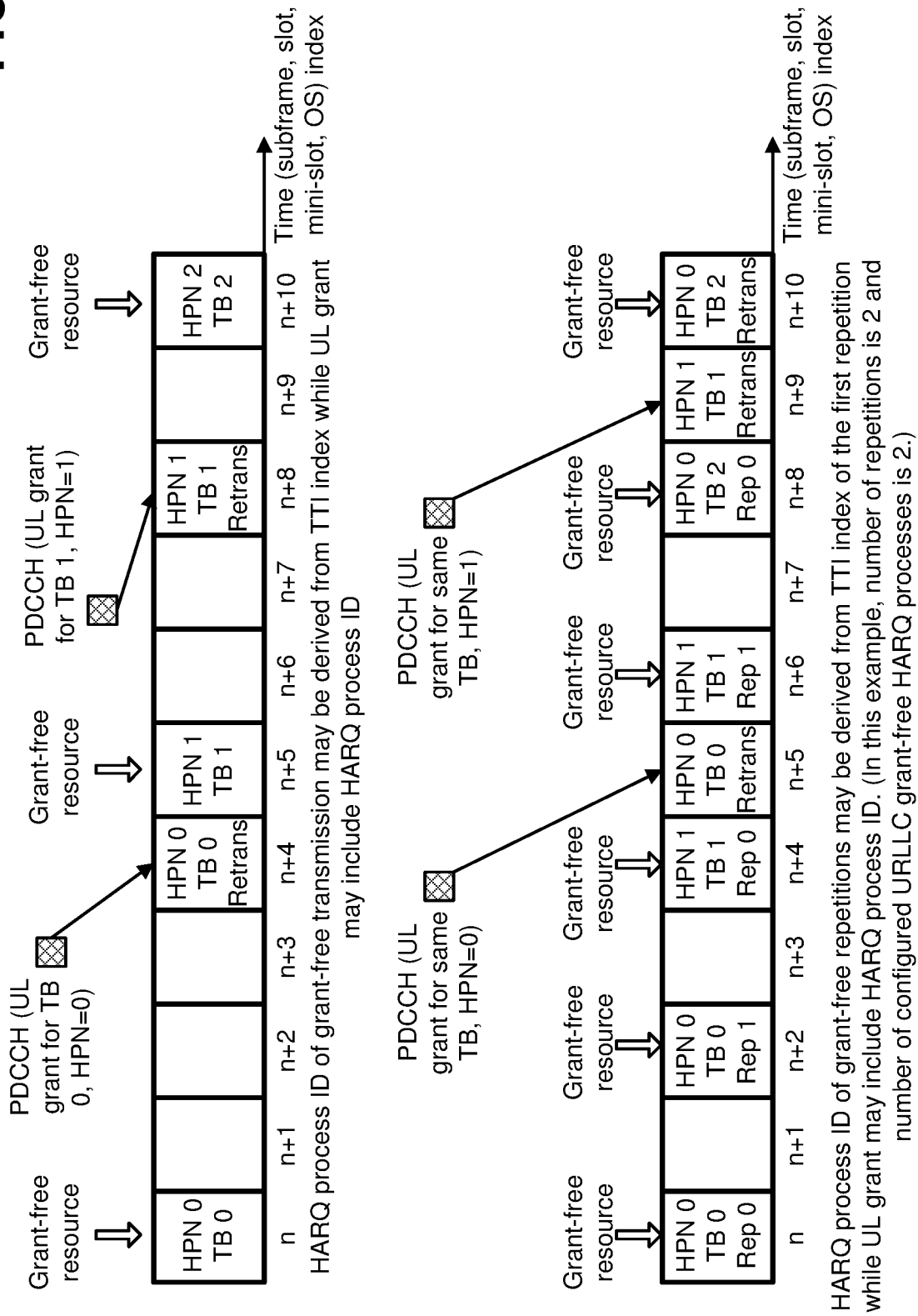
FIG. 14 is a diagram illustrating examples of grant-free transmission.

FIG. 14 is a diagram illustrating examples of grant-free transmission. For grant-free transmission, an UL grant may not be used so that HARQ process ID may not be indicated by DCI explicitly. A HARQ process ID of a grant-free transmission may be derived from a corresponding TTI index or the TTI index of a corresponding first repetition. However, grant-based retransmission can be either synchronous or asynchronous. By indicating HARQ process ID in the UL grant, for instance, a UE 102 may know which TB should be transmitted. Some examples are shown in FIG. 14.

Figure 15A:
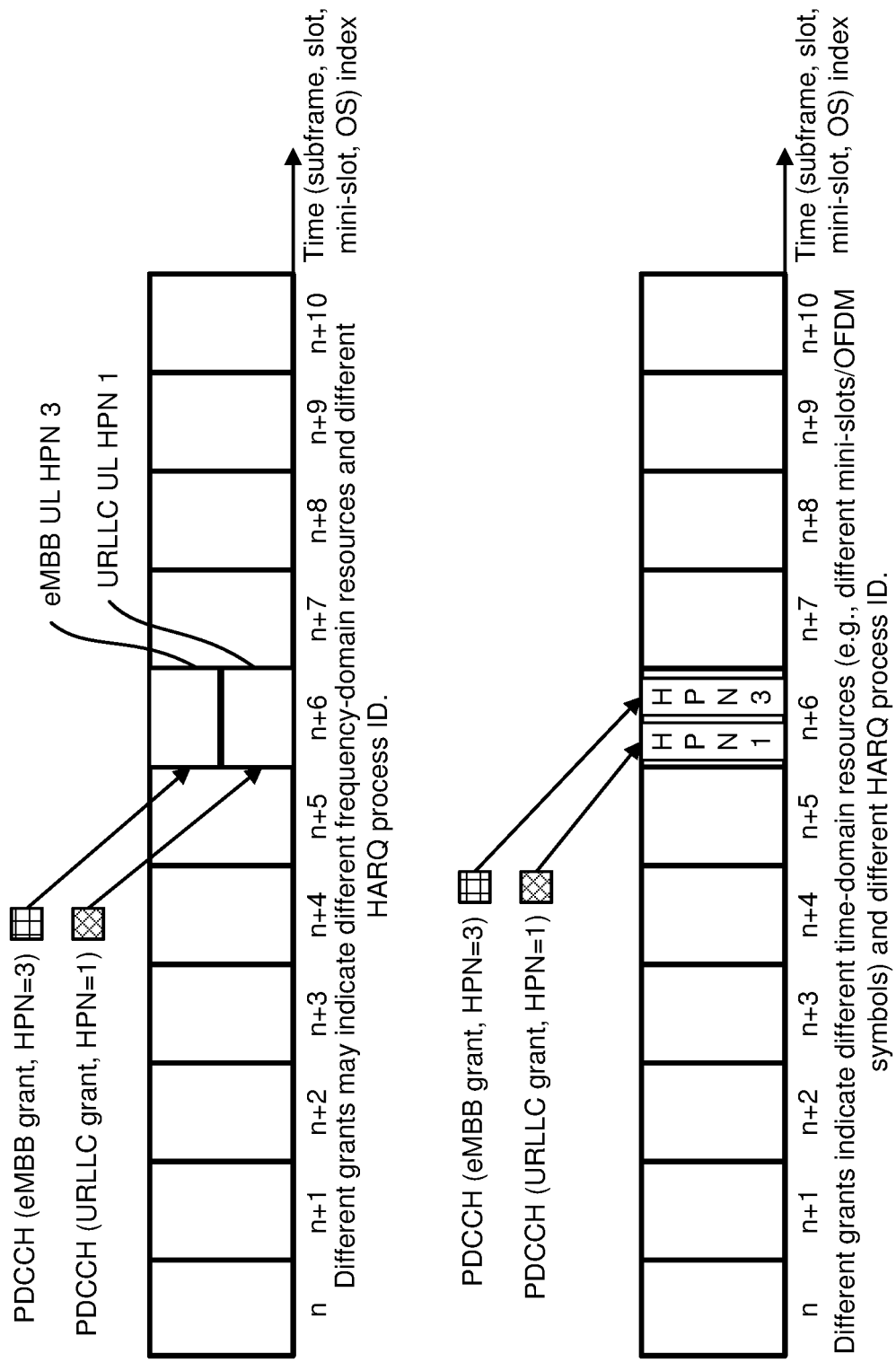
FIGS. 15A and 15B are diagrams illustrating examples of multiple HARQ processes.
Figure 15B:
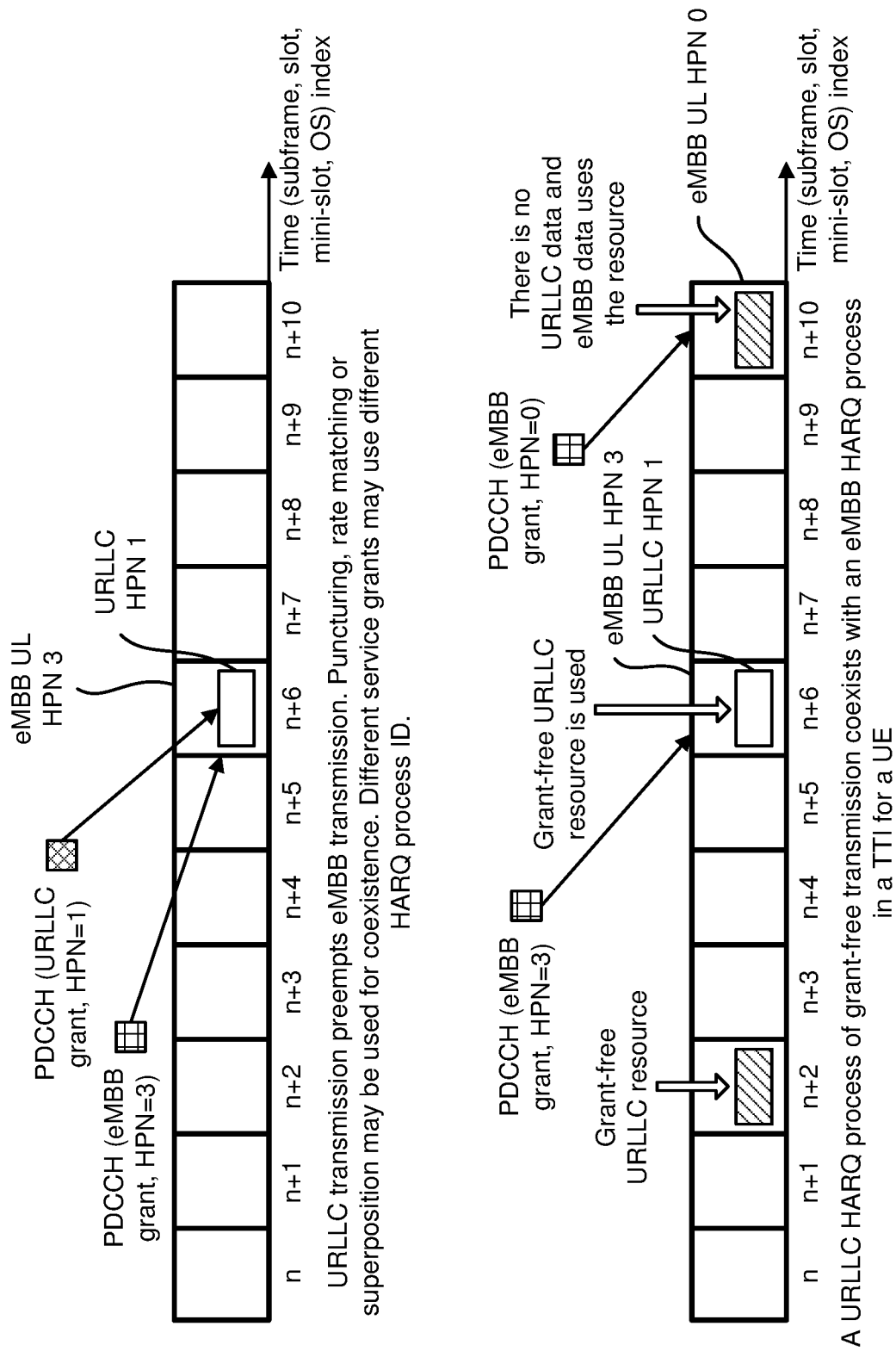

FIGS. 15A and 15B are diagrams illustrating examples of multiple HARQ processes. For a single UE 102, multiple HARQ process may be supported in a single TTI in some approaches. For example, in a single TTI, a UE 102 may have a HARQ process for URLLC and a HARQ process for eMBB. Some examples are shown in FIGS. 15A and 15B.

There may be different modes to handling activation, deactivation, reactivation, adjustment, modification, ACK/NACK, repetitions, and/or terminations (i.e., the terminations of the PUSCH transmission(s) (e.g., K repetitions), the stopping of the PUSCH transmission(s) (e.g., K repetitions)). For example, for the UE configured with the grant-free UL transmission (which may be referred as the UL transmission without the grant), there may be different modes to handling, activation/deactivation, reactivation/adjustment/modification, ACK/NACK, repetitions, terminations and so on.

For example, the UE may start (initiate) the PUSCH transmission(s) based on the activation (i.e., after the activation) as described above. Also, the UE may start the PUSCH transmission(s) based on the RRC configuration (i.e., after the RRC parameters are configured). The gNB may configure the PUSCH transmission with the activation or the without the activation. Namely, based on the configuration (e.g., the higher layer configuration), the UE may change (switch) a behavior for the PUSCH initial transmission. For example, in a case that the PUSCH transmission with the activation (e.g., the PUSCH transmission after the activation) is configured, the UE may perform the PUSCH initial transmission based on the activation being received. Also, in a case that the PUSCH transmission without the activation is configured, the UE may perform the PUSCH initial transmission based on the RRC configuration being received.

For example, a parameter skipActivation may be specified (specification may use a different name) in the RRC signaling (i.e., the RRC message). And, if the parameter skipActivation is set as false (or not configured), the UE may not perform the PUSCH initial transmission until the PUSCH transmission is activated. Namely, the UE may not perform the PUSCH transmission until grant-free transmission is activated. This mode is denoted as activation mode A for short. Namely, the activation mode A may include a mode for the UE to perform the PUSCH transmission after the activation. And, if the parameter skipActivation is set as true (or configured), the UE may perform the PUSCH initial transmission (without the activation) based on the RRC configuration being received. Namely, the UE may perform the PUSCH transmission without the activation if all the related parameters are already configured by the higher layer. This mode is denoted as activation mode B for short. Namely, the activation mode B may include a mode for the UE to perform the PUSCH transmission without the activation (based on the RRC configuration).

Also, the UE may adjust or modify some parameters for the UL transmission (i.e., the PUSCH transmission) without the grant. The adjustment or modification may be done (indicated and/or configured) by Layer 1 (Physical Layer, L1) signaling or the higher layer signaling (e.g., the RRC signaling and/or the MAC CE), which may depend on the higher layer configuration. For example, a parameter L1modification may be specified (specification may use a different name) in the RRC signaling. If the parameter L1modification is set as false (or not configured), the UE may not adjust or modify any parameters for the UL transmission without the grant until the higher layer signaling (e.g., the RRC and/or the MAC CE) for adjustment/modification of parameters is received (i.e., the higher layer parameters are received). This mode is denoted as a modification mode A for short. Namely, the modification mode A may include a mode for the UE to use the RRC parameters (i.e., the higher layer parameters) for the PUSCH transmission(s). Also, if the parameter L1modification is set as true (or configured), the UE may receive signaling on the PDCCH (e.g., the DCI, the L1 signaling) to adjust/modify the parameters for the UL transmission without the grant. Namely, the UE may use the PDCCH (e.g., the DCI, the L1 signaling) to adjust/modify the parameters. In this case, the UE may need to send HARQ-ACK (i.e., ACK/NACK feedback) for this PDCCH (i.e., the DCI, the L1 signaling) reception. Here, the PDCCH may be scrambled by the C-RNTI, the SPS C-RNTI and/or the URLLC C-RNTI, etc., which will be described below. Also, the UE may monitor the PDCCH in (on) the cell-specific search space (the CSS) or the UE-specific search space (the USS). This mode is denoted as a modification mode B for short. Namely, the modification mode B may include a mode for the UE to use the PDCCH (i.e., the DCI, the L1 signaling) for the PUSCH transmission(s).

Here, the gNB may transmit, to the UE, HARQ-ACK (i.e., a positive acknowledgment (ACK) and/or a negative acknowledgment (NACK)) for the PUSCH transmission(s) (e.g., the UL transmission without the grant). Namely, the UE may receive, from the gNB, the HARQ-ACK for PUSCH transmission(s). For example, a separate channel, which may be similar to Physical Hybrid-ARQ Indicator Channel (PHICH), may be used for the HARQ-ACK feedback from gNB. This mode is denoted by an acknowledgement mode A. Namely, the acknowledgment mode A may include a mode for the UE to receive the HARQ-ACK on a physical downlink channel other than the PDCCH.

In yet another example, the HARQ-ACK feedback may be included in (transmitted by using) a common DCI (a common PDCCH and/or a cell-specific UL grant). Here, the UE may detect the common DCI in the CSS (e.g., a cell-specific search space). Here, the HARQ-ACK feedback(s) may be bundled for multiple UEs. Namely, the single common DCI may be used for the transmission of the HARQ-ACK feedback to multiple UEs. For example, some fields (e.g., a first field) of the common DCI may be used for indicating the HARQ-ACK (i.e., ACK/NACK information). Also, the UE IDs (e.g., an index of the UE IDs, an index of the C-RNTI and/or the SPS C-RNTI assigned by the gNB) may be included in the corresponding fields (e.g., a second field, a second field which corresponds to the first field) explicitly or implicitly. This mode is denoted by an acknowledgement mode B. For example, the acknowledgment mode B may include a mode for the UE to receive the HARQ-ACK by using the common DCI (e.g., the common PDCCH, e.g., in the CSS).

In yet another example, the HARQ-ACK (e.g., ACK/NACK feedback) may be included in (transmitted by using) a UE-specific DCI (a UE-specific PDCCH and/or a UE-specific UL grant). Here, the UE may detect the UE-specific DCI in the USS. This mode is denoted by an acknowledgement mode C. For example, the acknowledgment mode C may include a mode for the UE to receive the HARQ-ACK by using the UE-specific DCI (e.g., the UE-specific PDCCH, e.g., in the USS).

In yet another example, the HARQ-ACK (e.g., ACK/NACK feedback) may not be needed explicitly. Namely, for example, only the UL grant (i.e., the UL grant itself) may be used for indicating a new transmission (i.e., the initial transmission) and/or the retransmission. For example, a parameter AckTimer may be specified (specification may use a different name) in the RRC signaling. Namely, if the parameter AckTimer is configured, the UE may flush the buffer in a case that no UL grant for the same TB is not received within AckTimer TTIs (e.g., subframes, slots, minislots, OFDM symbols) after the corresponding UL transmission. This mode is denoted by an acknowledgement mode D for short. Namely, the acknowledgment mode D may include a mode for the UE to use the parameter AckTimer for the PUSCH transmission.

In the examples above, only ACK may be necessary for indicating the HARQ-ACK feedback. Namely, the gNB may indicate, to the UE(s), only ACK for the PUSCH transmission. Here, the retransmission of the PUSCH transmission (e.g., the retransmission for the same TB) may be indicated by using the UL grant, which also serves the negative acknowledgement (NACK) (i.e., the UL grant, which may be used for indicating the NACK).

Besides the HARQ-ACK feedback (e.g., ACK/NACK may or may not be used), the UL grant may be used for indicating the UL transmission without the grant (e.g., the PUSCH transmission). For example, while the UE performs the PUSCH transmission(s) (e.g., the PUSCH transmission(s) without the grant), the UE may also receive the UL grant used for indicating the new transmission and/or the retransmission. Here, how to handle the UL grant for the UL transmission without the grant may depend on the higher layer configuration or be determined by some parts of the specifications. For example, a parameter AckULgrant may be specified (specification may use a different name) in the RRC signaling. And, if the parameter AckULgrant is configured by using the RRC signaling (or if the parameter AckULgrant is specified by specification), the UE may always assume (consider, interpret, treat) the UL grant as ACK for the PUSCH transmission (e.g., a previous transmission, a corresponding PUSCH transmission). This mode is denoted by an UL grant mode A for short. Namely, the UL grant mode A may include a mode for the UE to always assume the UL grant as ACK for the PUSCH transmission. Namely, the UL grant mode A may include a mode for the UE to stop (not perform) the PUSCH (re)transmission (and/or the repetition of the PUSCH transmission(s)) in a case that the UL grant is detected (received). Namely, the UL grant mode A may include a mode for the UE to stop (not perform) the PUSCH (re)transmission (and/or the repetition of the PUSCH transmission(s)) based on the detection of the UL grant (e.g., the DCI included in the UL grant). Namely, the mode A may include a mode for the UE to terminate the PUSCH (re)transmission (and/or the repetition of the PUSCH transmission(s)) based on the detection of the UL grant. Here, the details of the UL grant are described below.

In yet another example, a parameter NackULgrant may be specified (specification may use a different name) in the RRC signaling. And, if the parameter NackULgrant is configured by using RRC signaling (or the parameter AckULgrant is not configured by using the RRC signaling, or if the parameter NackULgrant is specified by specification), the UE may always assume (consider, interpret, treat) the UL grant as NACK for the PUSCH transmission (e.g., a previous transmission, a corresponding PUSCH transmission). This mode is denoted by an UL grant mode B for short. Namely, the UL grant mode B may include a mode for the UE to always assume the UL grant as NACK for the PUSCH transmission. Namely, the UL grant mode B may include a mode for the UE to perform the PUSCH (re) transmission (and/or the repetition of the PUSCH transmission(s)) in a case that the UL grant is detected (received). Namely, the UL grant mode B may include a mode for the UE to perform the PUSCH (re)transmission (and/or the repetition of the PUSCH transmission(s)) based on the detection of the UL grant (e.g., the DCI included in the UL grant). Namely, the mode B may include a mode for the UE to not terminate the PUSCH (re)transmission (and/or the repetition of the PUSCH transmission(s)) based on the detection of the UL grant. Here, the details of the UL grant are described below.

Additionally and/or alternatively, if the parameter Nack-ULgrant is configured by using RRC signaling (or the parameter AckULgrant is not configured by using the RRC signaling, or if the parameter NackULgrant is specified by specification), the UE may always assume (consider, interpret, treat) the UL grant as ACK and/or NACK for the PUSCH transmission (e.g., a previous transmission, a corresponding PUSCH transmission). Namely, information (e.g., a new data indicator, a HARQ process ID) included in the UL grant may be used for indicating ACK for the PUSCH transmission (i.e., indicating the new transmission) and/or NACK for the PUSCH transmission (i.e., indicating the retransmission). Namely, a value(s) set to an information field(s) included in the UL grant may be used for indicating the initial transmission and/or the retransmission. This mode is also denoted by UL grant mode B for short.

Namely, the UL grant mode B may include a mode for the UE to assume the UL grant as ACK and/or NACK for the PUSCH transmission. Namely, the UL grant mode B may include a mode for the UE to perform the PUSCH (re) transmission (and/or the repetition of the PUSCH transmission(s)) in a case that the UL grant indicating the retransmission (i.e., the DCI included in the UL grant indicating the retransmission (e.g., NACK)) is detected (received). Also, the UL grant mode B may include a mode for the UE to stop (not perform) the PUSCH (re)transmission (and/or the repetition of the PUSCH transmission(s)) in a case that the UL grant indicating the initial transmission (i.e., the DCI included in the UL grant indicating the initial transmission (e.g., ACK)) is detected (received). Here, the UE may perform the PUSCH initial transmission in a case the UL grant indicating the initial transmission is detected.

Namely, the UL grant mode B may include a mode for the UE to perform the PUSCH (re)transmission (and/or the repetition of the PUSCH transmission(s)) based on the detection of the DCI (included in the UL grant) indicating the retransmission. Also, the UL grant mode B may include a mode for the UE to stop (not perform) the PUSCH (re)transmission (and/or the repetition of the PUSCH transmission(s)) based on the detection of the DCI (included in the UL grant) indicating the initial transmission. Namely, the mode B may include a mode for the UE to not terminate the PUSCH (re)transmission (and/or the repetition of the PUSCH transmission(s)) based on the detection of the DCI (included in the UL grant) indicating the retransmission. Also, the mode B may include a mode for the UE to terminate the PUSCH (re)transmission (and/or the repetition of the PUSCH transmission(s)) based on the detection of the DCI (included in the UL grant) indicating the initial transmission. Namely, the mode B may include a mode for the UE to perform the PUSCH initial transmission (and/or the initial transmission of the repetition of the PUSCH transmission(s)) based on the detection of the DCI (included in the UL grant) indicating the initial transmission. Here, the details of the UL grant are described below.

Also, the repetitions (i.e., the repetitions of the PUSCH transmission(s)) may or may not be supported for the PUSCH transmission (e.g., the UL transmission without the grant). For example, a parameter repetition-Config may be specified (specification may use a different name) in the RRC signaling. And, if the parameter repetition-Config is set as true (or configured) by using the RRC signaling, the UE may perform the K repetitions including the initial transmission for the same transport block (e.g., the K may be defined, in advance, by the specification, or the K may be configured (or indicated) by using the RRC signaling (or by using the DCI (e.g., the PDCCH))). Also, if the parameter repetition-Config is set as false (or not configured), the UE may not perform the repetitions of the PUSCH transmission (i.e., the UE may not use the repetitions of the PUSCH transmission, the UE may perform the single PUSCH transmission). In yet another example, a parameter numberOfRepetition (i.e. the number of the K) may be specified in the higher layer. And, if the parameter numberOfRepetition is set to "1" by using the higher layer (e.g. the RRC signaling, MAC CE), the UE may not perform the repetitions of the PUSCH transmission. Also, if the parameter numberOfRepetition is set to a value greater than 1, the UE may perform the K repetitions (e.g., including the initial transmission for the same transport block). In yet another example, a set of K values may be configured by the RRC signaling and the selection of K (i.e., a single value of K among a set of K values) for the UL transmission without the grant is indicated by L1 signaling (i.e., the DCI, the PDCCH) or the MAC CE.

For the repetitions of the PUSCH transmission (i.e., the UL repetitions), as described above, the termination of repetitions may be used (indicated) or not (not indicated). For example, a parameter Noearlytermination may be specified (specification may use a different name) in the RRC signaling. And, if the parameter Noearlytermination is configured by using the RRC signaling (or if the parameter Noearlytermination is specified by specification), the UE may not terminate the repetitions of the PUSCH transmission until the number of repetitions for that TB reaches K. In yet another example, a parameter earlyACK may be specified (specification may use a different name) in the RRC signaling. And, if a parameter earlyACK is configured by using the RRC signaling (or if a parameter earlyACK is specified by specification), the UE may terminate the repetitions when ACK is received (e.g., ACK is received even though the number of repetitions for that TB may not reach K). Here, as described above, ACK may be transmitted on the physical downlink channel. Also, ACK may be transmitted by using the common DCI. Also, ACK may be transmitted by using the UE-specific DCI. In yet another example, a parameter earlyULgrant may be specified (specification may use a different name) in the RRC signaling. And, if the parameter earlyULgrant is configured by using the RRC signaling (or if the parameter earlyULgrant is specified by specification), the UE may terminate the repetitions in a case that the UL grant is received. Namely, the UE may terminate the repetitions based on the detection of the UL grant (e.g., even though the number of repetitions for that TB may not reach K).

On the other hand, besides UE-specific RNTIs, UE may have (be assigned by the gNB) one or more kinds of common Radio Network Temporary Identifiers (RNTIs). One example is Paging RNTI (P-RNTI), which is used for Paging Message. Another example is System Information RNTI (SI-RNTI), which is used for transmission of SIB messages. Yet another example is Random Access RNTI (RA-RNTI) which is used for PRACH Response. Yet another example is Temporary C-RNTI (T-RNTI), which is used during RACH.

If parameters used for the PUSCH transmission (e.g., the UL transmission without the grant), such as a time resource(s) (e.g. a periodicity and/or a offset value (e.g., TTI offset)), a frequency resource(s) (e.g. an index of PRB), a spatial resource(s) (e.g., an antenna port, the number of the antenna port for the UL transmission), MCS, the repetition number K and/or the hopping pattern, are configured by using the RRC signaling, the UE may perform, based on the configured parameters, the PUSCH transmission (the UL data transmission) without L1 signaling (i.e., without the activation). Here, as described above, in a case that the UE is configured to skip the activation (e.g., the parameter skipActivation is configured by using the RRC signaling or it is determined by some parts of the specification), the UE may perform the PUSCH transmission using the configured parameters (e.g., the configured resource(s)) without L1 signaling (i.e., without the activation). And, as described above, if the UE is configured with the L1 modification for the parameters of the UL transmission without grant (e.g. the parameter L1modification is configured by using the RRC signaling or it is determined by some parts of the specification), the UE may monitor the PDCCH (the DCI, the UL grant) to check whether the related parameters will be modified. Namely, only in a case that the parameter L1modification is configured, the UE may monitor the PDCCH (the DCI, the UL grant) used for modifying the parameters.

Here, if a specific C-RNTI (e.g., the C-RNTI, the SPS C-RNTI, and/or the URLLC C-RNTI) is assigned for the PUSCH transmission (e.g., the UL transmission without the grant) (i.e., the UL transmission based on the parameters configured by using RRC signaling) and the specific RNTI is denoted by C-RNTI 1, the PDCCH (the DCI, the UL grant) used for parameters modification may be scrambled by the C-RNTI 1. To indicate that the PDCCH (the DCI, the UL grant) is used for parameters modification, some fields may be set as defaulted values, e.g., TPC field in the DCI may be set as all 0, or cyclic shirt DM-RS field may be set as all 0. Namely, in a case that each of one or more fields included in the DCI (e.g., the PDCCH) may be set to each of certain values, the DCI (e.g., the PDCCH) may be used for modifying the parameters. Here, one or more fields and/or the certain values may be defined, in advance, by the specification and known information between the gNB and the UE. Also, to change (e.g., modify) some parameters (e.g., a value(s) of a parameter(s)) for the PUSCH transmission (e.g., the UL transmission without the grant), the corresponding fields (these fields may use different names in specifications) in the DCI, such as the MCS, the repetition number (if there is), the hopping pattern (if there is), the index of PRB, etc., may be adjusted. In some cases, the DCI format may not include the corresponding fields for the parameter adjustment. Some fields may be reused for the parameter adjustment. For example, there may not be the repetition number field (or the hopping pattern field). For example, as described above, the set of the repetition numbers may be configured by using the RRC signaling and one of the set of the repetition numbers may be indicated by using the DCI (e.g., the PDCCH). Here, for example, in a case that the PDCCH is used for the changing (e.g., modifying) the parameter(s) (e.g., the value(s) of the parameter(s)), a value of TPC command for PUCCH (i.e., a value set to a field of the TPC command for PUCCH) may be used for indicating the parameter(s) (e.g., the value(s) of the parameter(s)). Also, for example, in a case that the PDCCH is used for the changing (e.g., modifying) the parameter(s) (e.g., the value(s) of the parameter(s)), a value of HARQ process number (i.e., a value set to a field of the HARQ process number) may be used for indicating the parameter(s) (e.g., the value(s) of the parameter(s)). Some other fields may be used for the modification of the repetition number (or the hopping pattern), e.g., the TPC field is reused for indicating the repetition number (or the hopping pattern):

TABLE 1

| Value of 'TPC command for PUCCH' | Repetition number K |
|---|---|
| '00' | Repetition number a |
| '01' | Repetition number b |
| '10' | Repetition number c |
| '11' | Repetition number d | or

TABLE 2

| Value of 'TPC command for PUCCH' | Hopping pattern |
|---|---|
| '00' | Hopping pattern a |
| '01' | Hopping pattern b |
| '10' | Hopping pattern c |
| '11' | Hopping pattern d |

Or, HARQ process number field (if present) is reused to indication repetition number (or hopping pattern):

TABLE 3

| Value of 'HARQ process number' | Repetition number K |
|---|---|
| '000' | Repetition number a |
| '001' | Repetition number b |
| '010' | Repetition number c |
| '011' | Repetition number d |
| '100' | Repetition number e |
| '101' | Repetition number f |
| '110' | Repetition number g |
| '111' | Repetition number h | or

TABLE 4

| Value of 'HARQ process number' | Hopping pattern |
|---|---|
| '000' | Hopping pattern a |
| '001' | Hopping pattern b |
| '010' | Hopping pattern c |
| '011' | Hopping pattern d |
| '100' | Hopping pattern e |
| '101' | Hopping pattern f |
| '110' | Hopping pattern g |
| '111' | Hopping pattern h |

For example, the UE may use the following procedure to modify the parameters for the PUSCH transmission (e.g., the UL transmission without the grant). Namely, as a Step 1, the UE may monitor PDCCH (e.g., the PDCCH scrambled by a specific C-RNTI assigned to this UL transmission without grant, the PDCCH with the specific C-RNTI). And, as a Step 2, the UE may verify the PDCCH (the DCI, the UL grant) by checking the predefined field(s) (as described above). And, if the predefined field(s) are set to the predefined values, as a Step 3, the UE may modify the parameters for the PUSCH transmission (e.g., the UL transmission without the grant) based on the values of the related field(s). And, as a Step 4, the UE may transmit the HARQ-ACK (e.g., ACK/NACK feedback) to indicate whether the parameters modification is successful or not. Namely, the UE may transmit the HARQ-ACK for the DCI (e.g., the PDCCH) used for modifying the parameters. For example, the UE may transmit, on the PUCCH, the HARQ-ACK for the DCI (e.g., the PDCCH) used for modifying the parameters. Also, for example, the UE may transmit, by using the MAC CE, the HARQ-ACK for the DCI (e.g., the PDCCH) used for modifying the parameters. As an example, the UE may monitor the PDCCH (e.g., the PDCCH scrambled by the C-RNTI 1, the PDCCH with the C-RNTI 1). If the TPC field in the DCI is set as all 0 and the cyclic shirt for DM-RS field is set as all 0, the UE may modify the MCS and the frequency resource for the PUSCH transmission (e.g., the UL transmission without the grant) based on the value(s) of MCS field and PRB field in the DCI and adjusts the repetition number based on the HARQ process number field by looking up Table 3. Finally, the UE send an acknowledgement to the UE indicating the L1 modification is successful.

Here, if the UE may not be configured to the skip activation (e.g., if the parameter skipActivation is not configured by using the RRC signaling or some parts of the specification determined that activation is required), the UE may perform the PUSCH transmission after the DCI indicating the activation is received (i.e., the UE may transmit UL data at the configured resource after L1 activation). Here, some parameters used for the PUSCH transmission (e.g., the UL transmission without the grant), such as the time resource(s) (e.g. the periodicity and/or the offset value (e.g., the TTI offset)), the spatial resource (e.g., the antenna port, the number of the antenna port), the set of the repetition numbers and/or the set of the hopping pattern, may be configured by using the RRC signaling. Also, some parameters (e.g., some other parameters) may be included in the DCI indicating the activation (i.e., the PDCCH, the L1 activation), such as the frequency resource(s) (e.g. the index of PRB), the MCS, the repetition number K and/or the hopping pattern. Also, the specific C-RNTI (e.g., the SPS C-RNTI, and/or the URLLC C-RNTI) may be assigned for the PUSCH transmission (e.g., the UL transmission without the grant) by using the RRC signaling, and the specific RNTI is also denoted by the C-RNTI 1 here (it may be or may not necessarily be a same C-RNTI as the UL transmission configured with the skipping activation above), the PDCCH (the DCI, the UL grant) used for the activation (i.e., the L1 activation) may be scrambled by the C-RNTI 1 (i.e., the PDCCH with the C-RNTI 1). The example of the PDCCH (the DCI, the UL grant) used for the activation (i.e., the L1 activation) may be similar to the PDCCH (the DCI, the UL grant) used for the parameters modification described above. To indicate that the PDCCH (the DCI, the UL grant) is used for activation/reactivation, some fields may be set to a defaulted value(s), e.g., the TPC field in the DCI may be set as all 0, or the cyclic shirt for DM-RS field may be set as all 0. To set or reset some parameters for the PUSCH transmission (e.g., the UL transmission without the grant), the corresponding fields (these fields may use different names in specifications) in the DCI, such as the MCS, the repetition number (if there is), the hopping pattern (if there is), the PRB index, etc., may be adjusted. In some cases, the DCI format may not include the corresponding fields for the parameter setup or adjustment. Some fields may be reused for the parameter setup or adjustment. For example, there may not be the repetition number field (or the hopping pattern field). Some other fields may be used for the modification of the repetition number (or the hopping pattern), e.g., the TPC field or the HARQ process number field may be reused for indicating the repetition number (or the hopping pattern) like Table 1-4. The procedure is a little bit different. In general, as a Step 1, some related parameters may be configured for the PUSCH transmission (e.g., the UL transmission without the grant) by using the RRC signaling; as a Step 2, the UE may monitor the PDCCH scrambled by the specific C-RNTI (e.g., the PDCCH with the specific C-RNTI assigned to this UL transmission without the grant); as a Step 3, the UE may verify the PDCCH (the DCI, the UL grant) by checking the predefined fields; if these fields are set to the predefined values, as a Step 4, the UE set remaining parameters for the PUSCH transmission (e.g., the UL transmission without the grant) based on the values of the related fields; as a Step 5, the UE transmit the HARQ-ACK used for indicating whether the activation is successful or not; if the activation is successful, as a Step 6, the UE may start the PUSCH transmission (e.g., the UL transmission without the grant) based on the parameters; and the UE may repeat Step 2-6 to reactivate or adjust the parameters for the PUSCH transmission (e.g., the UL transmission without the grant).

Here, the specific C-RNTI (e.g., the C-RNTI, the SPS C-RNTI, and/or the URLLC C-RNTI) may be assigned for the PUSCH transmission (e.g., the UL transmission without the grant) by using the RRC signaling and the specific RNTI is also denoted by the C-RNTI 1. The PDCCH (the DCI, the UL grant) scrambled by the C-RNTI 1 (i.e., the PDCCH with the C-RNTI) may be used not only for the activation, reactivation, parameters modification, and/or adjustment but also ACK/NACK feedback or the UL grant for (re)transmission. Here, if the parameter AckULgrant (specification may use a different name) is configured by using the RRC signaling or it may be specified by specification, the UE may always assume (consider, interpret, treat) the UL grant (with some fields set as default values) as ACK for the PUSCH transmission (e.g., a previous transmission) in the indicated HARQ process and/or the UL grant may indicate a new transmission. Without receiving the UL grant, the UE may retransmit at the configured resource without the grant. A procedure is described as example: after the PUSCH transmission (e.g., the UL transmission without the grant), the UE may receive the corresponding UL grant scrambled by RNTI 1 then UE may flush the buffer of the TB in the previous transmission. If the parameter NackULgrant (specification may use a different name) is configured by using the RRC signaling or it may be specified by specification, the UE may always assume (consider, interpret, treat) the UL grant as NACK for the PUSCH transmission (e.g., a previous transmission) in the indicated HARQ process. The UL grant may also indicate a retransmission. A procedure is described as example: after the PUSCH transmission (e.g., the UL transmission without the grant), the UE may receive the corresponding UL grant (for the same HARQ process) scrambled by C-RNTI 1 then UE may retransmit by following the UL grant. If neither AckULgrant nor NackULgrant is configured, some information (e.g. the new data indicator, and/or the HARQ process ID) included in the UL grant may be used for indicating whether it is a positive acknowledgment (ACK) or a negative acknowledgement (NACL) for the previous transmission. A procedure is described as example: after the PUSCH transmission (e.g., the UL transmission without the grant), the UE may receive the corresponding UL grant (for the same HARQ process) scrambled by C-RNTI 1. If the NDI (New Data Indicator field) indicates "0", the UE transmits a new TB by following the UL grant. If NDI indicates "1", UE retransmits the same TB by following the UL grant.

The UE may have a group common C-RNTI, which is denoted by C-RNTI 2. The UE may monitor the PDCCH (the DCI, the UL grant) scrambled by C-RNTI 2. The PDCCH (the DCI, the UL grant) scrambled by the C-RNTI 2 may be used for ACK feedback of the PUSCH transmission (e.g., the UL transmission without the grant). Some fields in the DCI may contain information for UE identification. The general procedure may be as follows: as a Step 1, the UE may transmit, in a timing index n (e.g., in a subframe, in a slot, in a mini-slot, in a OFDM symbol); as a step 2, the UE may monitor the corresponding PDCCH scrambled by C-RNTI 2 in a timing index n+D (D may be configured (indicated, determined) by using the RRC signaling or other parts of specification); as a Step 3, the UE checks the predefined fields (e.g., the MCS field, the HARQ process number field, the TPC field, the cyclic shirt for DM-RS field, etc.) in the DCI and verify its ID information by predefined rules (e.g., the i-th bit in the predefined field indicates "1" and i is corresponding to the UE ID, or the value of UE ID is explicit indicated in the predefined field.); if the verification is successful, as a Step 4, the UE may flush the buffer of the corresponding transmission.

The UE may have a UE-specific C-RNTI, which is obtained from the RACH procedure. The UE-specific C-RNTI is denoted by C-RNTI 0 here. The UE (e.g., the UE configured with the grant-free transmission) may also monitor the PDCCH (the DCI, the UL grant) scrambled by C-RNTI 0. The UE may not expect to receive the PDCCH (the DCI, the UL grant) scrambled by C-RNTI 0 for the same HARQ process(es) of the PUSCH transmission (e.g., the UL transmission without the grant_. In yet a different implementation, the UE may receive the PDCCH (the DCI, the UL grant) scrambled by the C-RNTI 0 for the same HARQ process(es) of the PUSCH transmission (e.g., the UL transmission without the grant). In this case, the UE may always assume that the UL grant is for the new transmission (or the retransmission).

Here, as described above, the UE may monitor a set of candidates of the DL control channel(s) (e.g., the PDCCH). Also, the set of candidates of the DL control channel(s) which the UE monitors may be also referred to as the search space (e.g., the CSS and/or the USS). And, the RNTI(s) assigned to the UE may be used for transmission of DCI (transmission of DL control channel(s)). For example, the UE may attempt to decode DCI to which the CRC parity bits scrambled by the RNTI(s) are attached, and detects the DL control channel (e.g., the PCCH (e.g., the PDCCH), the DCI, the DCI format). That is, the UE may decode the DL control channel(s) with the CRC scrambled by the RNTI(s). That is, the UE may monitor the DL control channel(s) with the RNTI(s). Namely, for example, the UE may monitor the UL grant with the RNTI(s).

Here, as described above, the RNTI(s) may include, at least, the C-RNTI (Cell-RNTI), the SPS C-RNTI, the RA-RNTI (Random Access-RNTI) and/or the Temporary C-RNTI. For example, the C-RNTI may be a unique identification used for identifying RRC connection and scheduling. Here, the PDCCH (e.g., the DCI) with the C-RNTI may be detected (received) in the CSS and/or the USS. Also, the SPS C-RNTI may be a unique identification used for semi-persistent scheduling. Here, the PDCCH (e.g., the DCI) with the SPS C-RNTI may be detected (received) in the CSS and/or the USS. Also, the RA-RNTI may be an identification used for the random-access procedure. Here, the PDCCH (e.g., the DCI) with the RA-RNTI may be detected in the CSS (i.e., the CSS only). Also, the Temporary C-RNTI may be used for the random-access procedure. Here, the Temporary C-RNTI may be detected in the CSS (i.e., the CSS only)/

Figure 16:
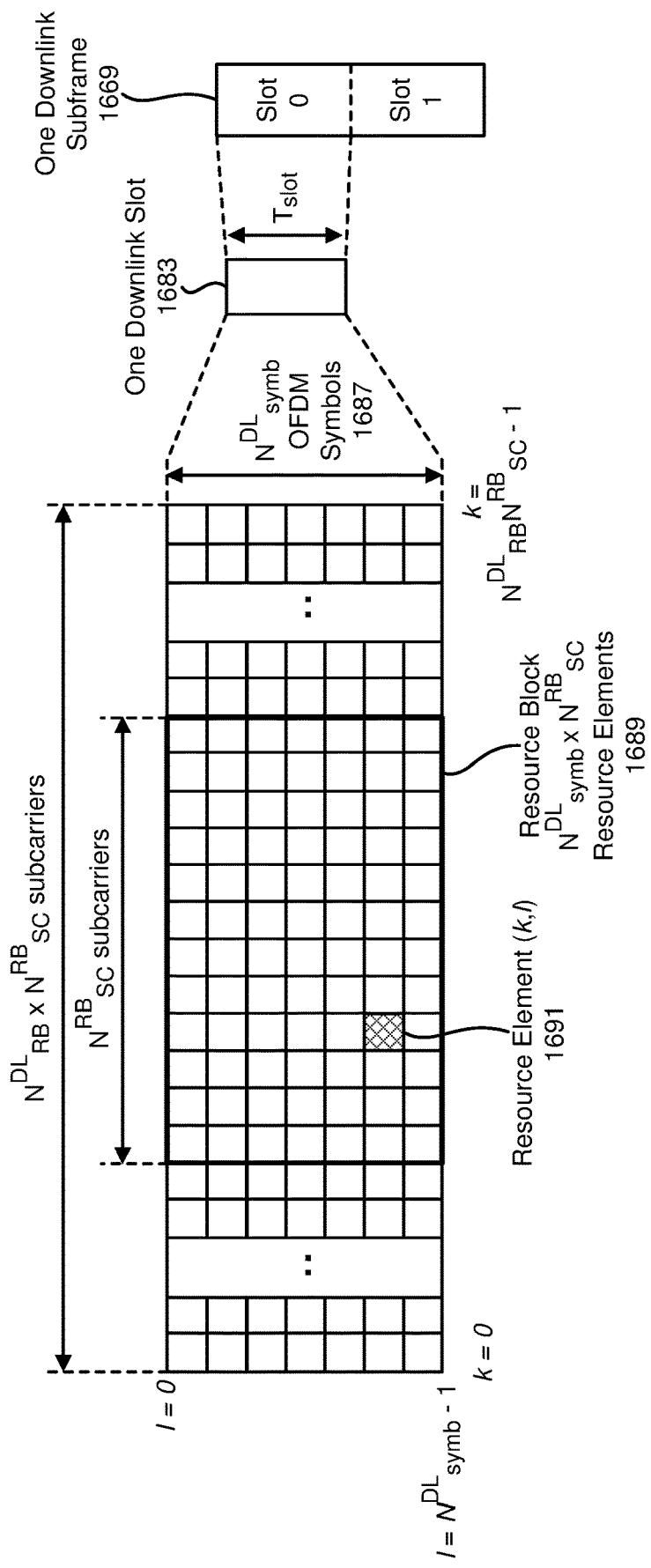
FIG. 16 is a diagram illustrating an example of a resource grid for the downlink.

FIG. 16 is a diagram illustrating an example of a resource grid for the downlink. The resource grid illustrated in FIG. 16 may be utilized in some implementations of the systems and methods disclosed herein. More detail regarding the resource grid is given in connection with FIG. 1.

In FIG. 16, one downlink subframe 1669 may include two downlink slots 1683. $N^{DL}_{RB}$ is downlink bandwidth configuration of the serving cell, expressed in multiples of $N^{RB}_{sc}$, where $N^{RB}_{sc}$ is a resource block 1689 size in the frequency domain expressed as a number of subcarriers, and $N^{DL}_{symb}$ is the number of OFDM symbols 1687 in a downlink slot 1683. A resource block 1689 may include a number of resource elements (RE) 1691.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 1691 may be the RE 1691 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 17:
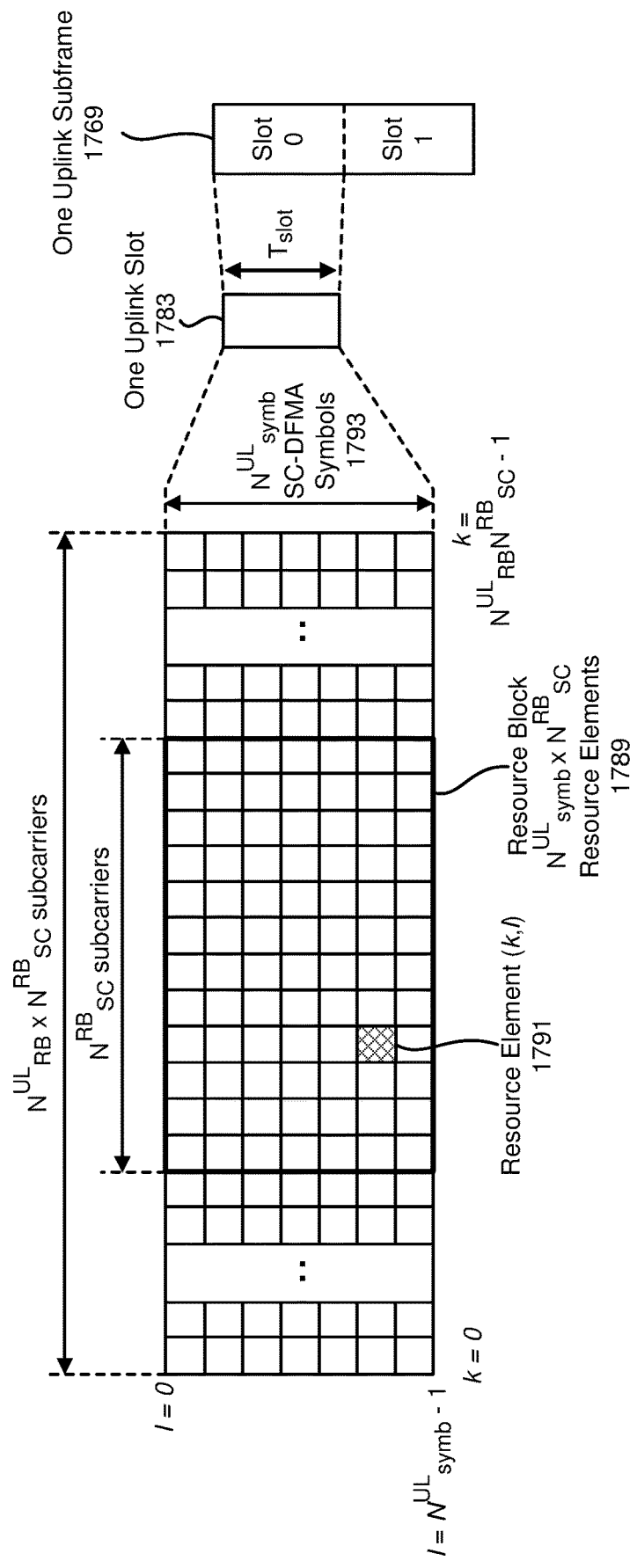
FIG. 17 is a diagram illustrating one example of a resource grid for the uplink.
Figures 18A, 18B, 18C, 18D:
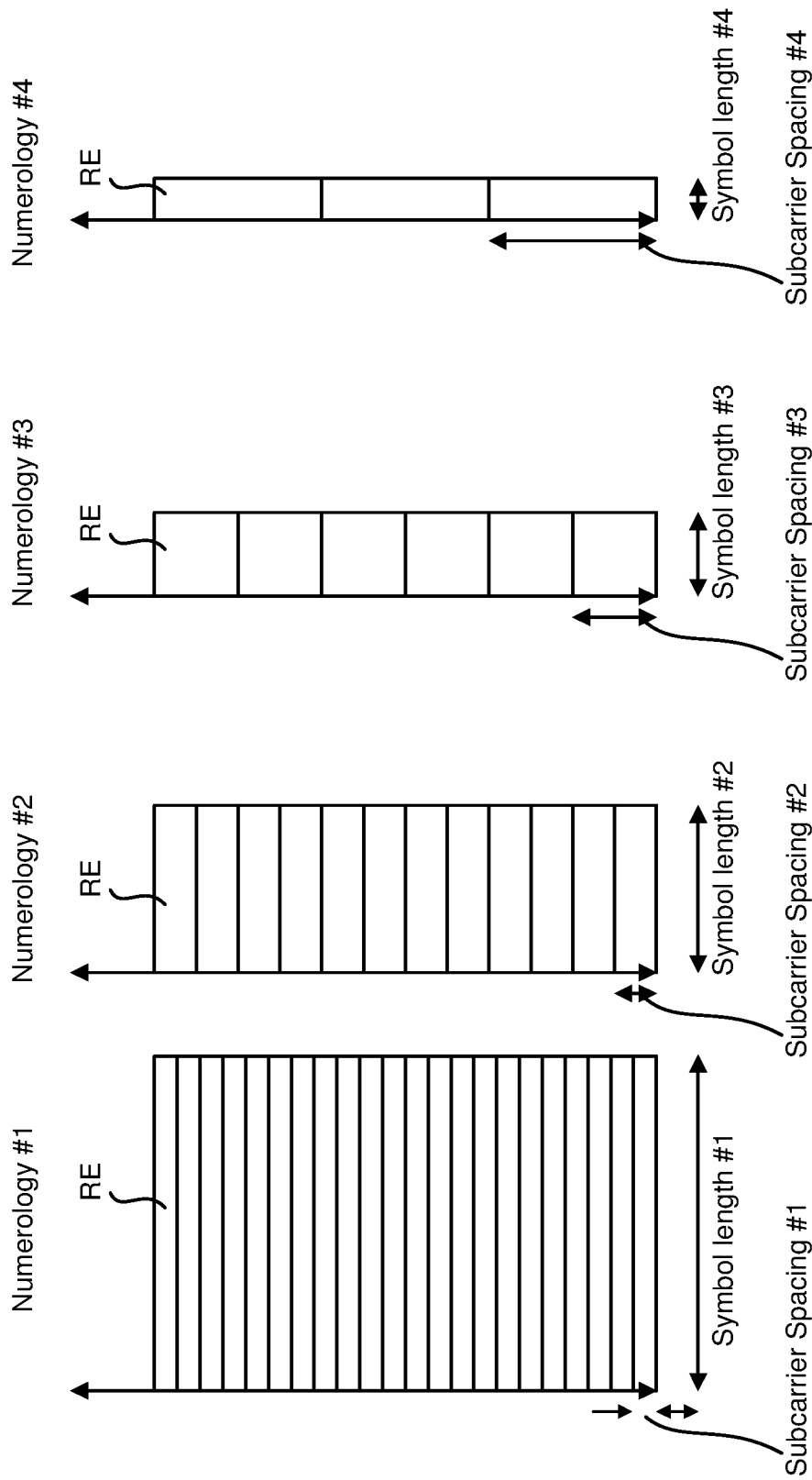
FIGS. 18A, 18B, 18C, and 18D show examples of several numerologies.

FIG. 17 is a diagram illustrating one example of a resource grid for the uplink. The resource grid illustrated in FIG. 17 may be utilized in some implementations of the systems and methods disclosed herein. More detail regarding the resource grid is given in connection with FIG. 1.

In FIG. 17, one uplink subframe 1769 may include two uplink slots 1783. $N^{UL}_{RB}$ is uplink bandwidth configuration of the serving cell, expressed in multiples of $N^{RB}_{sc}$, where $N^{RB}_{sc}$ is a resource block 1789 size in the frequency domain expressed as a number of subcarriers, and $N^{UL}_{symb}$ is the number of SC-FDMA symbols 1793 in an uplink slot 1783. A resource block 1789 may include a number of resource elements (RE) 1791.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-

OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in the time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

FIGS. 18A, 18B, 18C, and 18D show examples of several numerologies. The numerology #1 may be a basic numerology (e.g., a reference numerology). For example, a RE of the basic numerology is defined with subcarrier spacing of 15 kHz in frequency domain and 2048 Ts+CP length (e.g., 160 Ts or 144 Ts) in time domain, where Ts denotes a baseband sampling time unit defined as 1/(15000*2048) seconds. For the i-th numerology, the subcarrier spacing may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 18 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

FIGS. 19A, 19B, 19C, and 19D show examples of subframe structures for the numerologies that are shown in FIGS. 18A, 18B, 18C, and 18D, respectively. Given that a slot includes $N^{DL}_{symb}$ (or $N^{UL}_{symb}$)=7 symbols, the slot length of the i+1-th numerology is a half of the one for the i-th numerology, and eventually the number of slots in a subframe (i.e., 1 ms) becomes double. It may be noted that a radio frame may include 10 subframes, and the radio frame length may be equal to 10 ms.

FIGS. 20A, 20B, 20C, 20D, 20E, and 20F show examples of slots and sub-slots. If sub-slot is not configured by higher layer, the UE 102 and the eNB/gNB 160 may only use a slot as a scheduling unit. More specifically, a given transport block may be allocated to a slot. If the sub-slot is configured by higher layer, the UE 102 and the eNB/gNB 160 may use the sub-slot as well as the slot. The sub-slot may include one or more OFDM symbols. The maximum number of OFDM symbols that constitute the sub-slot may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot may start at any symbol within a slot unless it collides with a control channel. There could be restrictions of mini-slot length based on restrictions on starting position. For example, the sub-slot with the length of $N^{DL}_{symb}-1$ (or $N^{UL}_{symb}-1$) may start at the second symbol in a slot. The starting position of a sub-slot may be indicated by a physical layer control channel (e.g., by DCI format). Alternatively, the starting position of a sub-slot may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot.

In cases when the sub-slot is configured, a given transport block may be allocated to either a slot, a sub-slot, aggregated sub-slots or aggregated sub-slot(s) and slot. This unit may also be a unit for HARQ-ACK bit generation.

FIGS. 21A, 21B, 21C, and 21D show examples of scheduling timelines. For a normal DL scheduling timeline, DL control channels are mapped the initial part of a slot. The DL control channels schedule DL shared channels in the same slot. HARQ-ACKs for the DL shared channels (i.e., HARQ-ACKs each of which indicates whether or not transport block in each DL shared channel is detected successfully) are reported via UL control channels in a later slot. In this instance, a given slot may contain either one of DL transmission and UL transmission. For a normal UL scheduling timeline, DL control channels are mapped the initial part of a slot. The DL control channels schedule UL shared channels in a later slot. For these cases, the association timing (time shift) between the DL slot and the UL slot may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline, DL control channels are mapped to the initial part of a slot. The DL control channels schedule DL shared channels in the same slot. HARQ-ACKs for the DL shared channels are reported in UL control channels which are mapped at the ending part of the slot. For a self-contained base UL scheduling timeline, DL control channels are mapped to the initial part of a slot. The DL control channels schedule UL shared channels in the same slot. For these cases, the slot may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

FIGS. 22A and 22B show examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include DM-RS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 23B:
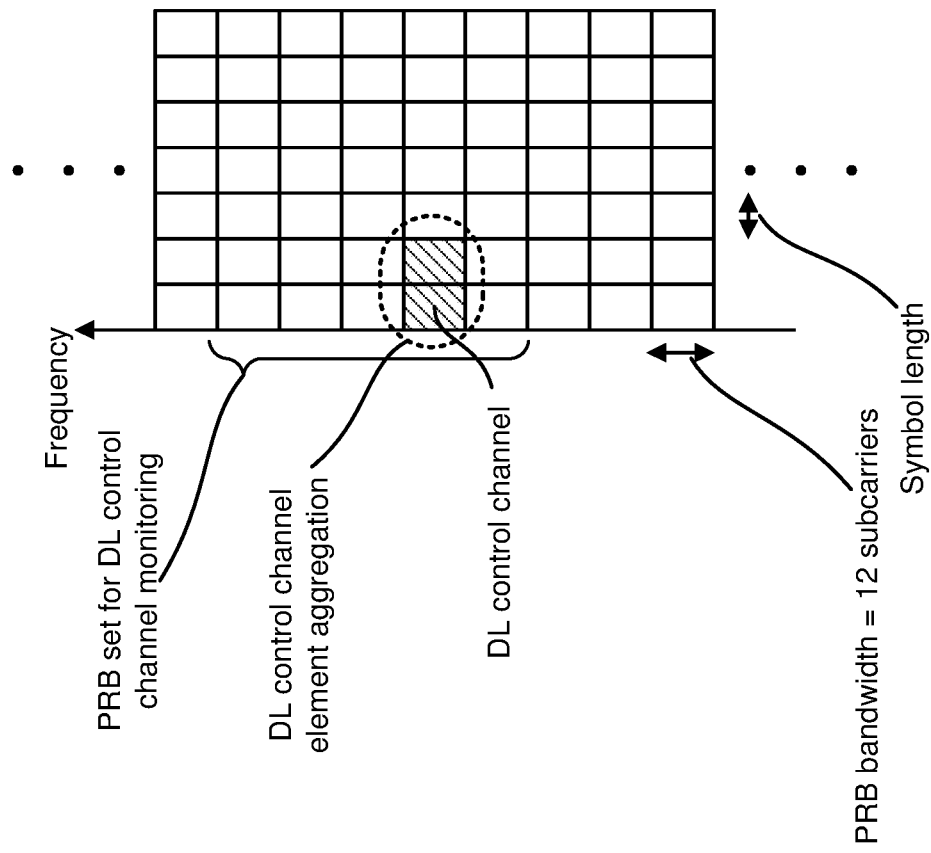
FIGS. 23A and 23B show examples of DL control channel which includes more than one control channel elements.
Figure 23A:
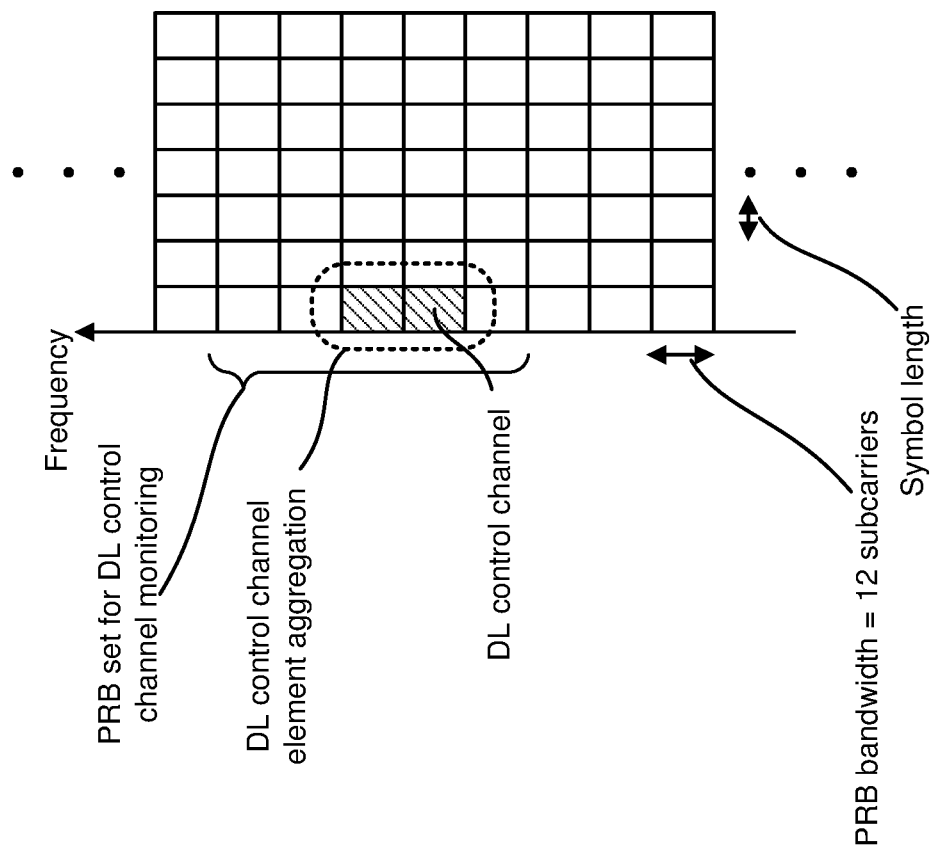

FIGS. 23A and 23B show examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 24C:
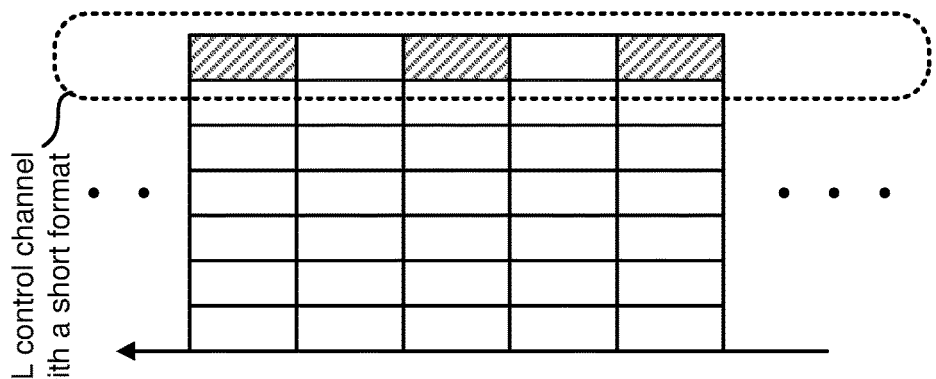
FIGS. 24A, 24B, and 24C show examples of uplink (UL) control channel structures.
Figure 24B:
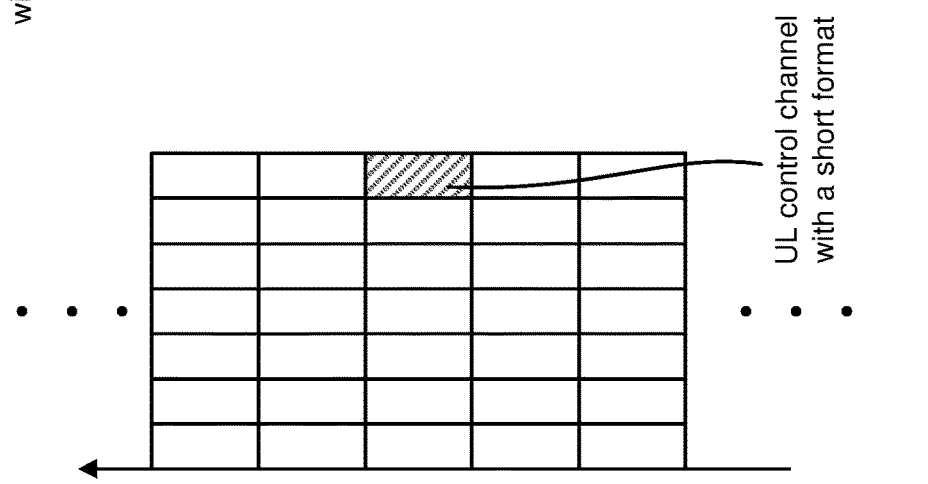
Figure 24A:
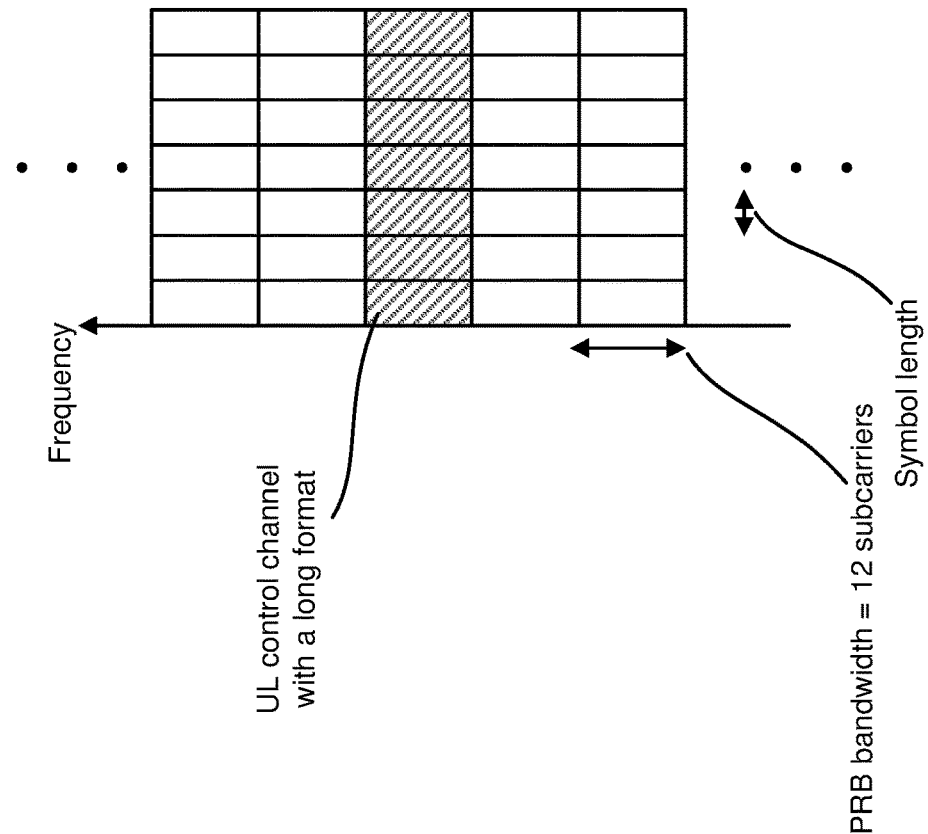

FIGS. 24A, 24B, and 24C show examples of UL control channel structures. UL control channel may be mapped on REs which may be defined based on a PRB and a slot in frequency and time domains, respectively. This UL control channel may be referred to as a long format (or just the 1st format). UL control channels may be mapped on REs on a limited OFDM symbols in the time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g., 5 or 10) within a system bandwidth.

Figure 25:
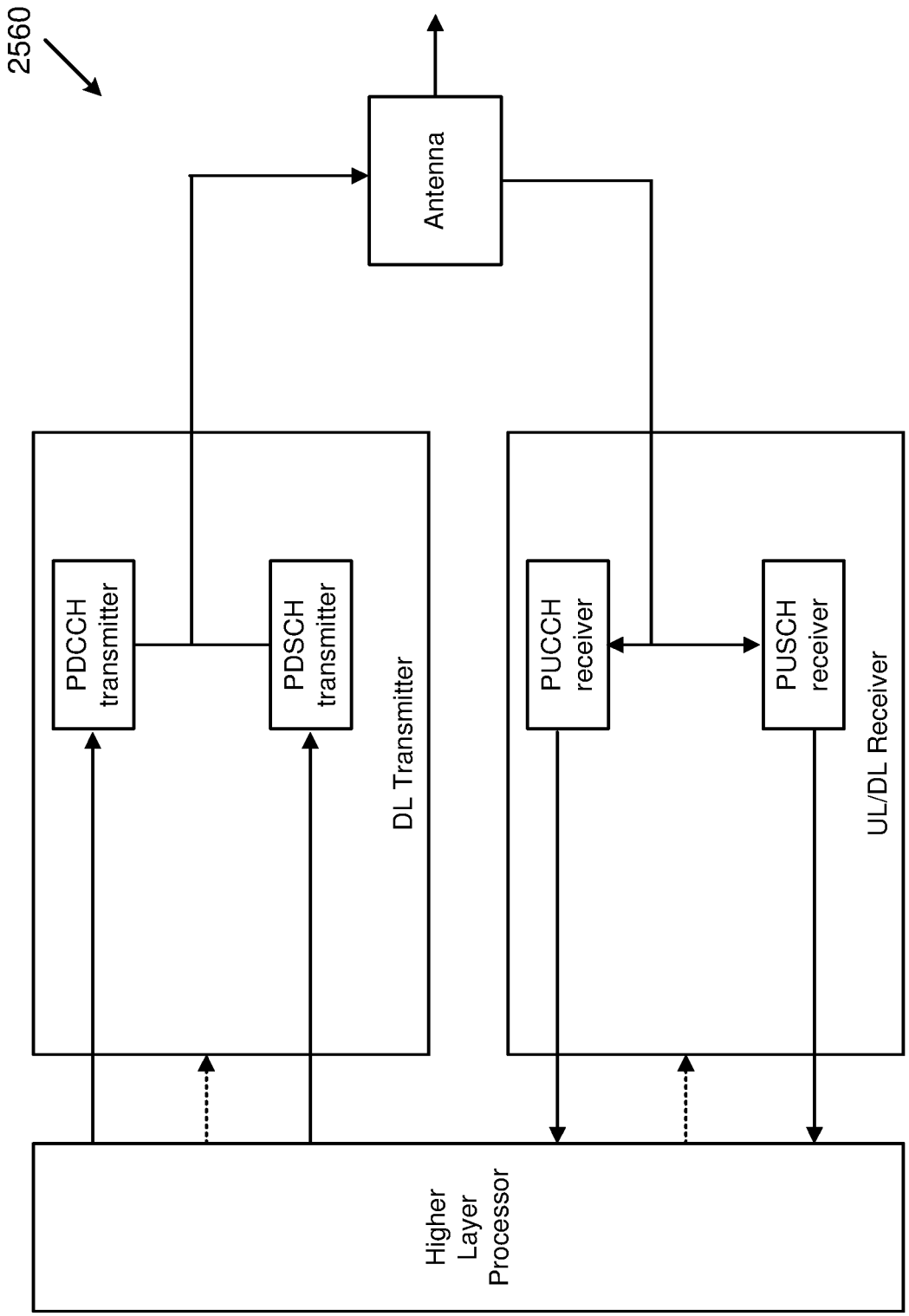
FIG. 25 is a block diagram illustrating one implementation of a gNB.

FIG. 25 is a block diagram illustrating one implementation of a gNB 2560. The gNB 2560 may include a higher layer processor, a DL transmitter, a UL receiver, and antennas. The DL transmitter may include a PDCCH transmitter and a PDSCH transmitter. The UL receiver may include a PUCCH receiver and a PUSCH receiver. The higher layer processor may manage physical layer's behaviors (the DL transmitter's and the UL receiver's behaviors) and provide higher layer parameters to the physical layer. The higher layer processor may obtain transport blocks from the physical layer. The higher layer processor may send/acquire higher layer messages such as an RRC message and MAC message to/from a UE's higher layer. The higher layer processor may provide the PDSCH transmitter transport blocks and provide the PDCCH transmitter transmission parameters related to the transport blocks. The UL receiver may receive multiplexed uplink physical channels and uplink physical signals via receiving antennas and de-multiplex them. The PUCCH receiver may provide the higher layer processor UCI. The PUSCH receiver may provide the higher layer processor received transport blocks.

Figure 26:
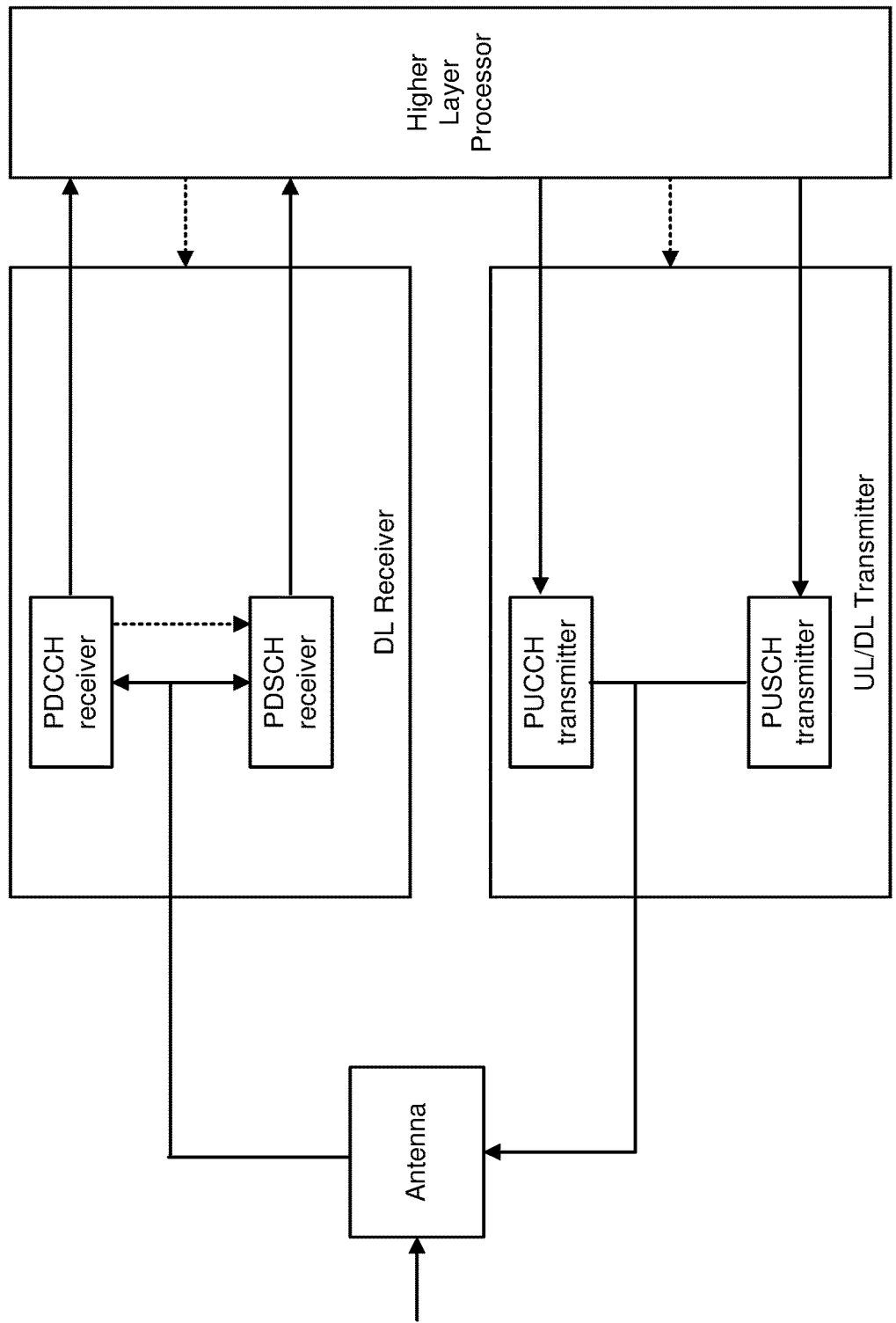
FIG. 26 is a block diagram illustrating one implementation of a UE.

FIG. 26 is a block diagram illustrating one implementation of a UE 2602. The UE 2602 may include a higher layer processor, a UL transmitter, a DL receiver, and antennas. The UL transmitter may include a PUCCH transmitter and a PUSCH transmitter. The DL receiver may include a PDCCH receiver and a PDSCH receiver. The higher layer processor may manage physical layer's behaviors (the UL transmitter's and the DL receiver's behaviors) and provide higher layer parameters to the physical layer. The higher layer processor may obtain transport blocks from the physical layer. The higher layer processor may send/acquire higher layer messages such as an RRC message and MAC message to/from a UE's higher layer. The higher layer processor may provide the PUSCH transmitter transport blocks and provide the PUCCH transmitter UCI. The DL receiver may receive multiplexed downlink physical channels and downlink physical signals via receiving antennas and de-multiplex them. The PDCCH receiver may provide the higher layer processor DCI. The PDSCH receiver may provide the higher layer processor received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 27:
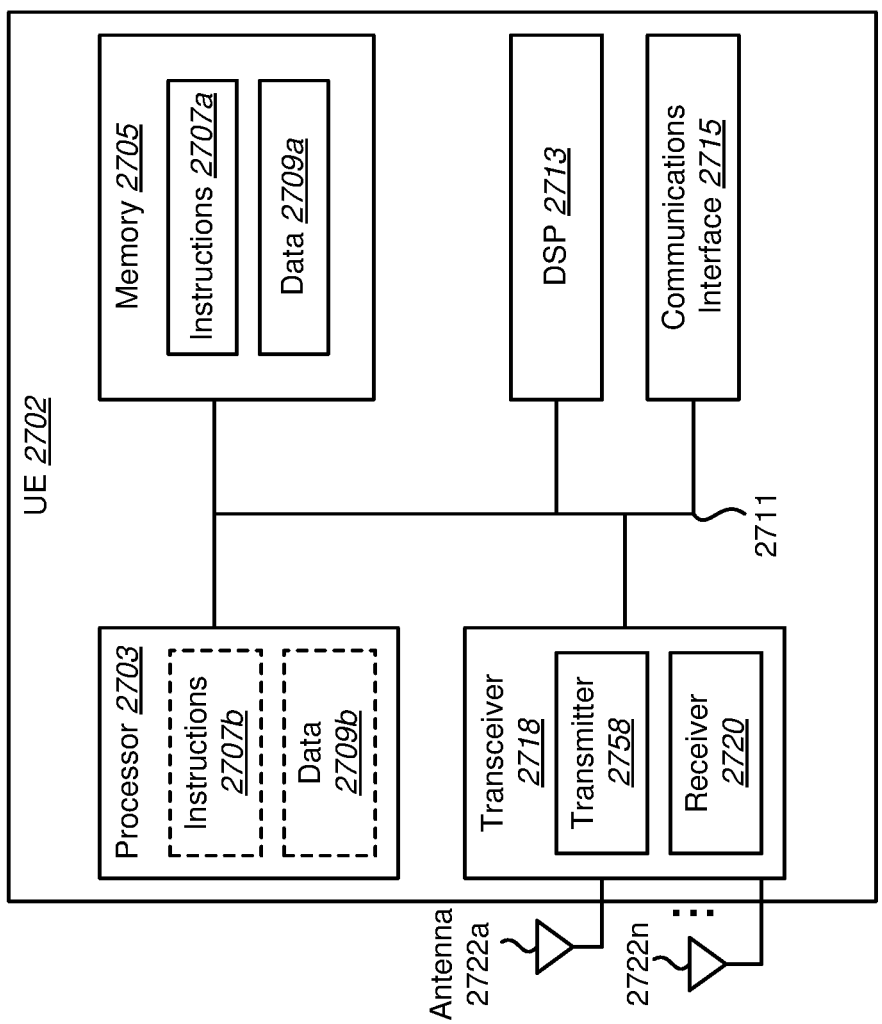
FIG. 27 illustrates various components that may be utilized in a UE.

FIG. 27 illustrates various components that may be utilized in a UE 2702. The UE 2702 described in connection with FIG. 27 may be implemented in accordance with the UE 102 described in connection with FIG. 1. The UE 2702 includes a processor 2703 that controls operation of the UE 2702. The processor 2703 may also be referred to as a central processing unit (CPU). Memory 2705, which may include read-only memory (ROM), random access memory (RAM), a combination of the two or any type of device that may store information, provides instructions 2707a and data 2709a to the processor 2703. A portion of the memory 2705 may also include non-volatile random-access memory (NVRAM). Instructions 2707b and data 2709b may also reside in the processor 2703. Instructions 2707b and/or data 2709b loaded into the processor 2703 may also include instructions 2707a and/or data 2709a from memory 2705 that were loaded for execution or processing by the processor 2703. The instructions 2707*b* may be executed by the processor 2703 to implement the methods described above.

The UE 2702 may also include a housing that contains one or more transmitters 2758 and one or more receivers 2720 to allow transmission and reception of data. The transmitter(s) 2758 and receiver(s) 2720 may be combined into one or more transceivers 2718. One or more antennas 2722*a-n* are attached to the housing and electrically coupled to the transceiver 2718.

The various components of the UE 2702 are coupled together by a bus system 2711, which may include a power bus, a control signal bus and a status signal bus, in addition to a data bus. However, for the sake of clarity, the various buses are illustrated in FIG. 27 as the bus system 2711. The UE 2702 may also include a digital signal processor (DSP) 2713 for use in processing signals. The UE 2702 may also include a communications interface 2715 that provides user access to the functions of the UE 2702. The UE 2702 illustrated in FIG. 27 is a functional block diagram rather than a listing of specific components.

Figure 28:
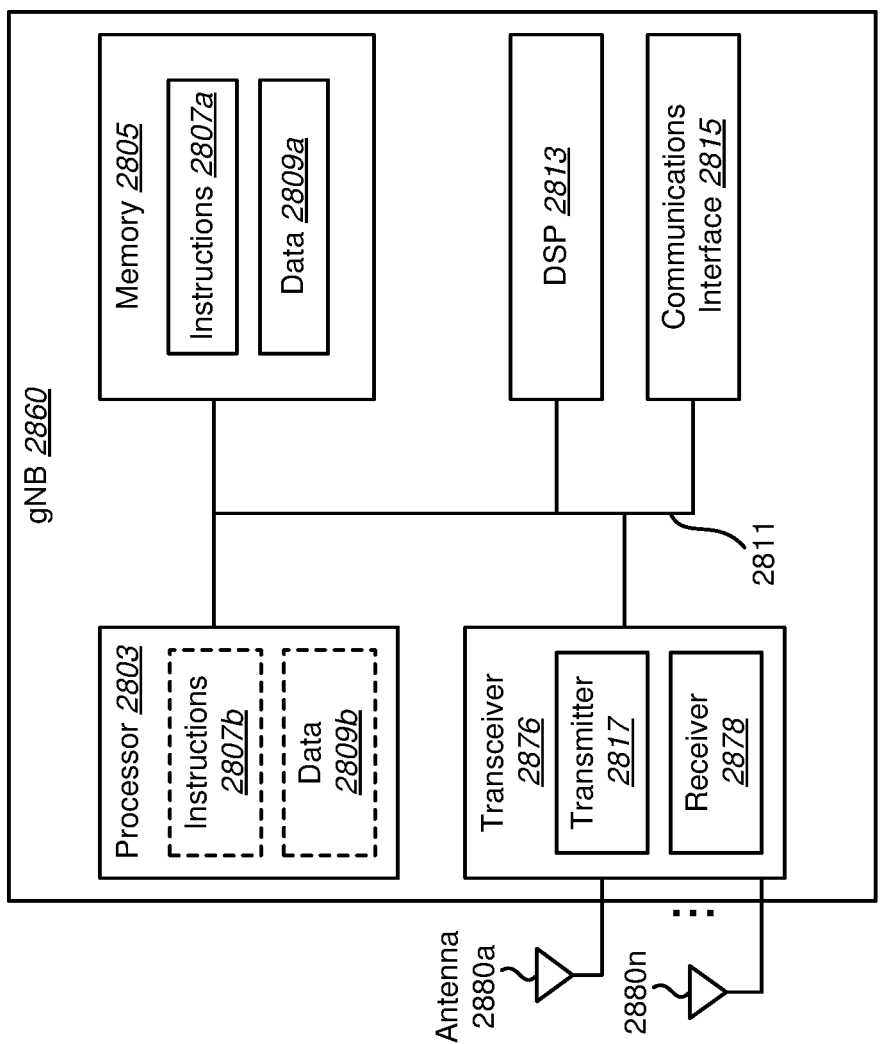
FIG. 28 illustrates various components that may be utilized in a gNB.

FIG. 28 illustrates various components that may be utilized in a gNB 2860. The gNB 2860 described in connection with FIG. 28 may be implemented in accordance with the gNB 160 described in connection with FIG. 1. The gNB 2860 includes a processor 2803 that controls operation of the gNB 2860. The processor 2803 may also be referred to as a central processing unit (CPU). Memory 2805, which may include read-only memory (ROM), random access memory (RAM), a combination of the two or any type of device that may store information, provides instructions 2807*a* and data 2809*a* to the processor 2803. A portion of the memory 2805 may also include non-volatile random-access memory (NVRAM). Instructions 2807*b* and data 2809*b* may also reside in the processor 2803. Instructions 2807*b* and/or data 2809*b* loaded into the processor 2803 may also include instructions 2807*a* and/or data 2809*a* from memory 2805 that were loaded for execution or processing by the processor 2803. The instructions 2807*b* may be executed by the processor 2803 to implement the methods described above.

The gNB 2860 may also include a housing that contains one or more transmitters 2817 and one or more receivers 2878 to allow transmission and reception of data. The transmitter(s) 2817 and receiver(s) 2878 may be combined into one or more transceivers 2876. One or more antennas 2880*a-n* are attached to the housing and electrically coupled to the transceiver 2876.

The various components of the gNB 2860 are coupled together by a bus system 2811, which may include a power bus, a control signal bus and a status signal bus, in addition to a data bus. However, for the sake of clarity, the various buses are illustrated in FIG. 28 as the bus system 2811. The gNB 2860 may also include a digital signal processor (DSP) 2813 for use in processing signals. The gNB 2860 may also include a communications interface 2815 that provides user access to the functions of the gNB 2860. The gNB 2860 illustrated in FIG. 28 is a functional block diagram rather than a listing of specific components.

Figure 29:
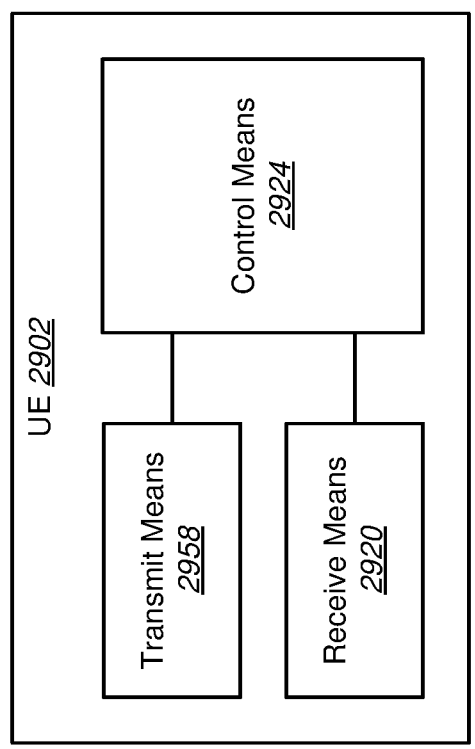
FIG. 29 is a block diagram illustrating an implementation of a UE in which systems and methods for ultra-reliable and low-latency communication operations may be implemented.

FIG. 29 is a block diagram illustrating one implementation of a UE 2902 in which systems and methods for ultra-reliable and low-latency communication operations may be implemented. The UE 2902 includes transmit means 2958, receive means 2920 and control means 2924. The transmit means 2958, receive means 2920 and control means 2924 may be configured to perform one or more of the functions described in connection with FIG. 1 above. FIG. 27 above illustrates one example of a concrete apparatus structure of FIG. 29. Other various structures may be implemented to realize one or more of the functions of FIG. 1. For example, a DSP may be realized by software.

Figure 30:
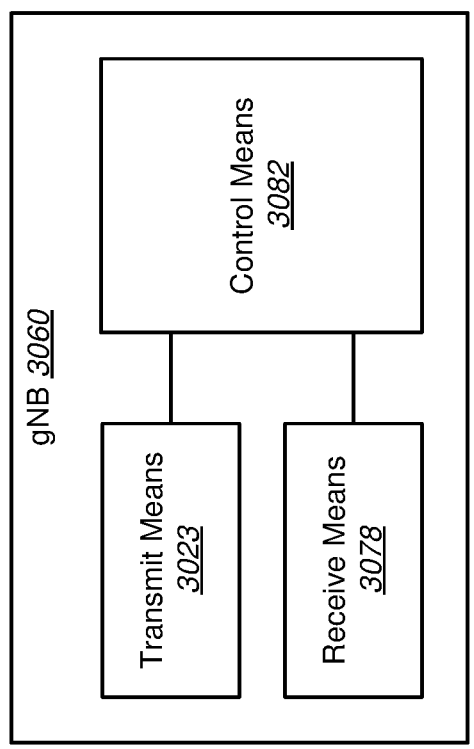
FIG. 30 is a block diagram illustrating one implementation of a gNB in which systems and methods for ultra-reliable and low-latency communication operations may be implemented.

FIG. 30 is a block diagram illustrating one implementation of a gNB 3060 in which systems and methods for ultra-reliable and low-latency communication operations may be implemented. The gNB 3060 includes transmit means 3023, receive means 3078 and control means 3082. The transmit means 3023, receive means 3078 and control means 3082 may be configured to perform one or more of the functions described in connection with FIG. 1 above. FIG. 28 above illustrates one example of a concrete apparatus structure of FIG. 30. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Figure 31:
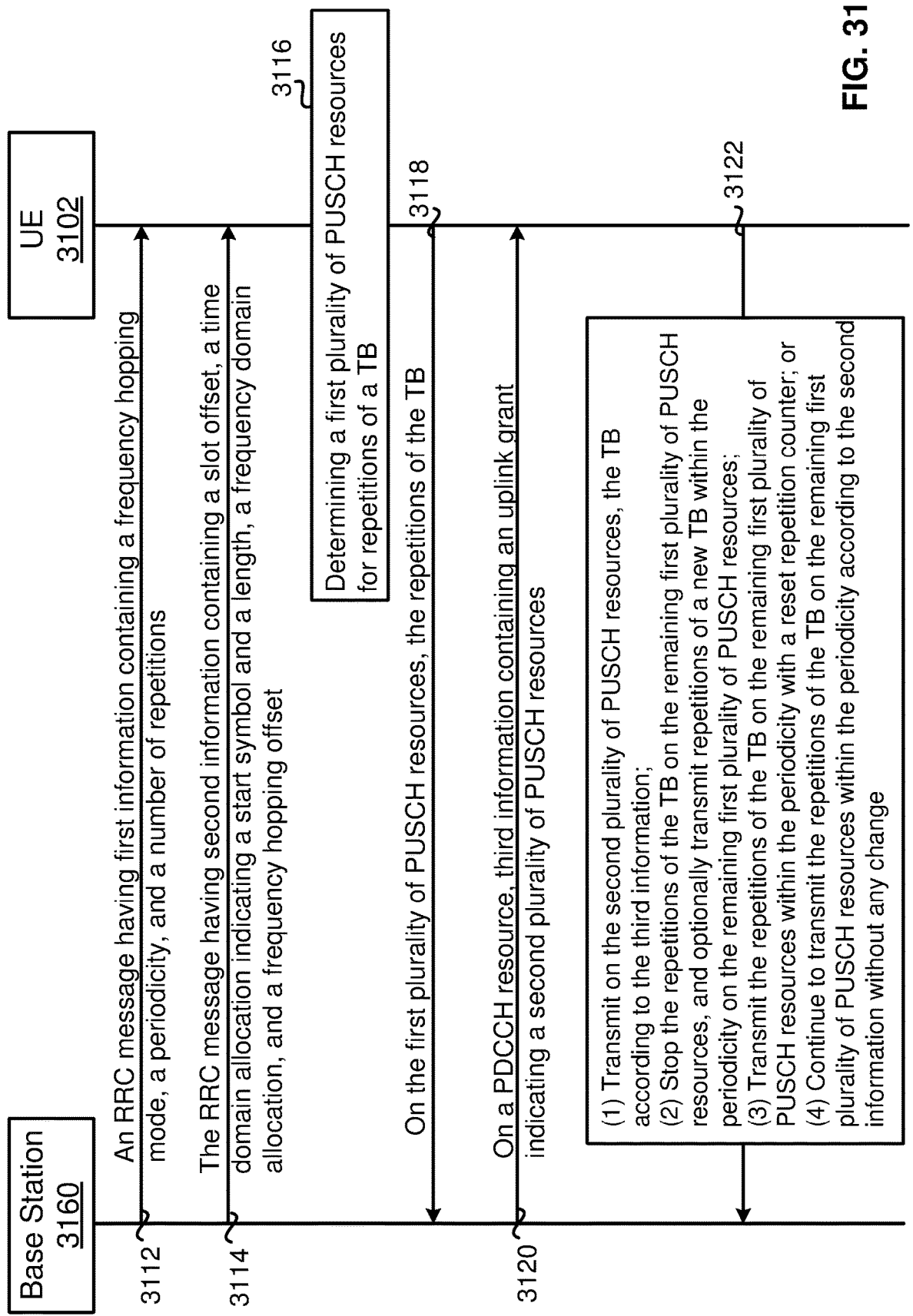
FIG. 31 is a diagram illustrating procedures between a base station and a UE for uplink transmission without grant, in accordance with an example implementation of the present application.

Referring to FIG. 31, FIG. 31 is a diagram 3100 illustrating procedures between a base station and a UE for uplink (UL) transmission without grant, in accordance with an exemplary implementation of the present application. In FIG. 31, the diagram 3100 includes actions 3112, 3114, 3116, 3118, 3120, and 3122 between a base station (e.g., an eNB or a gNB) 3160 and a UE 3102.

In action 3112, the base station 3160, using its transmitting circuitry, transmits, a Radio Resource Control (RRC) message to the UE 3102. Also, in action 3112, the UE 3102, using its receiving circuitry, receives the RRC message, which includes first information containing, among other parameters and configurations, a frequency hopping mode, a periodicity, a number of repetitions (e.g., a repetition number indicating a total number of repetitions), and a repetition enabler. That is, the base station 3160 via RRC signaling communicates to the UE 3102 the allocation of resources for UL transmission, which may be referred to as a transmission opportunity. In one implementation, the base station 3160 may allocate periodic radio resources (e.g., for UL transmissions) to the UE 3102, where the periodicity of the periodic radio resources is provided in the first information contained in the RRC message. By such, the base station 3160 grants radio resources to the UE 3102 through the configuration of the RRC message with or without (re)activation/modification by L1 signaling or MAC CE, L1 signaling or an explicit uplink grant is not needed for every following configured periodic resource. Thus, subsequent transmissions (e.g., uplink transmissions from the UE 3102) using the allocated periodic radio resources may be considered grant-free transmissions or transmissions without grant. The period may depend on the latency requirement of a particular service. In one implementation, for URLLC services, the period may be 0.5 ms, which means that an uplink transmission from the UE 3102 to the base station 3160 should be finished within each period of 0.5 ms. In one implementation, for URLLC services, the period may be represented by a number of slots, mini-slots or symbols.

Also, within the period, there may be multiple mini-slots for the repetitions. In the RRC message, the first information also contains the repetition number ("K") to inform the UE 3102 the maximum number of repetitions can be applied within each period.

In addition, in the RRC message, a repetition enabler is provided in the RRC message to give the UE 3102 permission to perform repetitions using the allocated radio resources for UL transmissions. In one implementation, the repetition enabler is an indicator for retransmission(s), additional transmission(s) or subsequent transmission(s) following initial transmission of a same TB. The repetition enabler may be a parameter in the RRC message to allow the UE 3102 to enable repetitions for subsequent UL transmissions. Details of the repetition enabler (e.g., a parameter RepetitionEnabler in the RRC message) will be discussed in detail below. It should be noted that in another implementation, the base station 3160 may allocate and configure more than one set of radio resources to the UE 3102 for uplink transmissions, where each set of the configured radio resources may have a different period. The details of the one or more sets of radio resources may be provided in the first information contained in the RRC message, as will be discussed with FIGS. 32A, 32B, 32C, 32D, and 32E below.

In action 3114, the base station 3160 (e.g., eNB or gNB), using its transmitting circuitry, transmits to the UE 3102 the RRC message having second information, which may contain, among other parameters and configurations, a first plurality of physical uplink shared channel (PUSCH) resources (e.g., a bit map of mini-slots, and a frequency hopping pattern) for repetitions of a transport block (TB) within the period, a slot offset, a time domain allocation (e.g., indicating a start symbol and a length) for one or more of the first plurality of PUSCH resources for the repetitions, a frequency hopping offset, and a frequency domain allocation (e.g., indicating a carrier, a sub-band, a bandwidth part (BWP)) for one or more of the first plurality of PUSCH resources for the repetitions. Also, in action 3114, the UE 3102, using its receiving circuitry, receives the second information. The second information provides additional information to the UE 3102 regarding the exact position(s) of the allocated radio resources (e.g., time and frequency resources) within the period that can be used for repetitions during UL transmissions. For example, if a slot contains 14 symbols, the second information informs the UE which symbols can be used for the repetitions. The second information also contains the time domain allocation indicating a start symbol and a length. For example, the time domain allocation includes the time reference to inform the UE 3102 a start position (e.g., a start symbol) and a length in the period for the UL radio resources for the repetitions. The start position of the repetition period may be represented by a number of ways. In one example, the start position may be represented by an absolute value of a slot ID. In another example, the start position may be represented implicitly by a value k. For example, when the RRC message is received by the UE 3102, which may also be used for the activation of the UL transmission, at time symbol/slot n, and the start reference is represent by k, then the start position of the UL repetition will be at symbol/slot n+k. Details of the reference will be discussed in detail below.

In action 3116, the UE 3102 derives and/or determines, using processing circuitry, a reference (e.g., a time reference and/or a frequency reference) for the first plurality of PUSCH resources for the repetitions according to the first information and the second information. For example, a first PUSCH resource of the first plurality of PUSCH resources may be determined based on at least one of the periodicity, the slot offset, the time domain allocation (indicating the start symbol and the length), or the frequency domain allocation. The remaining ones of the first plurality of PUSCH resources may use various repetition patterns descried herein.

In action 3118, the UE 3102, using its transmitting circuitry, transmits, on the first plurality of PUSCH resources, the repetitions of the TB and the number of repetitions may be indicated by the first and/or second information. Also, in action 3118, the base station 3160, using its receiving circuitry, receives, on the first plurality of PUSCH resources, the repetitions of the TB and the number of repetitions may be indicated by the first and/or second information.

Actions 3120 and 3122 describe the behaviors of the UE 3102 on how to manage the uplink transmission resources (e.g., the remaining ones of the first plurality of PUSCH resources), when the uplink grant-free transmission using the first plurality of PUSCH resources is interrupted by an uplink grant, since the first plurality of PUSCH resources have been allocated to the UE 3102 for the uplink grant-free transmission. For example, when the base station 3160 transmits, on a PDCCH resource, third information to the UE 3102, where the third information contains an uplink grant indicating a second plurality of PUSCH resources for another UL transmission (e.g., for the current TB or a new TB), before the repetitions of the TB reaches the repetition number during the uplink transmission, action 3122 describes how the UE 3102 manages the remaining first plurality of PUSCH resources.

In action 3120, the base station 3160, using its transmitting circuitry, transmits, on a PDCCH resource, third information containing an uplink grant indicating a second plurality of PUSCH resources (e.g., a bit map of mini-slots, a frequency hopping pattern, and etc.) for the same TB or a new TB. Also, in action 3120, the UE 3102, using its receiving circuitry, receives the third information.

In action 3122, the UE 3102, upon receiving the third information containing an uplink grant, (1) transmits, on the second plurality of PUSCH resources, the TB according to the third information, while the base station 3160 receives, on the second plurality of PUSCH resources, the TB according to the third information; (2) stops the repetitions of the TB on the remaining first plurality of PUSCH resources, and optionally transmits, on the remaining first plurality of PUSCH resources, repetitions of the new TB within the periodicity; (3) transmits, on the remaining first plurality of PUSCH resources, the repetitions of the TB within the periodicity with a reset repetition counter; or (4) continues to transmit, on the remaining first plurality of PUSCH resources, the repetitions of the TB within the periodicity according to the second information without any change.

One of the reasons to reset the repetition counter is that the grant-free uplink transmission of the TB may be of poor quality, and the repetition counter may be reset after the uplink grant to count the number of repetitions for the grant-based transmission. Resetting the repetition counter also provides a robust mechanism for the state machine to govern the number of transmissions from the UE 3102, therefore, results in a straight forward way to observe that this behavior is properly implemented. In one implementation, the UE operations 124 and/or the UE URLLC module 126 in FIG. 1 may manage the operation of resetting of the repletion counter. In one implementation, the higher layer processor in FIG. 26 may manage the operation of resetting of the repletion counter.

It should be noted that although action 3122 only mentions three exemplary ways that the UE 3102 can manage the remaining first plurality of PUSCH resources when there is an interruption by an uplink grant, there may be other ways to manage the remaining first plurality of PUSCH resources, some of which will be discussed below.

There may be multiple types of UL data transmissions without grant. For Type 1, UL data transmission without grant is only based on RRC (re)configuration without any L1 signaling. The RRC (re-)configuration includes periodicity and offset of a resource with respect to SFN=0, time domain resource allocation, frequency domain resource allocation, UE-specific DMRS configuration, a MCS/TBS value, number of repetitions K, power control related parameters, may also include HARQ related parameters (e.g., number of HARQ processes). For Type 2, UL data transmission without grant is based on both RRC configuration and L1 signaling for activation/deactivation for UL data transmission without grant. The RRC (re-)configuration for resource and parameters includes periodicity of a resource, power control related parameters, and may include HARQ related parameters (e.g., number of HARQ processes). L1 signaling indicates other related parameters for the resource, such as offset associated with the periodicity with respect to a timing reference indicated by L1 signaling for activation, time domain resource allocation, frequency domain resource allocation, UE-specific DMRS configuration, an MCS/TBS value. Number of repetitions K may be configured by RRC signaling and/or indicated by L1 signaling. For Type 3, UL data transmission without grant is based on RRC configuration (which may use the same information elements of Type 1 RRC configuration), and allows L1 signaling (which may be the same as L1 signaling of Type 2) to modify some parameters configured by RRC but no L1 signaling for activation. SPS may be another type of UL data transmission without grant, or it may be treated as Type 1, Type 2 or Type 3 above.

For Type 2 or Type 3 UL data transmission without grant, there may be a parameter RepetitionEnabler (e.g., a repetition flag) in the RRC configuration. If it is configured as true, the corresponding L1 signaling for activation/deactivation/modification may use DCI format x, which may include the parameter of repetition number. If it is configured as false, the corresponding L1 signaling for activation/deactivation/modification may use DCI format y, which may not include the parameter of repetition number. After RRC configuration for RepetitionEnabler, the UE has sufficient information to monitor the corresponding DCI format. Also, the same DCI format may be used for both cases, but they have different field sets according to the configured value of RepetitionEnabler, or the same field has different meanings corresponding to the configured value of RepetitionEnabler. For example, if parameter RepetitionEnabler is configured as true, the field of RV (or other field, e.g., MCS, NDI, RB assignment, TPC command for PUCCH, antenna port(s), scrambling identity, the number of layers, SRS request, PDSCH RE mapping, PDSCH start position, quasi-co-location, HARQ-ACK resource offset, interference presence, HARQ process number, PDSCH timing offset, HARQ timing offset, etc.) in the DCI is used to indicate the number of repetitions. In yet another implementation, Type 2 (or 3) may be only used for the case without repetitions. There are no repetition-related parameters like repetition number included in Type 2 (or 3) RRC configuration and/or L1 signaling. In this case, UL repetitions without grant may be a different/separate type rather than Type 1, 2, or 3 mentioned above. UL repetitions without grant may use a separate RRC configuration and/or L1 signaling. Repetition-related parameters like repetition number may be included in RRC configuration or L1 signaling. If the separate type for grant-free repetitions is configured, UE transmit repetitions of a TB according to the repetition-related parameters.

Instead of the value of higher-layer parameter RepetitionEnabler, whether to configure higher-layer parameter ul-Repetition may be used. More specifically, if the higher-layer parameter ul-Repetition is configured, the UE 102 and the gNB 160 may assume the DCI format contains the above-described information field and may perform PUSCH transmissions/receptions with repetitions. If the higher-layer parameter ul-Repetition is not configured, the UE 102 and the gNB 160 may assume the DCI format does not contain the above-described information field and may perform PUSCH transmissions/receptions without repetitions.

RRC configuration may include several UL repetition configurations. For example, UE dedicated RRC configuration may include the first repetition configuration and the second repetition configuration. The first repetition configuration may specify the number of repetitions K for PUSCH transmissions based on the above-described Type 1 UL transmission. The first repetition configuration may be contained the configuration message (i.e. information element) for Type 1 UL transmission. The second repetition configuration may specify the number of repetitions K' for PUSCH scheduled by UL grant (e.g. a certain DCI format on PDCCH with CRC scrambled by C-RNTI). The number of repetitions K' may also apply to PUSCH transmissions based on the above-described Type 2 UL transmission. The second repetition configuration may not be contained the configuration message (i.e. information element) for either Type 1 or Type 2 UL transmission. The second repetition configuration may be independent of the configuration message for either Type 1 or Type 2 UL transmission. Instead of the number of repetitions K', the second repetition configuration may specify whether to enable the repetition as described above.

In another example, UE dedicated RRC configuration may include the first repetition configuration, the second repetition configuration and the third repetition configuration. The first repetition configuration may specify the number of repetitions K for PUSCH transmissions based on the above-described Type 1 UL transmission. The first repetition configuration may be contained the configuration message (i.e. information element) for Type 1 UL transmission. The second repetition configuration may specify the number of repetitions K' for PUSCH scheduled by UL grant (e.g. a certain DCI format on PDCCH with CRC scrambled by C-RNTI). The third repetition configuration may specify the number of repetitions K" for PUSCH transmissions based on the above-described Type 2 UL transmission. The second repetition configuration may not be contained the configuration message (i.e. information element) for either Type 1 or Type 2 UL transmission. The third repetition configuration may be contained in the configuration message for Type 2 UL transmission. Instead of the number of repetitions K', the second repetition configuration may specify whether to enable the repetition as described above. Instead of the number of repetitions K", the third repetition configuration may specify whether to enable the repetition as described above.

When repetitions are used or configured, there may be multiple relationships between the resources for repetitions and the resource configuration for UL data transmission without grant (Type 1, Type 2, Type 3, or SPS). Also, it may be a different type as mentioned above. In an implementation, as shown in FIG. 32A, a resource configuration for UL data transmission without grant is corresponding to a periodic resource and repetitions use the continuous periodic resource. In another implementation, as shown in FIG. 32B, more than one periodic resources may be configured and they are independent of each other. Repetitions of the same TB cannot use different periodic resources. In yet another implementation, as shown in FIG. 32C, more than one periodic resources may be configured and they are independent of each other, but may be treated as combined resources. Repetitions of the same TB may use different configured periodic resources. In yet another implementation, more than one periodic resources may be configured, but initial transmission (or Repetition 0) and other repetition(s) use separate configured periodic resources. Different configured periodic resources may use different offsets, periodicities or frequency resources. For example, in FIG. 32D, more than one periodic resources are configured, and different periodic resources may use different periodicities. In FIG. 32E, more than one periodic resources are configured, and different periodic resources may use different frequency resources.

It should be noted that, when the terminology "repetition(s)" is used, "repetition(s)" includes initial transmission. Each repetition may have a repetition index. Repetition index may start from 0, 1, or any number. For example, the initial transmission is indexed as Repetition 0 (Rep 0). The following repetitions of the same TB after the initial transmission are indexed by 1, 2, . . . (i.e., in ascending order). Specification may not use repetition index explicitly. Repetition index may be corresponding to a specific parameter such as RV, MCS, etc. On the other hand, a repetition counter may be used to record how many repetitions for the same TB have been transmitted (or received). The repetition counter may be started from (or reset as) 0. After a repetition is transmitted (or received), then repetition counter is increased by 1. If the repetition counter reaches the indicated repetition number K, which means UE has finished K repetitions including initial transmission, UE may stop the repetition of the same TB.

In yet another implementation, a resource configuration for UL data transmission without grant may only indicate the resource for initial transmission (or repetition 0) explicitly. Resources for remaining repetition(s) may be derived by a defaulted pattern, a fixed pattern or an indicated pattern (the pattern may be fixed by specification, indicated by RRC configuration, MAC CE or PDCCH). Here, the pattern for repetitions is a set of time/frequency resources for repetitions by a specific rule. If a UE has information about the pattern, then the UE has information about the locations of the resources for each repetition. Or, the resource for following repetition may be derived from the resource for the immediate previous repetition by a given rule. Specification may not use the term "pattern", but it may define some rules to determine sets of time/frequency resources for repetitions. For example, the repetition(s) following initial transmission (or repetition 0) are transmitted in the consecutive TTI(s) (e.g., subframe, slot, mini-slot, OS). The number of consecutive TTI(s) may be determined by the repetition number. If the repetition number is K, the following K-1 repetitions will use the K-1 consecutive TTIs. The frequency resource (e.g., RB index) can be the same or different, which may be fixed by specification, indicated by RRC configuration, MAC CE or PDCCH. In yet another example, the resources for the remaining repetitions may not be necessarily consecutive. Any gap or hopping pattern in time domain and/or frequency domain may be used. If gap in time domain is fixed or indicated (by RRC, MAC CE, or PDCCH) as g, after the immediate previous repetition at time index n, the following repetition of the same TB will be transmitted at time index n+g. If a bitmap in time domain is fixed or indicated (by RRC, MAC CE, or PDCCH) to determine the time resources for repetitions, UE transmit repetitions at the time resources according to the bitmap. If a sequence of frequency resources (e.g., RB index) fixed or indicated (by RRC, MAC CE, or PDCCH) to determine the frequency resources for each repetition, UE transmit repetitions at the frequency resources according to the determined sequence. Some examples are shown in FIGS. 33A, 33B, 33C, and 33D.

In FIG. 33A, only the resource for initial transmission is explicitly configured and the following repetition(s) are transmitted in the consecutive TTI(s) by default. For example, in FIG. 33A, the repetition number is 2. The UE may use the TTI immediately after the initial transmission TTI for repetition. For example, the repetition of TB0 is transmitted in time index n+1 immediately after the initial transmission of TB0 in time index n.

In FIG. 33B, only the resource for initial transmission is explicitly configured and the following repetition(s) are transmitted in the consecutive TTI(s) by default. For example, in FIG. 33B, the repetition number is 4. The UE may use the TTIs immediately after the initial transmission TTI for repetitions. For example, the repetitions of TB 0 are transmitted in time indices n+1, n+2, and n+3 immediately after the initial transmission of TB 0 in time index n. It should be noted that, although the repetition number is 4, the first repetition, Rep 0, corresponds to the initial transmission of TB 0 at time index n. Thus, the total number of repetitions after the initial transmission is 3.

In FIG. 33C, only the resource for initial transmission is explicitly configured and the following repetition(s) may use semi-static or dynamic pattern in time domain (e.g., time domain hopping pattern). For example, the time index immediately after the initial transmission may be occupied by other services, then the repetitions of the TB may be semi-static or dynamic based on the available time resources.

In FIG. 33D, only the resource for initial transmission is explicitly configured and the following repetition(s) may use semi-static or dynamic pattern in frequency domain (e.g., frequency domain hopping pattern).

In one implementation, the default settings, the time domain hopping patterns, and/or frequency domain hopping patterns may be contained in the second information transmitted from the base station (e.g., base station 3160 in FIG. 31) to the UE (e.g., UE 3102 in FIG. 31) in the RRC message as described in action 3114 in FIG. 31.

In yet another implementation, a resource configuration for UL data transmission without grant may only indicate the periodicity and/or coarse resources for repetitions explicitly. Here, "coarse" means the time duration (length, or number of slots/OS, etc.) is larger than that for actual transmission. For example, resource configuration may only indicate which slot will be used for UL transmissions/repetitions, but the UE still needs to know which mini-slot(s) it can use the transmissions/repetitions since each transmission may not need the whole slot. Resources (fine resources or mini-slot based resources) for repetition(s) within a period or configured coarse resource may be derived by a defaulted pattern, a fixed pattern or an indicated pattern (the pattern may be fixed by specification, indicated by RRC configuration, MAC CE or PDCCH). Here, the pattern for repetitions is a set of time/frequency resources for repetitions by a specific rule. If the UE knows the pattern, then the UE knows the resources for each repetition. Or, the resource for following repetition may be derived from the resource for the immediate previous repetition by a given rule. Specification may not use the term "pattern", but it may define some rules to determine sets of time/frequency resources for repetitions. The period may be described by number of TTIs (e.g., 1 slot with reference numerology (e.g., 15 kHz SCS)) or absolute time (e.g., 0.5 ms). The selection of period may be determined by the latency requirement (e.g., all the repetitions should be finished within the configured 0.5 ms period to meet the 0.5 ms latency requirement). Resources (fine resources or mini-slot based resources) for repetition(s) within a period or configured coarse resource may be given by bit-map, start position, end position or length (number of OS), which may be fixed by specification or indicated by RRC, MAC CE or PDCCH. The fine resources for repetitions may be required to avoid some significant parts like control region or reference signal. For example, OFDM symbols containing control information or reference signal may not be allocated to the UL transmission(s)/repetition(s). In yet another example, OFDM symbols containing control information or reference signal (RS) may be allocated to the UL transmission(s)/repetition(s). The UL transmission(s)/repetition(s) may skip the control information or RS by rate matching. Or, The UL transmission(s)/repetition(s) will be punctured by the control information or RS. Or, the UL transmission(s)/repetition(s) will be override or superpose the control information or RS. In a special case with dynamic UL/DL switching, a time resource (e.g., mini-slot) configured/allocated to an UL transmission/repetition is dynamical switched to DL resource, the UE may give up or drop the corresponding UL transmission, or ignore the dynamic switching.

FIG. 34A shows an example, where the period is determined by coarse time granularity and repetitions use fine granularity within the period. For example, the period is 1 slot and the repetitions use mini-slots within the 1 slot. A mini-slot position can be presented by a bit-map, a start position, an end position and a length (number of OS), for example.

FIG. 34B shows an example, where the period is determined by coarse time granularity and the repetitions use fine granularity within the period. For example, the period is 2 slots and the repetitions use mini-slots within the 2 slots. A mini-slot position can be presented by a bit-map, a start position, an end position and a length (number of OS), for example.

FIG. 34C shows an example, where the period is determined by coarse time granularity and slot(s) for repetitions are also indicated. The repetitions use fine granularity within the indicated slots. For example, the repetitions use mini-slots within the slot n which is indicated for the repetitions, while the slot n+1 is not used for repetition. A mini-slot position can be presented by a bit-map, a start position, an end position and a length (number of OS), for example.

In one implementation, the configurations and parameters shown in FIGS. 34A, 34B, and 34C may be contained in the second information transmitted from the base station (e.g., base station 3160 in FIG. 31) to the UE (e.g., UE 3102 in FIG. 31) in the RRC message as described in action 3114 in FIG. 31.

In another implementation, for the mini-slot position configuration, the base station (e.g., base station 3160 in FIG. 31) may inform the UE (e.g., UE 3102 in FIG. 31) which mini-slots (or symbols) cannot be used for repetitions, which may be contained in the second information transmitted in the RRC message as described in action 3114 in FIG. 31.

When resources for repetitions are determined, the UE is able to start transmitting repetitions (or the first transmission) where and when as instructed by the gNB. In an implementation, the start position of repetitions (e.g., timing of initial transmission or repetition 0) may be given by the resource configuration (e.g., configured periodicity and offset of a resource with respect to SFN=0, number of repetitions K) and/or TTI index (e.g., subframe number, slot index). For example, if the configured resource with a TTI index which can be divided by period*K, the configured resource may be a start position of repetitions. The start position may be aligned with the period boundary. For example, the immediately following configured resource after the period boundary may be a start position of repetitions. If the UE has a TB to be transmitted, it may need to wait until the next available start position for repetitions. In yet another implementation, repetitions can start at the immediate next configured resource when a TB arrives. The start position of repetitions may not be fixed and it can be any configured resource. Some examples are shown in FIGS. 35A, 35B, 35C, 35D, 35E and 35F.

In FIGS. 35A and 35B, the start position of repetitions (e.g., timing of initial transmission or repetition 0) may be given by the resource configuration, and the start positions are fixed. In FIGS. 35C and 35D, the TB arrives in the middle of a period and misses the start position, the UE waits for the next available start position (e.g., in time or frequency domain) to start repetitions. In FIGS. 35E and 35F, the start position may be the first available grant-free resource. That is, when a TB arrives, repetition can start at the next immediate available configured grant-free resource (e.g., time or frequency resource).

In one implementation, the configurations and parameters pertaining to the start position in FIGS. 35A, 35B, 35C, 35D, 35E, and 35F may be contained in the second information transmitted from the base station (e.g., base station 3160 in FIG. 31) to the UE (e.g., UE 3102 in FIG. 31) in the RRC message as described in action 3114 in FIG. 31.

Regarding whether to wait for a start position or start repetitions immediately at configured resources, the UE's behavior may be fixed by the specification or up to implementation. The UE behavior may be determined implicitly by the design of other parts like HARQ process, repetition pattern. If more than one HARQ processes are supported for grant-free repetitions, HARQ process ID may be associated with the resource. To avoid HARQ process ID confusion, the start position of repetitions may be limited by some rules. For example, a TB of HARQ process ID xx can only be transmitted at CURRENT_TTI index satisfying the formula xx=floor{[floor(CURRENT_TTI/URLLCInterval)]/numberOfRepetition} modulo numberOfConfURLLC-Processes, which is mentioned above. The grant-free resource may be bundled according to a repetition pattern design. In some cases, the start position may be selected according the pattern. For example, repetition 0 uses RV 0, which may be only allowed at the resources according to the pattern. In yet another implementation, the UE behavior is explicitly configured by RRC, MAC CE or PDCCH. For example, if UE is configured by RRC to wait for a start position (e.g., parameter WaitToStart is set as true, or parameter StartImmediately is set as false), the UE may not start repetitions until the next start position is ready for transmission. If the UE is configured by RRC to start repetitions immediately (e.g., parameter WaitToStart is set as false, or parameter StartImmediately is set as true), the UE may start repetitions at the immediate next configured resource. If PDCCH or MAC CE is used for the UE behavior configuration, then similar parameter like WaitToStart or StartImmediately may be included in the signaling.

Namely, it may be needed to avoid an ambiguous between the base station and the UE for counting of the number "k" (e.g., k=0, 1, . . . K (K=3)) for K repetitions. For example, it may be necessary to avoid a situation that the gNB considers that a current transmission is the second transmission of K repetitions and the UE considers that the current transmission is the third transmission of the K repetitions. For example, it may be necessary to avoid a situation that the gNB does not increment the number "k", while the UE increments the number "k" by one. Hereinafter, the meaning of counting the number "k" includes to increment the number "k".

Here, for example, the number "k" may be counted based on a resource(s) reserved (e.g., configured and/or indicated) for K repetitions. Namely, the number "k" may be determined based on the number of the resource(s) counted during K repetitions (e.g., the number of potential and/or nominal resources for K repetitions). As described above, the resource(s) for K repetitions may be identified by using, at least, a time resource (e.g., the periodicity and/or the offset value) and/or a frequency resources (e.g., PRB index). Here, the time resource (e.g., the periodicity and/or the offset value) may be identified by using, at least, SFN (System Frame Number(s)), subframe(s), slot(s), mini-slot(s), and/or symbol(s).

Also, the number "k" may be counted based on the number of UL transmission of K repetitions. Namely, the number "k" may be determined based on the number of actual UL transmission(s) of K repetitions. Here, as described above, the UE may skip the configured resource(s) (i.e., the configured grant(s)) if there is no TB(s) to be transmitted. Here, the meaning of skipping of the configure resource(s) may include that the UE does not perform the UL transmission. Also, the meaning of skipping of the configured resource(s) may include that the UE does not generate the MAC PDU. Also, the meaning of no TB(s) may include that the MAC PDU includes only the MAC CE for padding BSR (Buffer Status Report) and/or there is no aperiodic CSI requested (e.g., for this TTI (Transmission Time Interval)). Also, the meaning of no TB(s) may include that the MAC PDU includes only periodic BSR with zero MAC SDU(s) and/or there is no aperiodic CSI requested (e.g., for this TTI). Namely, if the MAC PDU includes only the MAC CE for padding BSR and/or there is no aperiodic CSI requested, the UE may not generate the MAC PDU (e.g., for an HARQ entity) in a case that the UE is configured with a parameter and/or the grant indicated to the HARQ entity is the configured grant. Here, the gNB may transmit the RRC message including the parameter. Also, if the MAC PDU includes periodic BSR with zero MAC SDU(s) and/or there is no aperiodic CSI requested, the UE may not generate the MAC PDU (e.g., for an HARQ entity) in a case that the UE is configured with the parameter and/or the grant indicated to the HARQ entity is the configured grant. Namely, if the MAC PDU includes only the MAC CE for padding BSR or periodic BSR with zero MAC SDU(s) and/or there is no aperiodic CSI requested, the UE may consider that there is no TB(s). And, otherwise, the UE may consider that there is TB(s).

And, in a case that the UE considers that there is no TB(s) for the UL transmission (i.e., in a case that the UE skips the configured resource(s)), the UE may not count the number "k". Namely, the UE may determine, based on there is TB(s) to be transmitted or not, whether the number "k" is counted or not. Namely, the UE may count the number "k" in a case that there is TB(s) to be transmitted. Also, the UE may not count the number "k" in a case that there is no TB(s) to be transmitted. Here, the UE may count the number "k" in a case that there is no TB(s) to be transmitted.

Here, the base station may not recognize whether or not there is TB(s) at the UE side. The UE may transmit information (i.e., an indication) used for indicating the number of k (i.e., the number of k which the UE is assuming for the UL transmission). For example, the UE may transmit the uplink data together with the information used for indicating the number of k. The information used for indicating the number of k may be transmitted on the configured resource(s). Here, the information may be used for indicating that there is TB(s) and/or there is no TB(s).

Also, for example, the base station may configure the periodicity and the number of K (i.e., K for repetitions) within the periodicity. As described above, the periodicity may be configured and/or indicated by using the RRC message and/or the DCI for the activation. Also, the number of K may be configured and/or indicated by using the RRC message and/or the DCI for the activation. Namely, for example, the base station may configure 10 ms as the periodicity. And, the base station may configure 4 as the value of K (i.e., K=4). The UE may perform K repetitions (i.e., 4 repetitions) within 10 ms. And, the UE may, consecutively, perform K repetitions (i.e., 4 repetitions) within each 10 ms periodicity. Here, as described above, the UE may postpone (i.e., perform) the UL transmission (i.e., the initial transmission) in the next available opportunity. For example, the UE may postpone the initial transmission in the available timing within the next period (e.g., the earliest timing within the next period). Namely, the UE may start new data transmission (s) (the initial transmission) in the available timing within i-th period in a case that the TB(s) is provided within (i−1)-th period. Also, the UE may start new data transmission (s) (the initial transmission) in the available timing within i-th period in a case that the no TB(s) is provided within (i−1)-th period. Also, as described above, the UE may perform the initial transmission in the available timing within the current period (e.g., the earliest timing within the current period). Namely, the UE may start new data transmission (s) (the initial transmission) immediately in the available timing within i-th period in a case that the TB(s) is provided within i-th period.

Without loss of generality, a repetition counter or repetition index may be used to better describe the repetition pattern or relationship among different transmission. For example, Repetition k (Rep k) denotes the k-th repetition of a TB and Rep 0 may be treated as the initial transmission. The repetition counter or repetition index may be corresponding to a specific redundancy version, MCS, or other related parameters. After the UE starts repetitions of a TB and before the repetitions reach the repetition number, the UE may receive an UL grant which may override some resources of the repetitions. The UL grant may be used for the same TB or a new TB. There may be different ways for the UE to handle the remaining resources of repetitions for the same TB or the remaining transmissions of repetitions for the same TB. In a specific implementation, the UE may stop the following repetition(s) of the same TB and release the remaining allocated resources for repetitions of the same TB, (which may be used for other transmissions or services). In yet another implementation, the UE may keep the remaining repetition(s) of the same TB at the remaining allocated resources for repetitions of the same TB. The UE keeps the same repetition pattern except for the repetition(s) which are overridden by the PDCCH. In yet another implementation, the UE may keep repetitions at the remaining allocated resources for repetitions of the same TB with a resumed repetition counter until the remaining allocated resources for repetitions of the same TB are exhausted. In yet another implementation, the UE may keep repetitions at the remaining allocated resources for repetitions of the same TB with a reset repetition counter until the remaining allocated resources for repetitions of the same TB are exhausted. In yet another implementation, the UE may keep repetitions at the remaining allocated resources for repetitions of the same TB and consecutive configured resources for grant-free UL transmissions with a resumed repetition counter until the repetition number is reached. In yet another implementation, the UE may keep repetitions at the remaining allocated resources for repetitions of the same TB and consecutive configured resources for grant-free UL transmissions with a reset repetition counter until the repetition number is reached. FIGS. 36A, 36B, 36C, 36D, and 36E show implementations of how to continue with the repetitions of the current TB when an UL grant interruption occurs.

FIG. 36A illustrates configured uplink resources for repetitions without an uplink grant interruption. FIG. 36B illustrates that, before the repetitions reach the repetition number (e.g., 4), the UE receives an UL grant. The UE terminates the subsequent repetition(s) of the same TB. The allocated resource(s) will be released (can be used for other transmissions or services).

FIG. 36C illustrates that, before the repetitions reach the repetition number (e.g., 4), the UE receives an UL grant. The UE keeps the same repetition pattern except for the repetition(s) which are overridden by the PDCCH. As shown in FIG. 36C, TB 0 Rep 1 in time index n+2 is overridden by the PDCCH, but the repetition pattern continues in time index n+4, with TB 0 Rep 2.

FIG. 36D illustrates that, before the repetitions reach the repetition number (e.g., 4), the UE receives an UL grant. The UE skips resource(s) which are overridden by the PDCCH and continues repetitions on the remaining allocated resource(s) with the consecutive repetition index. Each repetition index may be corresponding to a specific redundancy version, MCS, or other related parameters. As shown in FIG. 36D, an UL grant occurs at time index n+2, the repetition pattern continues in time index n+4 with TB 0 Rep 1, where the repetition index is continuous from TB 0 Rep 0 in time index n.

FIG. 36E illustrates that, before the repetitions reach the repetition number (e.g., 4), the UE receives an UL grant. The UE skips resource(s) which are overridden by the PDCCH and continues the repetitions on the remaining allocated resource(s) and allocated resource(s) for repetitions of other TB with the consecutive repetition index until the repetition number is reached. Each repetition index may be corresponding to a specific redundancy version, MCS, or other related parameters. In FIG. 36E, at time index n+8, the UE uses the resource originally allocated for TB 1 Rep 0 for transmission of TB 0 Rep 3, so that the number of repetitions (e.g., 4) for the transmission of TB 0 is fulfilled. As can be seen in FIG. 36E, TB 1 Rep 0 is shifted to time index n+10. Similarly, TB 1 Rep 1, TB 1 Rep 2, TB 1 Rep 3, TB 2 Rep 0, and TB 2 Rep 1 are shifted to time indices n+12, n+14, n+16, n+18, and n+20, respectively.

In FIGS. 36A through 36E, the UE may change its repetition behavior depending on the parameters of the UL grant. In one implementation, if the UL grant includes a repetition number, the UE may reset the repetition counter. In one implementation, if the UL grant does not include a repetition number, the UE may not reset the repetition counter. In one implementation, an RNTI contained in the third information transmitted from the base station (e.g., base station 3160 in FIG. 31) to the UE (e.g., UE 3102 in FIG. 31) in on the PDCCH resource in action 3120 in FIG. 31 may be used to indicate whether to reset the repetition counter.

In a case that the UL grant (e.g., the dynamic grant, the first UL grant, and/or the third UL grant, as described above) is received in the timing in which K repetitions is performed, the UE may perform UL transmission based on the UL grant (e.g., the dynamic grant, the first UL grant, and/or the third UL grant). Namely, in this case, the UE may perform UL transmission on the PUSCH resource scheduled by using the UL grant (e.g., the dynamic grant, the first UL grant, and/or the third UL grant). As described above, the resource on which K repetitions is performed may be scheduled by using the UL grant (e.g., the semi-persistent scheduling grant, the second UL grant, and/or the fourth grant, as described above). Namely, the UL grant (e.g., the dynamic grant, the first UL grant, and/or the third UL grant) may override the UL grant (e.g., the semi-persistent scheduling grant, the second UL grant, and/or the fourth grant). Furthermore, in this case, the UE may stop the UL transmission(s) of K repetitions. Namely, in this case, the UE may perform the UL transmission based on the UL grant (e.g., the dynamic grant, the first UL grant, and/or the third UL grant), and stop the subsequent transmission(s) of K repetitions. Namely, the UE performing K repetitions may release, based on the detection of the UL grant (e.g., the dynamic grant, the first UL grant, and/or the third UL grant), the configured resource. Namely, the UE performing K repetitions may release, based on the detection of the UL grant (e.g., the dynamic grant, the first UL grant, and/or the third UL grant), the configured grant (e.g., the semi-persistent scheduling grant, the second UL grant, and/or the fourth UL grant).

As described above, there may be more than one kinds of transmissions (i.e., transmissions including repetitions) scheduled semi-persistently. For example, one of the more than one kinds of transmissions may be scheduled by using the second UL grant. Also, other one of the more than one kinds of transmissions may be scheduled by using the fourth UL grant. Here, the UE may not stop the UL transmission on the resource scheduled by using the second UL grant in a case that the UL grant (e.g., the dynamic grant, the first UL grant, and/or the third UL grant) is received. Namely, the UE may perform the UL transmission on the resource scheduled by using the UL grant (e.g., the dynamic grant, the first UL grant, and/or the third UL grant), and then, continue to perform the UL transmission on the resource scheduled by using the second UL grant. Namely, the UE may not release the configured resource scheduled by using the second UL grant. Also, the UE may not release the configured UL grant (i.e., the second UL grant) Furthermore, the UE may stop the UL transmission on the resource scheduled by using the fourth UL grant in a case that the UL grant (e.g., the dynamic grant, the first UL grant, and/or the third UL grant) is received. Namely, the UE may perform the UL transmission on the resource scheduled by using the UL grant (e.g., the dynamic grant, the first UL grant, and/or the third UL grant), and then, stop to perform the UL transmission on the resource scheduled by using the fourth UL grant. Namely, the UE may release the configured resource scheduled by using the fourth UL grant. Also, the UE may release the configured UL grant (i.e., the fourth UL grant). Namely, the UE may determine, based on the configured resource(s) (i.e., the configured grant), whether the UL transmission(s) (i.e., the subsequent transmission of K repetitions) is stopped or not.

As described above, the UE may stop the UL transmission (i.e., the subsequent transmission(s) of K repetitions) in a case that UL grant (e.g., the dynamic grant, the first UL grant, and/or the third UL grant) is received. Namely, the UE may stop to count the number of "k" based on the detection of the UL grant (e.g., the dynamic grant, the first UL grant, and/or the third UL grant). Also, the UE may continue to perform the UL transmission (i.e., the subsequent transmission(s) of K repetitions) in a case that UL grant (e.g., the dynamic grant, the first UL grant, and/or the third UL grant) is received. Namely, the UE may continue to count the number of "k" in a case that (e.g., even if) the UL grant (e.g., the dynamic grant, the first UL grant, and/or the third UL grant) is received.

Here, for counting the number "k", the UE may skip the UL transmission scheduled by using the UL grant (e.g., the dynamic grant, the first UL grant, and/or the third UL grant). For example, in a case that the second transmission of K repetitions (e.g., K=4) is overridden by using the UL grant (e.g., the dynamic grant, the first UL grant, and/or the third UL grant), the UE may not count (as the number "k" (i.e., as the second transmission)) the UL transmission scheduled by using the UL grant (e.g., the dynamic grant, the first UL grant, and/or the third UL grant). Namely, the UE may skip the counting for the second transmission (which is overridden), and count the third transmission (i.e., the third transmission of K repetitions on the configured resource) as the number "k=2". Namely, the UE may skip the counting for the UL transmission (which is scheduled by using the UL grant (e.g., the dynamic grant, the first UL grant, and/or the third UL grant)), and count the third transmission (i.e., the third transmission of K repetitions on the configured resource) as the number "k=2".

Also, for counting the number "k", the UE may include the UL transmission scheduled by using the UL grant (e.g., the dynamic grant, the first UL grant, and/or the third UL grant). For example, in a case that the second transmission of K repetitions (e.g., K=4) is overridden by using the UL grant (e.g., the dynamic grant, the first UL grant, and/or the third UL grant), the UE may count (as the number "k" (i.e., as the second transmission)) the UL transmission scheduled by using the UL grant (e.g., the dynamic grant, the first UL grant, and/or the third UL grant). Namely, the UE may perform (i.e., not skip) the counting for the UL transmission (which is scheduled by using the UL grant (e.g., the dynamic grant, the first UL grant, and/or the third UL grant)), and count the UL transmission as the number "k=2". Namely, the UE may perform (i.e., not skip) the counting for the second transmission (which is overridden), and count the second transmission (i.e., the second transmission of K repetitions on the configured resource) as the number "k=2".

After the UE starts repetitions of a TB and before the repetitions reach the repetition number, the UE may receive an UL grant which may override some resources of the repetitions. The UL grant may be used for the same TB or a new TB. There may be different ways for the UE to utilize the remaining resources of repetitions for the same TB to transmit a new TB. In a specific implementation, the new TB may not use the allocated remaining resource(s) for the same TB even though these resource may be released after the UE receives the grant. The new TB may wait until next available start position of repetitions. In yet another example, the UE starts repetitions of a new TB at the allocated remaining resource(s) for the same TB until these remaining resources are exhausted. The repetition number of the new is limited by the number of remaining resources which are allocated for the same TB before. In yet another example, the UE starts repetitions of a new TB at the allocated remaining resource(s) for the same TB and consecutive configured resources for grant-free UL transmissions until the repetition number is reached. In yet another implementation, the allocated remaining resource(s) for the same TB can be just used as additional resource(s) for repetitions of a new TB and they may not impact the original repetition pattern of the new TB in the following configured grant-free resources. FIGS. 37A, 37B, 37C, 37D, and 37E show implementations of how to use the remaining allocated UL resources for the repetitions of a new TB when an UL grant interruption occurs. In one implementation, the repetition of the same TB or different TBs may be identified by using a HARQ process ID, a new data indicator, and/or configuration by the base station.

FIG. 37A illustrates configured uplink resources for repetitions without an uplink grant interruption. FIG. 37B illustrates that, before the repetitions reach the repetition number (e.g., 4), the UE receives an UL grant. The UE terminates the following repetition(s) of the same TB. The allocated remaining resource(s) for this TB cannot be used by repetitions of a new TB. The new TB may wait until next available start position of repetitions. FIG. 37B illustrates that, before the repetitions reach the repetition number (e.g., 4), the UE receives an UL grant. The UE terminates the following repetition(s) of the same TB. The allocated remaining resource(s) for this TB can be used by repetitions of a new TB. Only two resources are released from repetitions for TB 0, so repetition number of TB 1 is 2.

FIG. 37C illustrates that, before the repetitions reach the repetition number (e.g., 4), the UE receives an UL grant. The UE terminates the following repetition(s) of the same TB. The allocated remaining resource(s) for this TB and the consecutive configured resource(s) for repetitions can be used by repetitions of a new TB with the configured repetition number (e.g., 4). Besides the two released resources, two consecutive configured resources are used, so repetition number of TB 1 is 4.

FIG. 37D illustrates that, before the repetitions reach the repetition number (e.g., 4), the UE receives an UL grant. The UE terminates the following repetition(s) of the same TB. The allocated remaining resource(s) for this TB and the consecutive configured resource(s) for repetitions can be used by repetitions of a new TB with the configured repetition number (e.g., 4). Besides two released resources, two consecutive configured resources are used, so the repetition number of TB 1 is 4.

FIG. 37E illustrates that, before the repetitions reach the repetition number (e.g., 4), the UE receives an UL grant. The UE terminates the following repetition(s) of the same TB. The allocated remaining resource(s) for this TB can be used as additional resource(s) by repetitions of a new TB. Two released resources serve as additional resources and may use a defaulted pattern, but they will not change the original pattern for the configured repetitions.

After the UE starts repetitions of a TB and before the repetitions reach the repetition number, the UE may receive an UL grant which may allocate new resource(s), use the same resource(s) or override some resources of the repetitions. The UL grant may be used for the same TB. Additional information, like NDI, may be included in the UL grant to indicate that the UL grant is for the same TB. Also, a timer may be used to indicate that the grant is for the same data or new data. The timer may start at a fixed position which is configured by RRC, MAC CE, or aligned with the resource configuration (periodicity and/or offset). The timer may start when the UE starts repetitions. Before the timer expires, the UL grant is for the same TB. Also, the UL grant before the repetitions reach the repetition number may be always treated as an UL grant for the same data. The UL grant may indicate grant-based repetitions of the same TB. In an implementation, the UL grant may include a new repetition number. After the UE receives the UL grant, the UE follows the UL grant and start the grant-based repetitions. The repetition counter may be reset or reuse the counter for the previous repetitions of the same TB. In yet another implementation, UL grant may include an adjustment factor of the repetition number. For example, −1 means the original repetition number should be decreased by 1 and +2 means the original repetition number should be increased by 2. The repetition counter may or may not be reset. In yet another implementation, UL grant may just indicate a reset of the repetition counter. The grant-based repetitions may use the configured grant-free resource. The grant-based repetitions may use the same frequency resource as the previous repetitions. The UL grant for repetitions may indicate the frequency resources and/or time resources explicitly. The UL grant for repetitions may indicate a repetition pattern and the set of repetition patterns is RRC configured or indicated by MAC CE or PDCCH. The UL grant may be used for a new TB. Additional information, like NDI, may be included in the UL grant to indicate that the UL grant is for a new TB. Also, a timer may be used to indicate that the grant is for the same data or new data. The timer may start at a fixed position which is configured by RRC, MAC CE, or aligned with the resource configuration (periodicity and/or offset). The timer may start when the UE starts repetitions. After the timer expires, the UL grant is for a new TB. Also, the UL grant before the repetitions reach the repetition number may be always treated as an UL grant for a new data. The UL grant for a new TB may use the same DCI format or structure as the UL grant for the same TB, which is described above. The UE follows the UL grant to transmit the new TB. The repetition counter may be always reset when the UE starts the repetitions of the new TB by following the grant.

Grant-based repetitions (referred as previous grant-based repetitions here) may also be interrupted, pre-empted or overridden by another UL grant (also referred as new grant). The way to handle the remaining allocated resource(s) for the repetitions, the remaining transmissions of the repetitions and the UL grant may be the same as the way for the case of grant-free repetitions impacted by an UL grant, which is described above. After the UE starts grant-based repetitions of a TB and before the repetitions reach the repetition number, the UE may receive an UL grant which may override some resources of the repetitions. The UL grant may be used for the same TB or a new TB. The UE may stop the previous grant-based repetitions and follow the new grant. There may be different ways for the UE to utilize the remaining resources of repetitions for the same TB to transmit a new TB. In a specific implementation, the new TB may not use the allocated remaining resource(s) for the same TB even though these resource may be released after the UE receives the new grant. The new TB may wait until next available start position of repetitions or a grant for the new TB is received. In yet another example, the UE starts repetitions of a new TB at the allocated remaining resource(s) for the same TB until these remaining resources are exhausted. The repetition number of the new TB is limited by the number of remaining resources which are allocated for the same TB before. In yet another example, the UE starts repetitions of a new TB at the allocated remaining resource(s) for the same TB and consecutive available resources until the repetition number is reached. In yet another implementation, the allocated remaining resource(s) for the same TB can be just used as additional resource(s) for repetitions of a new TB and they may not impact the original repetition pattern of the new TB in the following allocated or configured resources.

After the UE starts grant-based repetitions of a TB and before the repetitions reach the repetition number, the UE may receive an UL grant which may allocate new resource(s), use the same resource(s) or override some resources of the repetitions. The UL grant may be used for the same TB. Additional information, like NDI, may be included in the UL grant to indicate that the UL grant is for the same TB. Also, a timer may be used to indicate that the grant is for the same data or new data. The timer may start at a fixed position which is configured by RRC, MAC CE. The timer may start when the UE starts repetitions. Before the timer expires, the UL grant is for the same TB. Also, the UL grant before the repetitions reach the repetition number may be always treated as an UL grant for the same data. The UL grant may indicate another grant-based repetition (referred as new grant-based repetitions) of the same TB. In an implementation, the UL grant may include a new repetition number. After the UE receives the UL grant, the UE follows the UL grant and start the new grant-based repetitions. The repetition counter may be reset or reuse the counter for the previous repetitions of the same TB. In yet another implementation, UL grant may include an adjustment factor of the repetition number. For example, −1 means the original repetition number should be decreased by 1 and +2 means the original repetition number should be increased by 2. The repetition counter may or may not be reset. In yet another implementation, new UL grant may just indicate a reset of the repetition counter. The new grant-based repetitions may use the configured grant-free resource. The new grant-based repetitions may use the same frequency resource as the previous repetitions. The new UL grant for repetitions may indicate the frequency resources and/or time resources explicitly. The new UL grant for repetitions may indicate a repetition pattern and the set of repetition patterns is RRC configured or indicated by MAC CE or PDCCH. The new UL grant may be used for a new TB. Additional information, like NDI, may be included in the new UL grant to indicate that the UL grant is for a new TB. Also, a timer may be used to indicate that the new grant is for the same data or new data. The timer may start at a fixed position which is configured by RRC, MAC CE. The timer may start when the UE starts previous repetitions. After the timer expires, the UL grant is for a new TB. Also, the new UL grant before the previous repetitions reach the repetition number may be always treated as an UL grant for a new data. The UL grant for a new TB may use the same DCI format or structure as the UL grant for the same TB, which is described above. The UE follows the new UL grant to transmit the new TB. The repetition counter may be always reset when the UE starts the repetitions of the new TB by following the new grant.

Figure 38A:
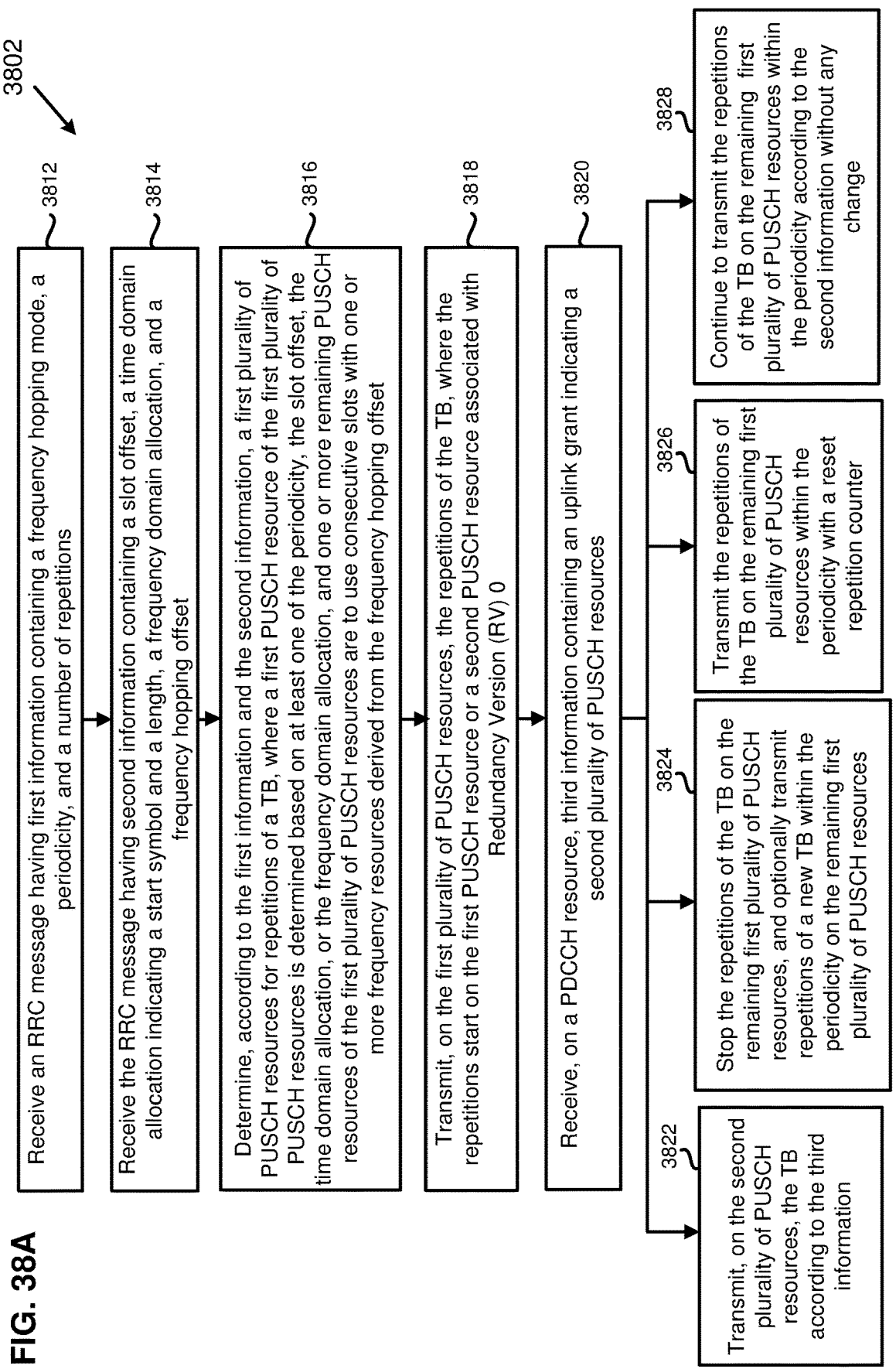
FIG. 38A is a flowchart illustrating a method by a UE for uplink transmission without grant, in accordance with an example implementation of the present application.

FIG. 38A is a flowchart 3802 illustrating a method by a UE for uplink transmission without grant, in accordance with an exemplary implementation of the present application. In the present implementation, the UE may substantially correspond to the UE 102 in FIG. 1. The flowchart 3802 includes actions 3812, 3814, 3816, 3818, 3820, 3822, 3824, 3826, and 3828.

In action 3812, the UE, using its receiving circuitry, receives an RRC message, which includes first information containing, among other parameters and configurations, a frequency hopping mode, a periodicity, a number of repetitions (e.g., a repetition number indicating a total number of repetitions), and a repetition enabler. That is, the UE receives the allocation of resources for UL transmission from a base station, which may be referred to as a transmission opportunity. In one implementation, the base station may allocate periodic radio resources (e.g., for UL transmissions) to the UE, where the periodicity of the periodic radio resources is provided in the first information contained in the RRC message. By such, the base station grants radio resources to the UE through the configuration of the RRC message with or without (re)activation/modification by L1 signaling or MAC CE, L1 signaling or an explicit uplink grant is not needed for every following configured periodic resource. Thus, subsequent transmissions (e.g., uplink transmissions from the UE) using the allocated periodic radio resources may be considered grant-free transmissions or transmissions without grant. The period may depend on the latency requirement of a particular service. In one implementation, for URLLC services, the periodicity may be represented by a number of slots, mini-slots or symbols.

Also, within the period, there may be multiple mini-slots for the repetitions. In the RRC message, the first information also contains the repetition number ("K") to inform the UE the maximum number of repetitions can be applied within each period.

In addition, in the RRC message, a repetition enabler is provided in the RRC message to give the UE permission to perform repetitions using the allocated radio resources for UL transmissions. In one implementation, the repetition enabler is an indicator for retransmission(s), additional transmission(s) or subsequent transmission(s) following initial transmission of a same TB. The repetition enabler may be a parameter in the RRC message to allow the UE to enable repetitions for subsequent UL transmissions.

In action 3814, the UE, using its receiving circuitry, receives the RRC message, which includes second information containing, among other parameters and configurations, a first plurality of PUSCH resources (e.g., a bit map of mini-slots, and a frequency hopping pattern) for repetitions of a TB within the period, a slot offset, a time domain allocation (e.g., indicating a start symbol and a length) for one or more of the first plurality of PUSCH resources for the repetitions, a frequency hopping offset, and a frequency domain allocation (e.g., indicating a carrier, a sub-band, a BWP) for one or more of the first plurality of PUSCH resources for the repetitions. The second information provides additional information to the UE regarding the exact position(s) of the allocated radio resources (e.g., time and frequency resources) within the period that can be used for repetitions during UL transmissions. For example, if a slot contains 14 symbols, the second information informs the UE which symbols can be used for the repetitions. The second information also contains the time domain allocation indicating a start symbol and a length. For example, the time domain allocation includes the time reference to inform the UE a start position (e.g., a start symbol) and a length in the period for the UL radio resources for the repetitions. The start position of the repetition period may be represented by a number of ways. In one example, the start position may be represented by an absolute value of a slot ID. In another example, the start position may be represented implicitly by a value k. For example, when the RRC message is received by the UE, which may also be used for the activation of the UL transmission, at time symbol/slot n, and the start reference is represent by k, then the start position of the UL repetition will be at symbol/slot n+k. Details of the reference will be discussed in detail below.

In action 3816, the UE 3102 derives and/or determines, using processing circuitry, according to the first information and the second information, a reference (e.g., a time reference and/or a frequency reference) for the first plurality of PUSCH resources for the repetitions of the TB. For example, a first PUSCH resource of the first plurality of PUSCH resources may be determined based on at least one of the periodicity, the slot offset, the time domain allocation (indicating the start symbol and the length), or the frequency domain allocation. One or more remaining PUSCH resources of the first plurality of PUSCH resources may use consecutive slots with one or more frequency resources derived from the frequency hopping offset.

In one implementation, an initial transmission of the TB is transmitted using the first PUSCH resource in a first slot, and the repetitions of the TB are transmitted using the one or more remaining PUSCH resources in the consecutive slots immediately following the first slot. For example, with reference to FIG. 33B, when the repetition number is 4 and only the resource for initial transmission is explicitly configured by the RRC message, the UE may use the TTIs immediately after the initial transmission TTI for repetitions. For example, the repetitions of TB 0 are transmitted in time indices n+1, n+2, and n+3 immediately after the initial transmission of TB 0 in time index n. It should be noted that, although the repetition number is 4, the first repetition, Rep 0, corresponds to the initial transmission of TB 0 at time index n. Thus, the total number of repetitions after the initial transmission is 3.

In action 3818, the UE, using its transmitting circuitry, transmits, on the first plurality of PUSCH resources, the repetitions of the TB and the number of repetitions may be indicated by the first and/or second information. For example, the repetitions of the TB start on the first PUSCH resource or a second PUSCH resource associated with Redundancy Version (RV) 0.

In action 3820, the UE, using its receiving circuitry, receives, on a PDCCH resource, third information containing an uplink grant indicating a second plurality of PUSCH resources (e.g., a bit map of mini-slots, a frequency hopping pattern, and etc.) for the same TB or a new TB.

The UE, upon receiving the third information containing the uplink grant, may (1) in action 3822, transmit, on the second plurality of PUSCH resources, the TB according to the third information; (2) in action 3824, stop the repetitions of the TB on the remaining first plurality of PUSCH resources, and optionally transmit, on the remaining first plurality of PUSCH resources, repetitions of the new TB within the periodicity; (3) in action 3826, transmit, on the remaining first plurality of PUSCH resources, the repetitions of the TB within the periodicity with a reset repetition counter; or (4) in action 3828, continue to transmit, on the remaining first plurality of PUSCH resources, the repetitions of the TB within the periodicity according to the second information without any change.

Figure 38B:
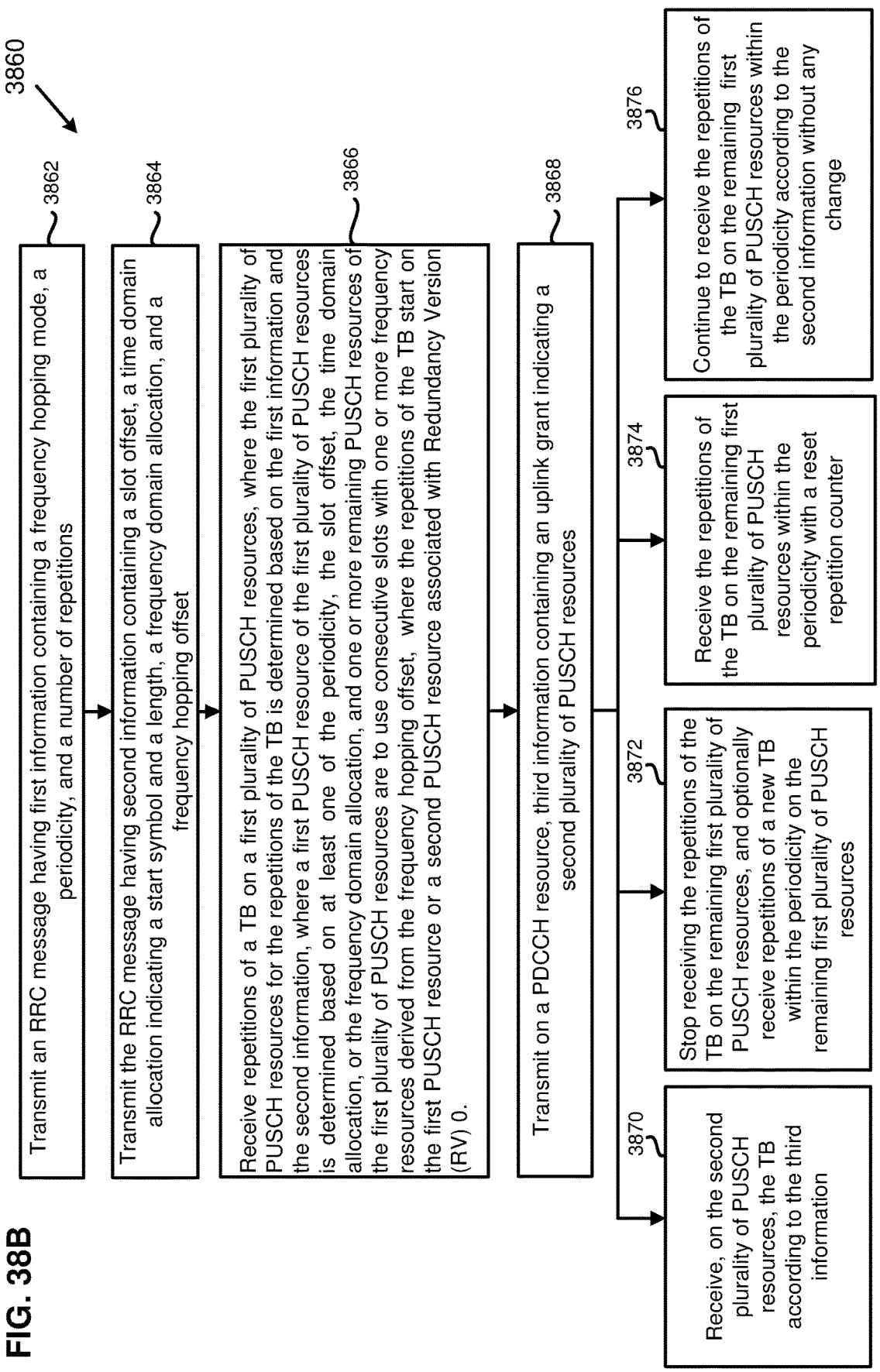
FIG. 38B is a flowchart illustrating a method by a base station for uplink transmission without grant, in accordance with an example implementation of the present application.

FIG. 38B is a flowchart illustrating a method by a base station for uplink transmission without grant, in accordance with an exemplary implementation of the present application. In the present implementation, the base station may substantially correspond to the base station 160 (e.g., a gNB) in FIG. 1. The flowchart 3860 includes actions 3862, 3864, 3866, 3868, 3870, 3872, 3874, and 3876.

In action 3862, the base station, using its transmitting circuitry, transmits, an RRC message to a UE. The RRC message includes first information containing, among other parameters and configurations, a frequency hopping mode, a periodicity, a number of repetitions (e.g., a repetition number indicating a total number of repetitions), and a repetition enabler. That is, the base station via RRC signaling communicates to the UE the allocation of resources for UL transmission, which may be referred to as a transmission opportunity. In one implementation, the base station may allocate periodic radio resources (e.g., for UL transmissions) to the UE, where the periodicity of the periodic radio resources is provided in the first information contained in the RRC message. By such, the base station grants radio resources to the UE through the configuration of the RRC message with or without (re)activation/modification by L1 signaling or MAC CE, L1 signaling or an explicit uplink grant is not needed for every following configured periodic resource. Thus, subsequent transmissions (e.g., uplink transmissions from the UE) using the allocated periodic radio resources may be considered grant-free transmissions or transmissions without grant. The period may depend on the latency requirement of a particular service. In one implementation, for URLLC services, the period may be represented by a number of slots, mini-slots or symbols.

Also, within the period, there may be multiple mini-slots for the repetitions. In the RRC message, the first information also contains the repetition number ("K") to inform the UE the maximum number of repetitions can be applied within each period.

In addition, in the RRC message, a repetition enabler is provided in the RRC message to give the UE permission to perform repetitions using the allocated radio resources for UL transmissions. In one implementation, the repetition enabler is an indicator for retransmission(s), additional transmission(s) or subsequent transmission(s) following initial transmission of a same TB. The repetition enabler may be a parameter in the RRC message to allow the UE to enable repetitions for subsequent UL transmissions. It should be noted that in another implementation, the base station may allocate and configure more than one set of radio resources to the UE for uplink transmissions, where each set of the configured radio resources may have a different period.

In action 3864, the base station, using its transmitting circuitry, transmits to the UE the RRC message having second information, which may contain, among other parameters and configurations, a first plurality of physical uplink shared channel (PUSCH) resources (e.g., a bit map of mini-slots, and a frequency hopping pattern) for repetitions of a transport block (TB) within the period, a slot offset, a time domain allocation (e.g., indicating a start symbol and a length) for one or more of the first plurality of PUSCH resources for the repetitions, a frequency hopping offset, and a frequency domain allocation (e.g., indicating a carrier, a sub-band, a bandwidth part (BWP)) for one or more of the first plurality of PUSCH resources for the repetitions. The second information provides additional information to the UE regarding the exact position(s) of the allocated radio resources (e.g., time and frequency resources) within the period that can be used for repetitions during UL transmissions. For example, if a slot contains 14 symbols, the second information informs the UE which symbols can be used for the repetitions. The second information also contains the time domain allocation indicating a start symbol and a length. For example, the time domain allocation includes the time reference to inform the UE a start position (e.g., a start symbol) and a length in the period for the UL radio resources for the repetitions. The start position of the repetition period may be represented by a number of ways. In one example, the start position may be represented by an absolute value of a slot ID. In another example, the start position may be represented implicitly by a value k. For example, when the RRC message is received by the UE 3102, which may also be used for the activation of the UL transmission, at time symbol/slot n, and the start reference is represent by k, then the start position of the UL repetition will be at symbol/slot n+k.

In action 3866, the base station, using its receiving circuitry, receives, on the first plurality of PUSCH resources, the repetitions of the TB and the number of repetitions may be indicated by the first and/or second information. A reference (e.g., a time reference and/or a frequency reference) for the first plurality of PUSCH resources for the repetitions, may be determined according to the first information and the second information. For example, a first PUSCH resource of the first plurality of PUSCH resources may be determined based on at least one of the periodicity, the slot offset, the time domain allocation (indicating the start symbol and the length), or the frequency domain allocation. For example, the repetitions of the TB start on the first PUSCH resource or a second PUSCH resource associated with Redundancy Version (RV) 0. One or more remaining PUSCH resources of the first plurality of PUSCH resources may use consecutive slots with one or more frequency resources derived from the frequency hopping offset.

In one implementation, an initial transmission of the TB is transmitted using the first PUSCH resource in a first slot, and the repetitions of the TB are transmitted using the one or more remaining PUSCH resources in the consecutive slots immediately following the first slot. For example, with reference to FIG. 33B, when the repetition number is 4 and only the resource for initial transmission is explicitly configured by the RRC message, the UE may use the TTIs immediately after the initial transmission TTI for repetitions. For example, the repetitions of TB 0 are transmitted in time indices n+1, n+2, and n+3 immediately after the initial transmission of TB 0 in time index n. It should be noted that, although the repetition number is 4, the first repetition, Rep 0, corresponds to the initial transmission of TB 0 at time index n. Thus, the total number of repetitions after the initial transmission is 3.

In action 3868, the base station, using its transmitting circuitry, transmits, on a PDCCH resource, third information containing an uplink grant indicating a second plurality of PUSCH resources (e.g., a bit map of mini-slots, a frequency hopping pattern, and etc.) for the same TB or a new TB.

The base station, upon transmitting the third information containing an uplink grant, may (1) in action 3870, receive, on the second plurality of PUSCH resources, the TB according to the third information; (2) in action 3872, stop receiving the repetitions of the TB on the remaining first plurality of PUSCH resources, and optionally receive, on the remaining first plurality of PUSCH resources, repetitions of the new TB within the periodicity; (3) in action 3874, receive, on the remaining first plurality of PUSCH resources, the repetitions of the TB within the periodicity with a reset repetition counter; or (4) in action 3876, continue to receive, on the remaining first plurality of PUSCH resources, the repetitions of the TB within the periodicity according to the second information without any change.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device (e.g., a gNB) and the terminal device (e.g., a UE) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) comprising:
   receiving circuitry configured to:
      receive a Radio Resource Control (RRC) message comprising information used for configuring at least a periodicity, a number of repetitions, an offset of a resource with respect to system frame number equal to 0, a time domain allocation, a frequency domain allocation, and a frequency hopping offset;
   processing circuitry configured to:
      determine, based on at least the periodicity, the offset, the time domain allocation, and the frequency domain allocation, a first physical uplink shared channel (PUSCH) resource; and
      determine, based on at least the frequency hopping offset, one or more second PUSCH resources; and
   transmitting circuitry configured to:
      perform, based on the number of repetitions, repetitions of a transport block (TB) on a plurality of PUSCH resources with frequency hopping in consecutive slots, the plurality of PUSCH resources comprising the first PUSCH resource and the one or more second PUSCH resources.

2. A method comprising:
   receiving, by receiving circuitry of a user equipment (UE), a Radio Resource Control (RRC) message comprising information used for configuring at least a periodicity, a number of repetitions, an offset of a resource with respect to system frame number equal to 0, a time domain allocation, a frequency domain allocation, and a frequency hopping offset;
   determining, by processing circuitry of the UE, based on at least the periodicity, the offset, the time domain allocation, and the frequency domain allocation, a first physical uplink shared channel (PUSCH) resource;
   determining, based on at least the frequency hopping offset, one or more second PUSCH resources; and
   performing, by transmitting circuitry of the UE, based on the number of repetitions, repetitions of a transport block (TB) on a plurality of PUSCH resources with frequency hopping in consecutive slots, the plurality of PUSCH resources comprising the first PUSCH resource and the one or more second PUSCH resources.

3. A base station comprising:
   transmitting circuitry configured to:
      transmit a Radio Resource Control (RRC) message comprising information used for configuring at least a periodicity, a number of repetitions, an offset of a resource with respect to system frame number equal to 0, a time domain allocation, a frequency domain allocation, and a frequency hopping offset; and
   receiving circuitry configured to:
      receive, based on the number of repetitions, repetitions of a transport block (TB) on a plurality of physical uplink shared channel (PUSCH) resources with frequency hopping in consecutive slots, the plurality of PUSCH resources comprising a first PUSCH resource and one or more second PUSCH resources,
      wherein the first PUSCH resource of the plurality of PUSCH resources is determined based on at least the periodicity, the offset, the time domain allocation, and the frequency domain allocation, and the one or more second PUSCH resources of the plurality of PUSCH resources are determined based on at least the frequency hopping offset.

4. A method comprising:
   transmitting, by transmitting circuitry of a base station, a Radio Resource Control (RRC) message comprising information used for configuring at least a periodicity, a number of repetitions, an offset of a resource with respect to system frame number equal to 0, a time domain allocation, a frequency domain allocation, and a frequency hopping offset;
   receiving, by receiving circuitry of the base station, based on the number of repetitions, repetitions of a transport block (TB) on a plurality of physical uplink shared channel (PUSCH) resources with frequency hopping in consecutive slots, the plurality of PUSCH resources comprising a first PUSCH resource and one or more second PUSCH resources, wherein the first PUSCH resource of the plurality of PUSCH resources is determined based on at least the periodicity, the offset, the time domain allocation, and the frequency domain allocation, and the one or more second PUSCH resources of the plurality of PUSCH resources are determined based on at least the frequency hopping offset.

* * * * *